US012711489B2

(12) United States Patent
van den Berg et al.

(10) Patent No.: US 12,711,489 B2
(45) Date of Patent: Aug. 18, 2026

(54) USER INPUT DURING AN ELECTRONIC DATA TRANSFER

(71) Applicant: Apple Inc., Cupertino, CA (US)

(72) Inventors: Frank Andries van den Berg, San Jose, CA (US); Sebastien Fontaine, Montreal (CA); Varun A. Vora, Campbell, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/865,258

(22) Filed: Jul. 14, 2022

(65) Prior Publication Data

US 2023/0015850 A1 Jan. 19, 2023

Related U.S. Application Data

(60) Provisional application No. 63/223,477, filed on Jul. 19, 2021.

(51) Int. Cl.

| | |
|---|---|
| ***G06Q 20/32*** | (2012.01) |
| ***G06Q 20/20*** | (2012.01) |
| ***G06Q 20/38*** | (2012.01) |
| ***H04L 9/30*** | (2006.01) |
| ***H04L 9/40*** | (2022.01) |
| ***H04W 4/80*** | (2018.01) |
| ***H04W 36/00*** | (2009.01) |

(52) U.S. Cl.

CPC ....... *G06Q 20/3278* (2013.01); *G06Q 20/202* (2013.01); *G06Q 20/3829* (2013.01); *H04L 9/3066* (2013.01); *H04L 63/083* (2013.01); *H04W 4/80* (2018.02); *H04W 36/0038* (2013.01)

(58) Field of Classification Search

None

See application file for complete search history.

(56) References Cited

U.S. PATENT DOCUMENTS 9,799,021 B1 * 10/2017 Lee ...................... G06Q 20/351
10,636,019 B1 4/2020 Abrons (Continued)

FOREIGN PATENT DOCUMENTS

CA 2853146 A1 1/2016
EP 3276557 A1 1/2018

(Continued)

OTHER PUBLICATIONS

Application No. EP22197566.7 , Extended European Search Report, Mailed on Feb. 15, 2023, 8 pages.

(Continued)

*Primary Examiner* — Matthew S Gart
*Assistant Examiner* — Amit Patel
(74) *Attorney, Agent, or Firm* — Kilpatrick Townsend & Stockton LLP

(57) ABSTRACT

Approaches for display of a user input field on a data originating device during a data transfer are disclosed herein. The data originating device can be positioned within a proximity of a data receiving device to initiate a data transfer between the data originating device and the data receiving device. A secure channel may be established between the data originating device and the data receiving device to exchange information related to the user input field in some embodiments.

20 Claims, 28 Drawing Sheets

(56) References Cited

U.S. PATENT DOCUMENTS

| | | | | |
|---|---|---|---|---|
| 10,840,975 | B2 * | 11/2020 | Smets | G06Q 20/425 |
| 2007/0299914 | A1 | 12/2007 | Jones et al. | |
| 2011/0096752 | A1 | 4/2011 | Yuk et al. | |
| 2011/0264543 | A1 | 10/2011 | Taveau et al. | |
| 2012/0150669 | A1 | 6/2012 | Langley et al. | |
| 2013/0097080 | A1 | 4/2013 | Smets et al. | |
| 2013/0282459 | A1 | 10/2013 | Smets et al. | |
| 2014/0019746 | A1 | 1/2014 | Hans | |
| 2014/0207680 | A1 | 7/2014 | Rephlo | |
| 2015/0073996 | A1 | 3/2015 | Makhotin et al. | |
| 2015/0134439 | A1 | 5/2015 | Maxwell et al. | |
| 2015/0288464 | A1 | 10/2015 | Tanner et al. | |
| 2015/0348003 | A1 | 12/2015 | Reader | |
| 2016/0248480 | A1 | 8/2016 | Tanner et al. | |
| 2016/0335623 | A1 | 11/2016 | Taveau et al. | |
| 2016/0335630 | A1 | 11/2016 | Kumar | |
| 2018/0144334 | A1 | 5/2018 | Fontaine et al. | |
| 2019/0109616 | A1 | 4/2019 | Takayama et al. | |
| 2019/0122201 | A1 | 4/2019 | Tavakoli et al. | |
| 2020/0242582 | A1 | 7/2020 | Laserson | |
| 2021/0127436 | A1 | 4/2021 | Smets et al. | |
| 2022/0038570 | A1 | 2/2022 | Stegall et al. | |

FOREIGN PATENT DOCUMENTS

| | | | |
|---|---|---|---|
| WO | 2015039254 | A1 | 3/2015 |
| WO | 2018165724 | A1 | 9/2018 |

OTHER PUBLICATIONS

Application No. EP22197569.1 , Extended European Search Report, Mailed on Feb. 10, 2023, 9 pages.

Application No. PCT/US2022/037504 , International Search Report and Written Opinion, Mailed on Feb. 10, 2023, 18 pages.

Application No. EP22197579.0 , Extended European Search Report, Mailed on Mar. 7, 2023, 8 pages.

International Patent Application No. PCT/US2022/037504, Invitation to Pay Additional Fees and, Where Applicable Protest Fee, Oct. 31, 2022, 4 pages.

The U.S. Appl. No. 17/865,268, "Non-Final Office Action," mailed Mar. 26, 2024, 29 pages.

The U.S. Appl. No. 17/865,276, "Non-Final Office Action," mailed Dec. 14, 2023, 34 pages.

The U.S. Appl. No. 17/865,285, "Non-Final Office Action," mailed Mar. 28, 2024, 17 pages.

Krishnamoorthy , et al. , "Secure and Efficient Hand-over Authentication in WLAN Using Elliptic Curve RSA", Computers & Electrical Engineering, vol. 64 , Nov. 2017 , pp. 552-566.

Nassar , et al. , "Method for Secure Credit Card Transaction" , Institute of Electrical and Electronics Engineers , 2013.

The International Application No. PCT/US2022/037504, "International Preliminary Report on Patentability," mailed Feb. 1, 2024, 12 pages.

Singh , et al. , "Elliptic Curve Cryptography Based Mechanism for Secure Wi-fi Connectivity" , International Conference on Distributed Computing and Internet Technology, Distributed Computing and Internet Technology , Jan. 10-13, 2019 , pp. 422-439.

U.S. Appl. No. 17/865,276, Final Office Action, Aug. 26, 2024, 48 pages.

U.S. Appl. No. 17/865,268, Final Office Action, Jan. 2, 2025, 37 pages.

U.S. Appl. No. 17/865,285, Final Office Action, Jan. 3, 2025, 22 pages.

European Patent Application No. 22197579.0, Office Action, Apr. 16, 2025, 8 pages.

First Examination Report issued in India Application No. IN202214040986, dated Oct. 31, 2025 in 6 pages.

Non-Final Office Action issued in U.S. Appl. No. 17/865,268, dated Jul. 14, 2025 in 27 pages.

Office Action issued in India Application No. IN202214040983, dated Jul. 2, 2025 in 6 pages.

Final Office Action issued in U.S. Appl. No. 17/865,268, dated May 14, 2026 in 27 pages.

Final Office Action issued in U.S. Appl. No. 17/865,285, dated May 18, 2026 in 12 pages.

* cited by examiner

1100

| | Tag | | Length | Description | Presence |
|---|---|---|---|---|---|
| 1102 | '6F' | | Var | FCI Template | |
| 1104 | | '50' | 8 | Application Label. "ApplePay" | |
| 1106 | | '9F21' | 2 | Application Version Number (Mobile). '0100' (Big Endian format). | |
| 1108 | | '9F24' | 4 | Unpredictable Number (Mobile) | |
| 1110 | | '9F23' | 4 | Mobile Capabilities Information (See below) | |

| | b8 | b7 | b6 | b5 | b4 | b3 | b2 | b1 | Description |
|---|---|---|---|---|---|---|---|---|---|
| 1202 | - | - | - | - | - | - | 1 | 0 | Always set to '10' |
| 1204 | - | - | - | - | 0 | 1 | - | - | Loyalty Supported. Skip Loyalty Protocol |
| 1206 | - | - | - | - | 1 | 1 | - | - | Loyalty Supported. Proceed with Loyalty Protocol |
| 1208 | - | - | 0 | 1 | - | - | - | - | Payment Supported, No Payment Data Forthcoming |
| 1210 | - | - | 1 | 1 | - | - | - | - | Payment Supported, Payment Data Forthcoming |
| 1212 | * | * | - | - | - | - | - | - | Input Value/Handover |

| | Code | Value | Meaning |
|---|---|---|---|
| 1302 | CLA | '80' | See Section 5.4.1 |
| 1304 | INS | 'CA' | GET DATA |
| 1306 | P1 | '01' | GET VAS DATA (See Table 85) |
| 1308 | P2 | '00', '01' or '10' | '00': URL VAS Protocol Only<br>'01': Full VAS Protocol<br>'10': TIP Support |
| 1310 | Lc | Var | Length of the data field |
| 1312 | Data | Var | Command Data. See details below. |
| 1314 | Le | '00' | |

| | Tag | Length | Description | Presence for P2='00' | Presence for P2='01' |
|---|---|---|---|---|---|
| 1402 | '9F22' | 2 | Application Version Number (Terminal). '0100' (Big Endian format) | | |
| 1404 | '9F25' | 32 | Merchant Id | | |
| 1406 | '9F28' | 4 | Unpredictable Number (Terminal) | | |
| 1408 | '9F26' | 4 | Terminal Capabilities Information | | |
| 1410 | '9F2B' | 5 | VAS Filter | | |
| 1412 | '9F29' | Var (Up to 64) | Merchant URL | | |
| 1414 | * | * | Input Value | | |
| 1416 | * | * | UUID | | |

| | Tag | | Length | Description | Presence |
|---|---|---|---|---|---|
| 1502 | '70' | | Var | VAS Data Template | |
| 1504 | | '9F2A' | Up to 36 | Mobile Token | |
| 1506 | | '9F27' | Up to 128 | VAS Data | |
| 1508 | * | * | * | Input Value | |

FIG. 15

USER INPUT DURING AN ELECTRONIC DATA TRANSFER

CROSS-REFERENCE TO RELATED APPLICATION

This application claims the benefit of U.S. Provisional Patent Application No. 63/223,477, filed Jul. 19, 2021. The disclosure of this application is incorporated by reference herein in its entirety.

BACKGROUND

As user devices have developed, the operations that may be performed by the user devices have expanded. Many of these operations benefit from the ability to transfer data between the user devices. Accordingly, the user devices have developed to allow the transfer of data to and from the user devices.

BRIEF SUMMARY

The approaches described herein may allow a user to utilize a data originating device associated with a first account to complete a data transfer with a data receiving device associated with a second account. In particular, a data transfer from the data originating device to a data receiving device may be initiated by positioning an electronic element of the data originating device within a proximity of a data receiving device. The data originating device and the data receiving device may communicate to enable display of a user input field for completing the data transfer on the data originating device. The user input field is configured to receive a user input including value data on the data originating device and may provide the value data to the receiving device for completion of the data transfer. In some instances, completion of the data transfer occurs on a second communication channel established between the devices for secure exchange of the data value between the devices.

In some embodiments, a method may include detecting on a first communication channel, by a data receiving device, an initiation of a data transfer with a data originating device. The method may further include providing on the first communication channel, by the data receiving device to the data originating device, an indication that the data receiving device supports a communication handover on a second communication channel for the data transfer and determining, by the data receiving device, that the data originating device supports the communication handover on the second communication channel based at least in part on an indication that the data originating device supports the communication handover on the second communication channel received on the first communication channel. The method may further include determining, by the data receiving device, a value data based on an indication of the value data received on the second communication channel, determining, by the data receiving device, a transfer value for the data transfer based at least in part on the value data, and completing, by the data receiving device, the data transfer with the transfer value.

In some embodiments, a method may include detecting, by a data receiving device, an initiation of a data transfer with a data originating device based on a first time that the data originating device has entered a proximity of the data receiving device. The method may further include providing, by the data receiving device to the data originating device, an indication that the data receiving device supports a double tap data transfer and determining, by the data receiving device, that the data originating device supports the double tap data transfer based at least in part on an indication that the data originating device supports the double tap data transfer received from the data originating device. The method may further include determining, by the data receiving device, a value data based on an indication of the value data received from the data originating device during a second time that the data originating device has entered the proximity of the data receiving device, determining, by the data receiving device, a transfer value for the data transfer based at least in part on the value data, and completing, by the data receiving device, the data transfer with the transfer value.

In some embodiments, a method may include determining, by a data originating device based at least in part on an indication received on a first communication channel, that a data receiving device supports a communication handover on a second communication channel for a data transfer. The method may further include providing on the first communication channel, by the data originating device to the data receiving device, an indication that the data originating device supports the communication handover on the second communication channel, and providing, by the data originating device to the data receiving device, an indication of a value data on the second communication channel, the value data to be utilized for completion of the data transfer with a transfer value based at least in part on the value data.

In some embodiments, a method may include determining, by a data originating device, that a data receiving device supports a double tap data transfer based at least in part on an indication that the data receiving device supports the double tap data transfer received from the data receiving device during a first time that the data originating device has entered a proximity of the data receiving device. The method may include providing, by the data originating device, an indication that the data originating device supports the double tap data transfer, and providing, by the data originating device to the data receiving device, an indication of a value data during a second time that the data originating device has entered the proximity of the data receiving device.

BRIEF DESCRIPTION OF THE DRAWINGS

FIG. 11 illustrates example tags for a fourth byte according to some embodiments.

FIG. 12 illustrates example bit arrangements for the fifth tag in accordance with some embodiments.

FIG. 13 illustrates example codes for a VAS frame in accordance with some embodiments.

FIG. 14 illustrates example tags for a VAS frame in accordance with some embodiments.

FIG. 15 illustrates example tags for a VAS frame in accordance with some embodiments.

DETAILED DESCRIPTION

Systems, computer-readable media, methods, and approaches described throughout this disclosure may provide establishment of a second communication channel between a data receiving device and a data originating device and/or may provide for user input at the data originating device for a data transfer. A user may be able to interact with the data originating device during the data transfer to complete the data transfer with the data receiving device. For example, the data originating device may display a tip amount input field on a display of the user device and receive a user input of a tip amount related to the data transfer. The data originating device may provide an indication of the tip amount to the data receiving device for the data receiving device to complete the data transfer.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

I. User Input Field Display

The approaches described herein may include display of a user input field on a data originating device for completing a data transfer with a data receiving device. The data transfer may be initiated based on the data originating device being positioned within a proximity of the data receiving device. The data originating device may display the user input field on a display the data originating device, where the data originating device may receive a value data within the user input field. The data originating device may provide an indication of the value data to the data receiving device for completion of the data transfer. In some embodiments, a second communication channel may be established between the data originating device and the data receiving device for communication between the data originating device and the data receiving device, including transmission of the indication of the value data to the data receiving device.

Figure 1:
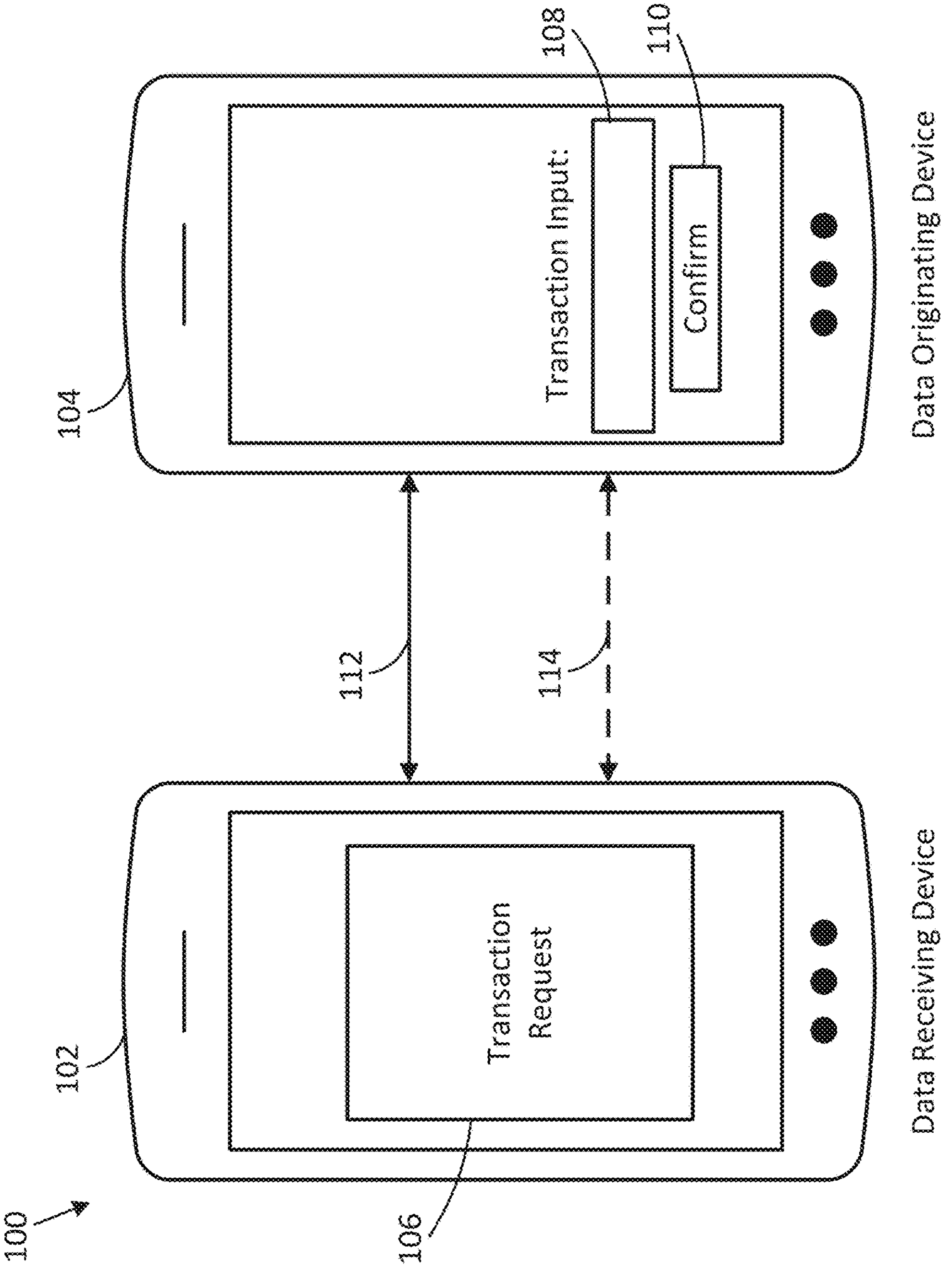
FIG. 1 illustrates an example data transfer display arrangement in accordance with some embodiments.

FIG. 1 illustrates an example data transfer display arrangement 100 in accordance with some embodiments. In particular, the data transfer display arrangement 100 displays a data receiving device 102 and a data originating device 104 with example displays in accordance with some embodiments. In some instances, the data receiving device 102 may comprise a merchant device and the data originating device may comprise a customer device.

In the illustrated instance, the data receiving device 102 and the data originating device 104 may be involved in a data transfer. The data transfer may be for a good and/or service provided by a first user associated with the data receiving device 102 being acquired by a second user associated with the data originating device 104. The data receiving device 102 may have entered information related to the data transfer, such as a value of the data transfer. The data receiving device 102 may display a data transfer request 106 that requests interaction of an electronic element, the electronic element being associated with an account for completing the data transfer. The data receiving device 102 may begin sensing for the electronic element in response to the entry of information at the data receiving device 102 related to the data transfer. The data originating device 104 may be associated with an account and may act as an electronic element. The data receiving device 102 may detect when the data originating device 104 is moved within a proximity of the data receiving device 102 and the data transfer between the data receiving device 102 and the data originating device 104 may be initiated based on the detection, by the data receiving device 102, of the data originating device 104 being within the proximity of the data receiving device 102.

As part of the data transfer, the data originating device 104 may display a user input field 108 for user input of information for the data transfer. For example, the data receiving device 102 may cause the data originating device 104 to display the user input field 108 on a display of the data originating device 104 as part of the data transfer. The data receiving device 102 may provide a transmission to the data originating device 104, wherein the transmission causes the data originating device 104 to display the user input field 108. The data receiving device 102 may provide the transmission to the data originating device 104 via a first communication channel or a second communication channel, where the first communication channel may implement near field communication (NFC) and the second communication channel may implement a different communication protocol than the NFC, such as Wi-Fi, ultra-wideband, Bluetooth, or another wireless communication protocol. In some embodiments, the second communication channel may be established via a network (e.g., wide area and/or public), such as the Internet. The transmission provided by the data receiving device 102 may indicate the user input field 108 to be displayed on the data originating device 104 and/or include information for the user input field 108 to be displayed on the data originating device 104.

The data originating device 104 may detect a user input within the user input field 108. In particular, the data originating device 104 may detect a user input provided within the user input field 108 by a user of the data originating device 104. In some embodiments, the data originating device 104 may further detect an indication that the user has completed entering the user input into the user input field 108, such as the data originating device 104 detecting that the user has clicked a confirm button 110 in the illustrated embodiment. The data originating device 104 may determine a value data of the user input field 108 based on the user input. The data originating device 104 may transmit an indication of the value data to the data receiving device 102 for completion of the data transfer. For example, the data originating device 104 may transmit the indication of the value data via the NFC or the second communication channel. The data receiving device 102 may complete the data transfer in accordance with the value data provided by the data originating device 104.

The data receiving device 102 and the data originating device 104 may establish one or more communication channels between the data receiving device 102 and the data originating device 104 for performance of the data transfer. The data receiving device 102 and the data originating device 104 may exchange communications via the communication channels to perform the operations to complete the data transfer. In the illustrated embodiment, a first communication channel 112 and a second communication channel 114 are shown established between the data receiving device 102 and the data originating device 104. The first communication channel 112 and the second communication channel 114 may be established in accordance with the establishment of first communication channels and second communication channels, respectively, described throughout this disclosure. In some embodiments, the second communication channel 114 may comprise a secure channel. The secure channel may implement different security than the first communication channel 112. In some embodiments, the second communication channel 114 may be omitted. Procedures related to the data transfer and display of the user input field 108 are described further throughout this disclosure.

II. Single Tap Approach

In some embodiments, a procedure for performing a data transfer may be performed using a single tap between a data receiving device (such as the data receiving device 102 (FIG. 1)) and a data originating device (such as the data originating device 104 (FIG. 1)). The single tap approach may provide for a user input field being displayed on a display of the data originating device as part of the data transfer. In some embodiments, the data receiving device may be functioning as a point of sale (POS) device and the data originating device may be functioning as a near field communication (NFC) payment device in the data transfer. A value data input by a user of the data originating device into the user input field may be utilized for completing the data transfer. The single tap approach may further provide for establishment of a second communication channel between the data receiving device and the data originating device. For example, the single tap approach may support communication handover on the second communication channel for the data transfer. The second communication channel may be utilized for transmission of communications between the data receiving device and the data originating device related to the data transfer, such as transmission of communications related to the user input field.

Figure 2A:
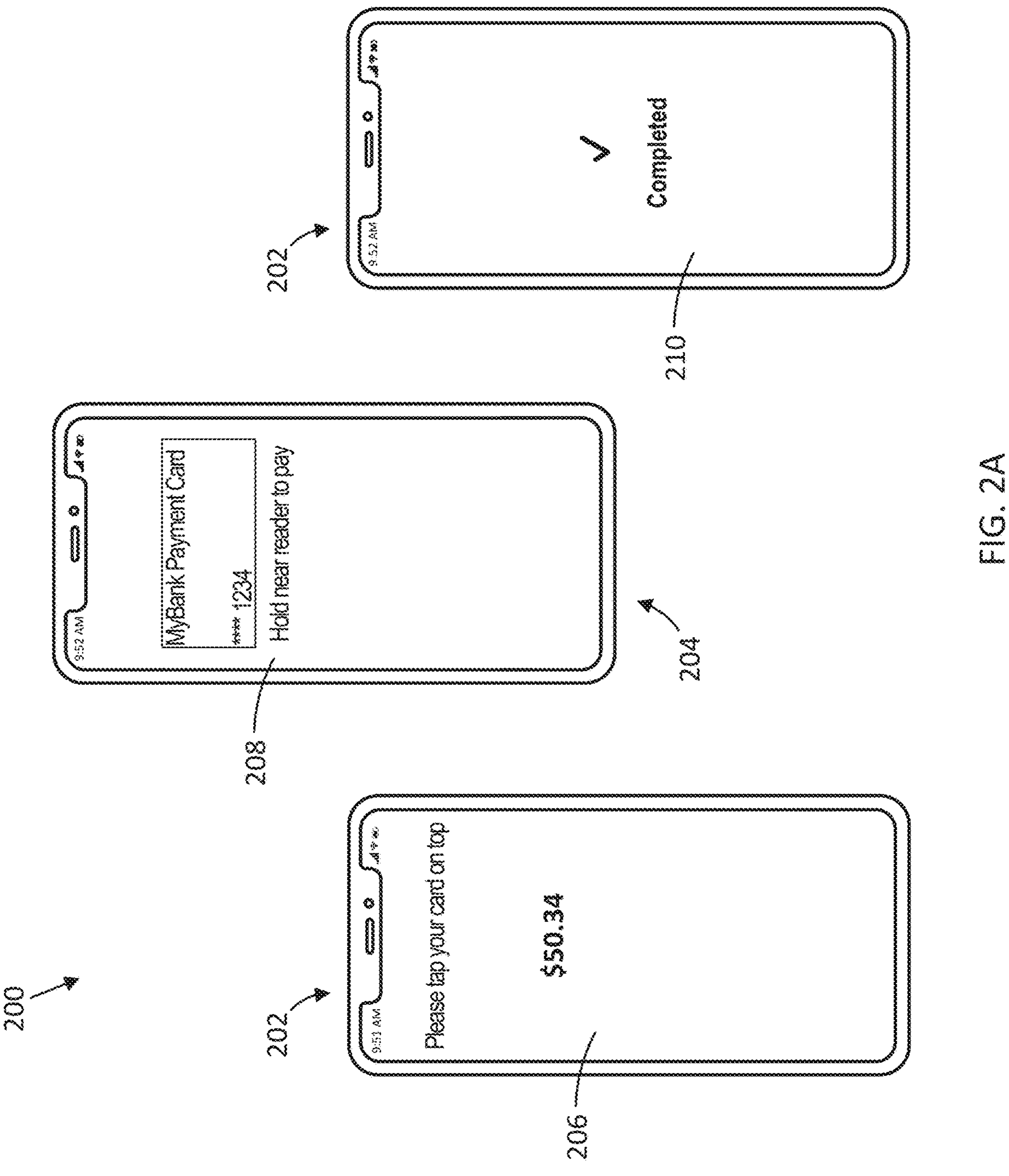
FIG. 2A illustrates a first portion of an example device display sequence for a single tap approach in accordance with some embodiments.
Figure 2B:
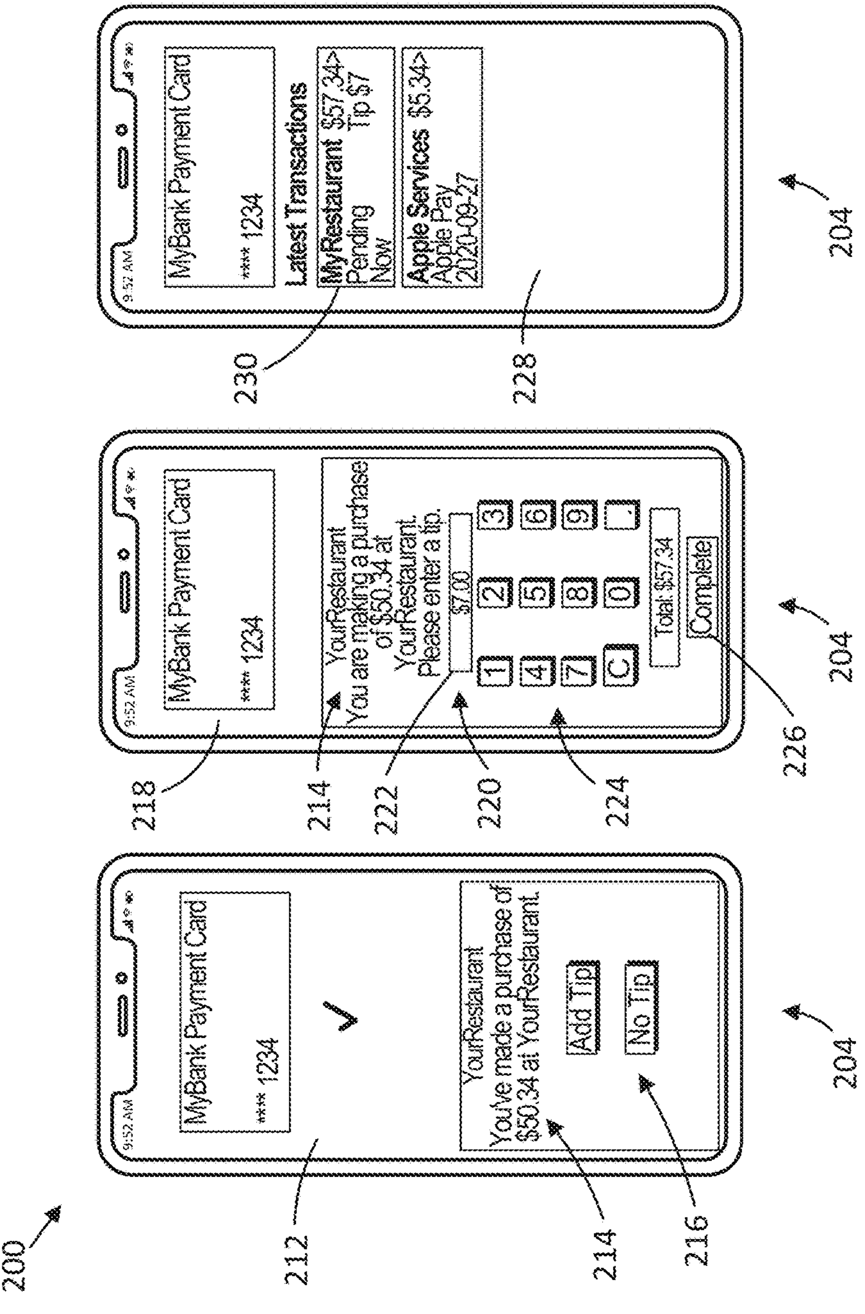
FIG. 2B illustrates a second portion of the example device display sequence for the single tap approach in accordance with some embodiments.
Figure 2C:
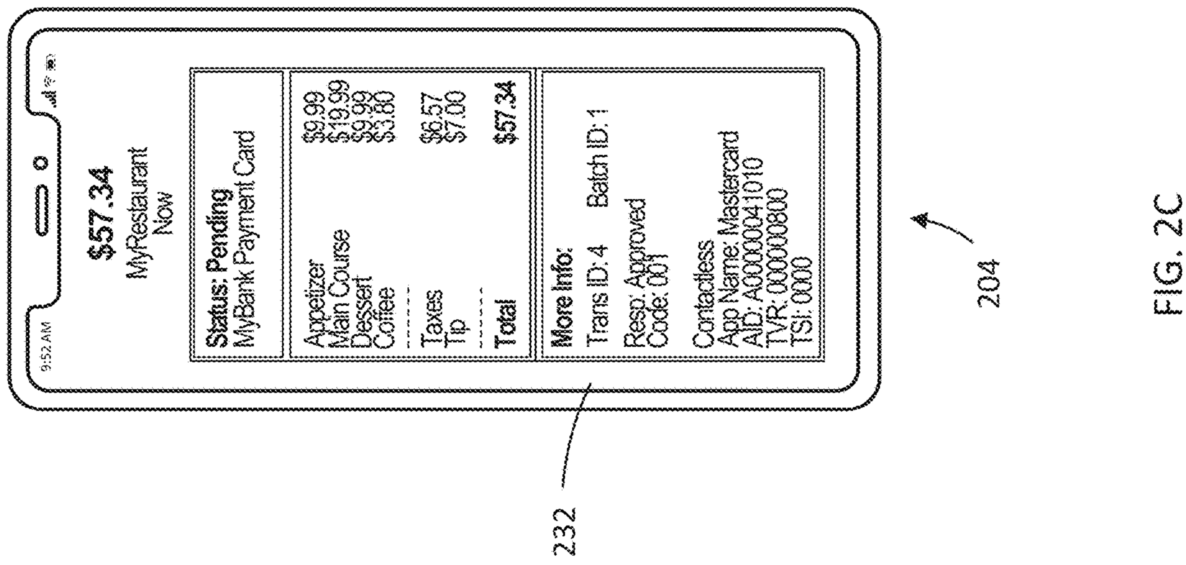
FIG. 2C illustrates a third portion of the example device display sequence for the single tap approach in accordance with some embodiments.
Figure 3A:
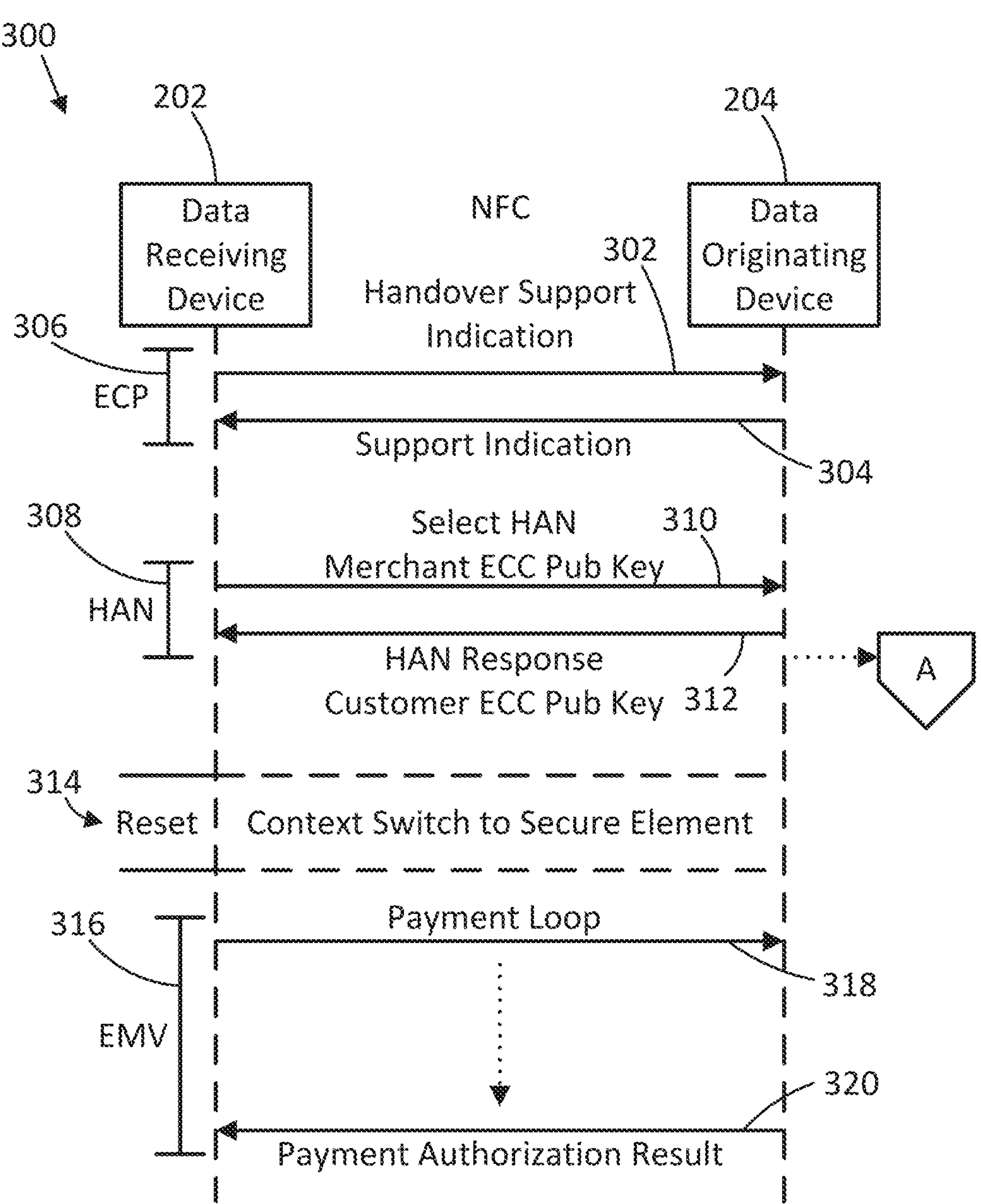
FIG. 3A illustrates an example first communication channel signal flow for the single tap approach in accordance with some embodiments.
Figure 3B:
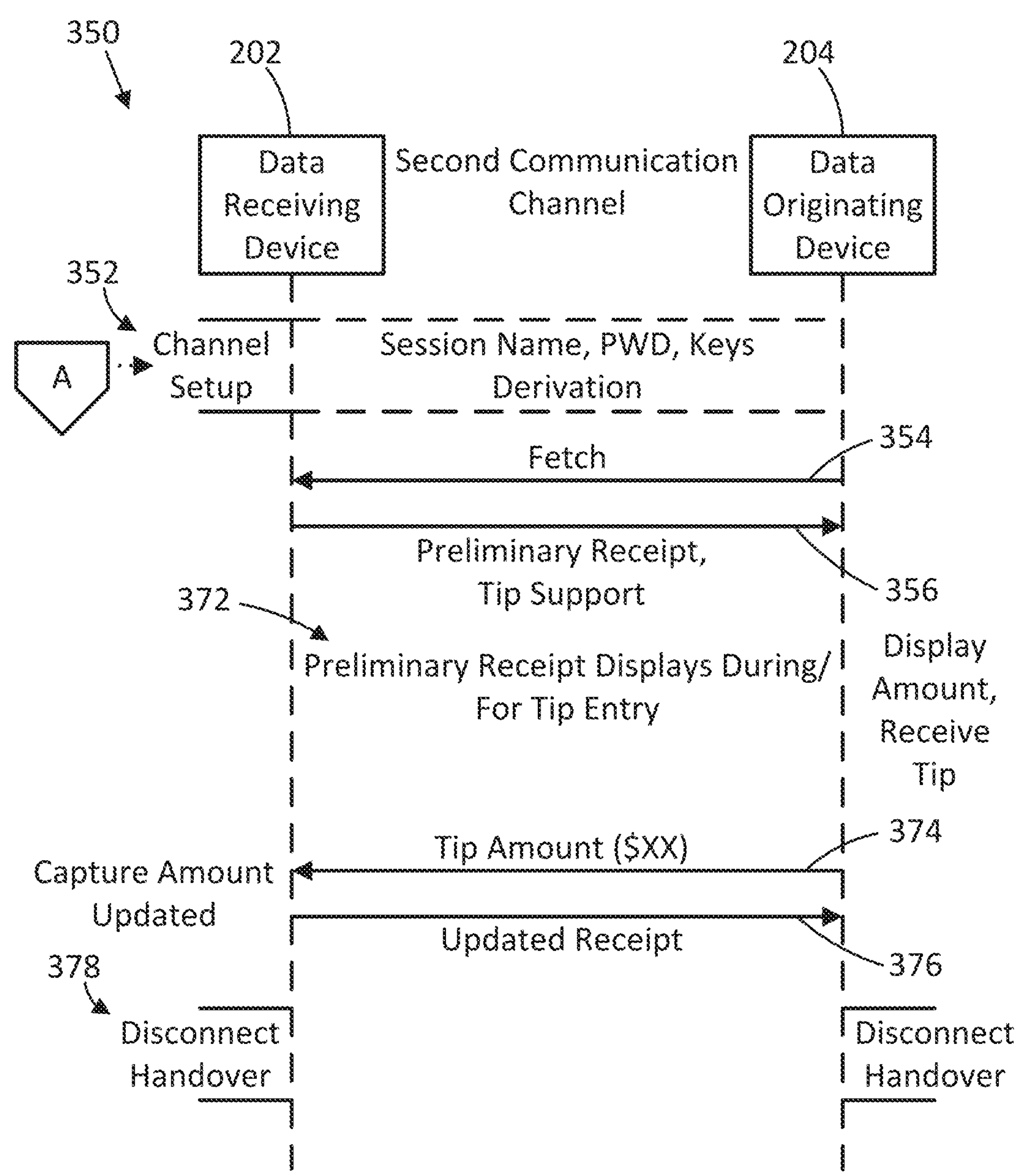
FIG. 3B illustrates an example second communication channel signal flow in accordance with some embodiments.

FIG. 2A illustrates a first portion of an example device display sequence 200 for a single tap approach in accordance with some embodiments, FIG. 2B illustrates a second portion of the example device display sequence 200 for the single tap approach in accordance with some embodiments, and FIG. 2C illustrates a third portion of the example device display sequence 200 for the single tap approach in accordance with some embodiments. The device display sequence 200 illustrates a sequence of displays that may be displayed on a data receiving device 202 and a data originating device 204 during a data transfer with a single tap approach. The data receiving device 202 may host the data transfer and may be associated with a first user. The data originating device 204 may be associated with a second user in the data transfer. FIG. 3A illustrates an example first communication channel signal flow 300 for the single tap approach in accordance with some embodiments and FIG. 3B illustrates an example second communication channel signal flow 350 in accordance with some embodiments. The first communication channel signal flow 300 may establish the second communication channel (such as the second communication channel 114 (FIG. 1)) for the second communication channel signal flow 350 as described further below. The first communication channel signal flow 300 and the second communication channel signal flow 350 may cause the displays, or a portion thereof, to be displayed on the devices in the device display sequence 200 as described further below.

At a beginning of the data transfer, a user of the data receiving device 202 may input a value for the data transfer. The value may be a value that the user of the data receiving device 202 is charging for one or more goods and/or services that have been provided to or will be provided to a user of the data originating device 204. The data receiving device 202 may display an electronic element request interface 206 on a display of the data receiving device 202 based on the user inputting the value for the data transfer. In particular, the data receiving device 202 may detect the input of the value and may display the electronic element request interface 206 in response to the data receiving device 202 detecting the input of the value. The electronic element request interface 206 may request an electronic element be positioned within a proximity of the data receiving device 202. For example, the electronic element request interface 206 recites "Please tap your card on top" in the illustrated embodiment. The electronic element may be associated with an account of a user of the data originating device 204, where the value is transferred from the account of the user of the data originating device 204 to an account associated with a user of the data receiving device 202 for the data transfer. In some instances, the electronic element may comprise a proximity integrated circuit card (PICC). The PICC may comprise the data originating device 204 in some embodiments. The electronic element request interface 206 may further display the value due in some embodiments. The data receiving device 202 may monitor for the electronic element being positioned within the proximity of the data receiving device 202 after the user has input the value into the data receiving device 202. In some embodiments, the data receiving device 202 may monitor for the electronic element while the electronic element request interface 206 is being displayed. The data receiving device 202 may monitor for the electronic element by transmitting a signal one or more times and waiting for a response from an electronic element.

The data originating device 204 may operate as an electronic element for the data transfer with the data receiving device 202. For example, the data originating device 204 may be associated with an account of the user of the data originating device 204 that may transfer the value to an account associated with the data receiving device 202. In some embodiments, the data receiving device 202 may be functioning as a POS device and the data originating device 204 may be functioning as a NFC payment device. The data originating device 204 may display an electronic element interface 208 to indicate that the data originating device 204 is operating as an electronic element. In some embodiments, the data originating device 204 may begin operating as an electronic element based on a user interaction with the data originating device 204 indicating that the data originating device 204 is to be operating as an electronic element, or the data originating device 204 being moved within the proximity of the data receiving device 202 while the data receiving device 202 is monitoring for the electronic element. The proximity may be defined by a communication protocol for the communication between the data receiving device 202 and the data originating device 204. For example, the data receiving device 202 may utilize a first communication channel to transmit the signal during monitoring for the electronic element and the data originating device 204 may respond via the first communication channel. The first communication channel may implement NFC. The first communication channel that implements NFC may have a proximity of 20 cm or less, where the data receiving device 202 and the data originating device 204 are to be within 20 cm or less of each other to communicate via the first communication channel. When located within the proximity of the data receiving device 202, the data originating device 204 may detect the signal transmitted by the data receiving device 202 when monitoring for the electronic element and the data originating device 204 may respond as the electronic element.

The data receiving device 202 may detect the response from the data originating device 204 and detect that the data originating device 204 has entered the proximity of the data receiving device 202. Further, the data receiving device 202 may detect an initiation of the data transfer based on the data receiving device 202 detecting that the data originating device 204 has entered the proximity of the data receiving device 202. In some embodiments, the data receiving device 202 may display an electronic element complete interface 210 that indicates the data receiving device 202 has detected the electronic element, which is the data originating device 204 in this instance. In other embodiments, the data receiving device 202 may display the electronic element complete interface 210 later in the data transfer procedure.

The data receiving device 202 may further transmit a handover support indication 302 to the data originating device 204 in response to detection of the data originating device 204 being within the proximity of the data receiving device 202. The data receiving device 202 may transmit the handover support indication 302 via a first communication channel, which is via NFC in the illustrated embodiment. The handover support indication 302 transmitted by the data receiving device 202 may indicate that the data receiving device 202 supports communication handover to a second communication channel for at least a part of the data transfer. In some embodiments, the handover support indication 302 may further indicate services, such as tipping, that the data receiving device 202 supports being performed via the second communication channel.

The data originating device 204 may detect the handover support indication 302 received from the data receiving device 202. In response to detecting the handover support indication 302, the data originating device 204 may respond with a support indication 304. The data originating device 204 may transmit the support indication 304 via the first communication channel. The support indication 304 may indicate whether the data originating device 204 supports the communication handover to the second communication channel. In some embodiments, the support indication 304 may further indicate whether the data originating device 204 supports the services via the second communication channel indicated as being supported in the handover support indication 302. The handover support indication 302 and the support indication 304 may be part of an enhanced contactless polling (ECP) procedure 306. The ECP procedure 306 may be utilized to determine whether both the data receiving device 202 and the data originating device 204 support the second communication channel. If one or both of the data receiving device 202 and the data originating device 204 do not support the second communication channel, the data transfer may proceed without establishing the second communication channel. If both of the data receiving device 202 and the data originating device 204 indicate that the second communication channel is supported, the second communication channel may be established as part of the data transfer.

The data receiving device 202 may detect the support indication 304 received from the data originating device 204. The data receiving device 202 may determine, based on the support indication 304, whether the data receiving device 202 and the data originating device 204 both support the second communication channel. In some embodiments, the data receiving device 202 may further determine, based on the support indication 304, which of the services both the data receiving device 202 and the data originating device 204 support being performed via the second communication channel. In response to the data receiving device 202 determining that both the data receiving device 202 and the data originating device 204 support communication handover to the second communication channel, the data receiving device 202 may initiate a handover procedure 308. The handover procedure 308 may be utilized to establish a second communication channel between the data receiving device 202 and the data originating device 204.

The data receiving device 202 may transmit a selection handover message 310 to the data originating device 204 as part of the handover procedure 308. The selection handover message 310 may indicate an application selected for establishing the second communication channel. The selection handover message 310 may include a first elliptic curve cryptography (ECC) key to be utilized for establishing the second communication channel. In some embodiments, the first ECC key may comprise a merchant ECC key. The first ECC key may comprise a public key in some embodiments. The selection handover message 310 may further indicate a communication protocol for the second communication channel, where the communication protocol may be a different communication protocol from NFC. For example, the selection handover message 310 may indicate that the second communication channel is to implement Wi-Fi, ultra-wideband, Bluetooth, or another wireless communication protocol other than NFC. In other embodiments, the communication protocol may be predefined for the second communication channel and the selection handover message 310 may omit the indication of the communication protocol. In some embodiments, the second communication channel may be established via a wide area and/or public network, such as the Internet. In these embodiments, the selection handover message 310 may include an indication of a network construct (such as an internet protocol (IP) address) that may be utilized for the second communication channel. In some embodiments, the second communication channel may implement different security from the first communication channel. For example, the communication protocol implemented by the second communication channel may provide different security from the communication protocol implemented by the first communication channel. Further, the second communication channel may be referred to as a secure channel in some instances.

The data originating device 204 may detect the selection handover message 310 received from the data receiving device 202. In response to detecting the selection handover message 310, the data originating device 204 may transmit a handover response message 312 to the data receiving device 202. The handover response message 312 may include a second ECC key to be utilized for establishing the second communication channel. The second ECC key may be a customer ECC key in some embodiments. In some embodiments, the second ECC key may comprise a public key. The handover response message 312 may acknowledge indication of the application selected for establishing the second communication channel and may indicate approval of establishing the second communication channel via the application. Further, the handover response message 312 may indicate approval of the communication protocol indicated in the selection handover message 310 in some embodiments.

The data receiving device 202 and the data originating device 204 may transition to the second communication channel to establish the second communication channel between the data receiving device 202 and the data originating device 204. For example, the data receiving device 202 and the data originating device 204 may enter a channel setup procedure 352 to establish the second communication channel, as shown in FIG. 3B. In particular, the procedures of the data transfer performed via the second communication channel may be illustrated via the second communication channel signal flow 350. The data receiving device 202 and the data originating device 204 may utilize the first ECC key from the selection handover message 310 and/or the second ECC key from the handover response message 312 to establish the second communication channel. For example, the data receiving device 202 and/or the data originating device 204 may derive information from the first ECC key and/or the second ECC key to establish the second communication channel. In some embodiments, the second communication channel may be established between the data receiving device 202 and the data originating device 204 based further on a session name for the second communication channel, a password for the second communication channel, or some combination thereof. The data receiving device 202 and the data originating device 204 may exchange one or more messages via the second communication channel to establish the second communication channel.

Establishing the second communication channel may further include setting up the communication protocol for the second communication channel. The communication protocol for the second communication channel may be a different communication protocol from the NFC of the first communication channel. In some embodiments, the communication protocol may be the communication protocol defined in the selection handover message 310. The communication protocol for the second communication channel may be Wi-Fi, ultra-wideband, Bluetooth, or another wireless communication protocol. The communication protocol for the second communication channel may provide communication over a greater distance than the NFC utilized for the first communication channel. For example, the NFC may provide for proximity of 20 cm in which the data receiving device 202 and the data originating device 204 may communicate, whereas the communication protocol for the second communication channel may provide a proximity of greater than 20 cm in which the data receiving device 202 and the data originating device 204 may communicate. In some embodiments, the communication protocol for the second communication channel may be Wi-Fi, where the Wi-Fi may provide communication between the data receiving device 202 and the data originating device 204 up to 300 feet in some instances.

Establishing the second communication channel may further include setting up security for the second communication channel. For example, transmissions between the data receiving device 202 and the data originating device 204 via the second communication channel may be encrypted. An encryption for the transmissions may be determined based on the first ECC key, the second ECC key, or some combination thereof. The encryption of the transmissions via the second communication channel may protect the communications transmitted between the data receiving device 202 and the data originating device 204. In some embodiments, the second communication channel may implement different security than the first communication channel. For example, the security of second communication channel may provide greater security than the first communication channel in some embodiments. The second communication channel may be referred to as a secure channel in some embodiments.

Once the second communication channel has been established, the data originating device 204 may transmit a fetch message 354 to the data receiving device 202 via the second communication channel. The fetch message 354 may request a service from the data receiving device 202. In the illustrated embodiment, the fetch message 354 may request preliminary receipt data from the data receiving device 202 for the data transfer. The preliminary receipt data may include a preliminary receipt in some embodiments. In some embodiments, the fetch message 354 may further provide information regarding the account associated with the user of the data originating device 204.

The data receiving device 202 may detect the fetch message 354 received from the data originating device 204. The data receiving device 202 may respond to the fetch message 354 with a service response message 356 via the second communication channel. The service response message 356 may provide the service requested by the fetch message 354. For example, the service response message 356 may include the preliminary receipt data for the data transfer. The data receiving device 202 may generate the preliminary receipt data based on the value of the data transfer. The service response message 356 may further include an indication of a user input field to be displayed on a display of the data originating device 204. In the illustrated embodiment, the service response message 356 includes a tip support indication, which may indicate that a user input field, or a plurality of user input fields, associated with a value data that may be entered by a user of the data originating device 204. The user input fields may comprise one or more button inputs, bubble inputs, slider inputs, text field inputs, other user input fields, or some combination thereof. The service response message 356 may cause the data originating device 204 to provide the service and/or display the user input field. For example, the data originating device 204 may display the preliminary receipt and/or the user input fields, or the plurality of user input fields, in response to detecting the service response message 356 in the illustrated embodiment.

In response to detecting the service response message 356, a display procedure 372 may be initiated. In particular, the data originating device 204 may display a first preliminary receipt interface 212 in response to detecting the fetch message 354 in the illustrated embodiment, as illustrated in FIG. 2B. The first preliminary receipt interface 212 may be displayed on a display of the data originating device 204. The first preliminary receipt interface 212 may include a preliminary receipt 214. The preliminary receipt 214 may be included in or generated based at least in part of the preliminary receipt data. The preliminary receipt 214 may include an indication of an initial value of the data transfer. The initial value may be a value of the data transfer without any tipping included. The initial value may be referred to as a preliminary receipt value. The first preliminary receipt interface 212 may further include a first user input field 216. In the illustrated embodiment, the first user input field 216 comprises two buttons that allow a user of the data originating device 204 to indicate whether a value data is to be added to the data transfer. In some embodiments, the value data may be a tip for the data transfer. In particular, the first user input field 216 includes an "Add Tip" button and a "No Tip" button in the illustrated embodiment. The data originating device 204 may detect an interaction with the first user input field 216 from a user of the data originating device 204 to determine whether the user would like to add a value data to the data transfer. The data originating device 204 may determine that the user would like to add a value data based on a detected user interaction with the "Add Tip" button and may determine that the user would not like to add a value data based on a detected user interaction with the "No Tip" button in the illustrated embodiment.

The data originating device 204 may display a second preliminary receipt interface 218 in response to the data originating device determining that the user would like to add a value data to the data transfer. For example, the data originating device 204 may display the second preliminary receipt interface 218. The second preliminary receipt interface 218 may include the preliminary receipt 214 or a modified version of the preliminary receipt 214. For example, the second preliminary receipt interface 218 includes an indication of the initial value of the data transfer in the illustrated embodiment. The second preliminary receipt interface 218 may further include a second user input field 220. The second user input field 220 may comprise a text input 222 that provides for input of a value data by a user of the data originating device 204, where the value data may be a tip amount. In the illustrated embodiment, the second user input field 220 further includes a plurality of buttons 224 (including number buttons, a decimal point button, and a clear button) for inputting the value data into the text input 222. The second user input field 220 may further include an entry button 226 (labeled with "Complete" in the illustrated embodiment) that a user of the data originating device 204 may utilize to indicate that the value data has been entered in the text input 222. In particular, the data originating device 204 may detect a user interaction with the entry button 226 and may determine that the value data has been entered based on detecting the user interaction with the entry button 226.

In some embodiments, the first preliminary receipt interface 212 and/or the second preliminary receipt interface 218 may be provided within the service response message 356. For example, the service response message 356 may include data to define the first preliminary receipt interface 212 and/or the second preliminary receipt interface 218 to be displayed on the data originating device 204. In some embodiments, the first preliminary receipt interface 212 and/or the second preliminary receipt interface 218 may be stored on the data originating device 204 and the service response message 356 may indicate that the data originating device 204 is to display the first preliminary receipt interface 212 and/or the second preliminary receipt interface 218. The service response message 356 may include information to be displayed within the first preliminary receipt interface 212 and/or the second preliminary receipt interface 218, such as the preliminary receipt 214 and/or the value to be included in the preliminary receipt 214.

While one example of preliminary receipt interfaces and user input fields are described above, it should be understood that other preliminary receipt interfaces and/or other user input fields may be displayed in other embodiments. For example, the first preliminary receipt interface 212 may be omitted and the second preliminary receipt interface 218 may be displayed in response to detecting the fetch message 354 in some embodiments. Further, different versions of the preliminary receipts and/or user input fields may be displayed in other embodiments.

Based on the entry of the value data, the data originating device 204 may transmit an indication of the value data to the data receiving device 202 via the second communication channel. In particular, the data originating device 204 may transmit a value data message 374 to the data receiving device 202 in response to the user interaction with the entry button 226 indicating that the user has entered a value data in the text input 222. The value data message 374 may include an indication of the value data entered by the user of the data originating device 204 in the text input 222 displayed on the display of the data originating device 204.

The data receiving device 202 may detect the value data message 374 received from the data originating device 204. Further, the data receiving device 202 may determine the value data from the indication of the value data from the value data message 374. The data receiving device 202 may generate an updated receipt in accordance with the value data. For example, the data receiving device 202 may add the value data (which may be a tip amount) to the initial value of the data transfer to produce a transfer value for the data transfer. The updated receipt may include the transfer value for the data transfer. The data receiving device 202 may transmit an updated receipt message 376 to the data originating device 204 via the second communication channel. The updated receipt message 376 may include an indication of the updated receipt including the transfer value for the data transfer.

The data originating device 204 may detect the updated receipt message 376 received from the data receiving device 202. The data originating device 204 may extract the updated receipt and/or the transfer value for the data transfer from the updated receipt message 376. The data originating device 204 may further display the extracted updated receipt and/or the transfer value for the data transfer, and/or store the extracted updated receipt and/or the transfer value for the data transfer within a receipt store of the data originating device 204. For example, the data originating device 204 may implement a wallet application, where the updated receipt and/or the transfer value for the data transfer may be stored as an entry within the wallet application. The data originating device 204 may display a data transfer list interface 228 of the wallet application that lists the entries within the wallet application. The data transfer list interface 228 may include an entry 230 corresponding to the updated receipt, where the entry 230 may display a portion of the information from the updated receipt on the data originating device 204.

The data originating device 204 may detect a user interaction with the entry 230 within the data transfer list interface 228. In response to the detection of the user interaction with the entry 230, the data originating device 204 may display a detailed receipt interface 232 associated with the updated receipt. The detailed receipt interface 232 may display details of the updated receipt. The details of the updated receipt displayed in the detailed receipt interface 232 may include an indication of a user of the data receiving device 202 (such as a merchant) associated with the data transfer, an indication of the account of the user of the data originating device 204 utilized for the data transfer, information associated with the account, itemized goods and/or services of the data transfer, the value data input by the user as part of the data transfer (such as the value data from the text input 222 (FIG. 2B)), any additional amounts associated with the data transfer (such as taxes), the transfer value from the updated receipt, or some combination thereof.

The data receiving device 202 and the data originating device 204 may terminate the second communication channel after the operations to be performed via the second communication channel for the data transfer have been completed. For example, the data receiving device 202 and the data originating device 204 may perform a disconnection operation 378 after the updated receipt message 376 has been transmitted in the illustrated embodiment. The disconnection operation 378 may result in the secure channel between the data receiving device 202 and the data originating device 204 being terminated.

The first communication channel signal flow 300 may proceed with a reset operation 314. In particular, the data receiving device 202 and the data originating device 204 may perform a reset operation 314 for the first communication channel. The reset operation 314 may result in a context switch to a secure element of the data receiving device 202. For example, the operations performed via the first communication channel between the data receiving device 202 and the data originating device 204 prior to the reset operation 314 may be performed via one or more processors of the data receiving device 202. The operations performed via the first communication channel between the data receiving device 202 and the data originating device 204 after the reset operation 314 may be performed via the secure element of the data receiving device 202. The secure element may implement a security level that protects sensitive data associated with the accounts of the user of the data receiving device 202 and the user of the data originating device 204. The security level of the secure element may be in accordance with a defined security level for Europay, MasterCard, and Visa (EMV) data transfers. The secure element may prevent the sensitive data from being shared with the processors of the data receiving device 202, thereby providing a high level of protection for the sensitive data. In some embodiments, the secure element may establish a connection with the data originating device 204. Further, the secure element may establish a secure connection with a payment service provider (PSP) server to complete the data transfer. The operations performed after the reset operation may be performed via the first communication channel, the connection of the secure element with the data originating device 204, the secure connection with the PSP server, or some combination thereof.

Once the reset operation 314 has been completed, the data receiving device 202 and the data originating device 204 may perform an EMV operation 316. The EMV operation 316 may result in the value being transferred from the account associated with the user of the data originating device 204 (which may be a customer) to the account associated with the user of the data receiving device 202 (which may be a merchant).

The EMV operation 316 may initiate with a payment loop 318 between the data receiving device 202 and the data originating device 204. The payment loop 318 may be performed with the initial value of the preliminary receipt prior to taking into account the value data (such as the value data from the text input 222). For example, the payment loop 318 may utilize the initial value for the data transfer before the value data is added to the initial value for the data transfer. The payment loop 318 may include exchanging information between the data receiving device 202 and the data originating device 204 via the first communication channel, exchanging information between the data receiving device 202 and the data originating device 204 via the connection established by the secure element, exchanging information with the PSP server, or some combination thereof.

The EMV operation 316 may further have a payment authorization result 320. The payment authorization result 320 may take into account the value data (such as the value data from the text input 222). For example, the payment authorization result 320 may utilize the transfer value included in the updated receipt, which may include the initial value of the data transfer plus the value data. The payment authorization result 320 may result in the transfer of the transfer value from the account associated with the user of the data originating device 204 to the account associated with the user of the data receiving device 202. For example, the data receiving device 202 may utilize information associated with the payment authorization result 320 (such as the updated value) to complete the data transfer with PSPs associated with the account of the user of the data receiving device 202 and the account of the user of the data originating device 204. In particular, the data receiving device 202 may communicate with a PSP server associated with the user of the data receiving device 202 to complete the data transfer. For example, the data receiving device 202 may communicate with the PSP server to complete the data transfer in accordance with the value data received from the data originating device 204. The data receiving device 202 may communicate with the PSP server to have the value transferred from the account of the user of the data originating device 204 to the account of the user of the data receiving device 202. In some embodiments, the second communication channel may be terminated based on the completion of the data transfer.

Portions of the reset operation 314 and the EMV operation 316 may be performed concurrently with the establishment of the second communication channel and/or the operations performed via the second communication channel. For example, the reset operation 314 and/or the payment loop 318 may be performed concurrently with the establishment of the second communication channel and/or the operations performed via the second communication channel in some instances. The payment authorization result 320 of the EMV operation 316 may be performed after the value data is provided to the data receiving device 202 via the value data message 374. The completion of the EMV operation 316 may result in the completion of the data transfer in accordance with the value data received from the data originating device 204. For example, the data transfer may be completed with the transfer value.

III. Second Communication Channel

In some embodiments disclosed herein, a procedure for performing a data transfer between a data receiving device (such as the data receiving device 102 (FIG. 1)) and a data originating device (such as the data originating device 104 (FIG. 1)) may include establishing a second communication channel between the data receiving device and the data originating device and utilizing the second communication channel for transmission of a portion of the communications between the data receiving device and the data originating device for performing the data transfer. For example, the data receiving device and the data originating device may initiate the data transfer via a first communication channel and establish a separate second communication channel for transmission of communications between the data receiving device and the data originating device.

The first communication channel may implement a first communication protocol and the second communication channel may implement a second communication protocol that is different from the first communication protocol. For example, the first communication channel may implement NFC and the second communication channel may implement a communication protocol other than NFC (such as Wi-Fi, ultra-wideband, Bluetooth, or another wireless communication protocol other than NFC) in some embodiments. In some embodiments, the second communication channel may be established via a public and/or wide area network, such as the Internet. The communication protocol of the second communication channel may allow for communication between the data receiving device and the data originating device within a proximity that is larger than the proximity in which the communication protocol of the first communication channel may allow communication between the data receiving device and the data originating device. As an example, the communication protocol for the first communication channel may allow for communication between the data receiving device and the data originating device within a proximity of 20 centimeters (cm), whereas the communication protocol for the second communication channel may allow for communication between the data receiving device and the data originating device within a proximity of greater than 20 cm. In some embodiments, the second communication channel may implement different security from the first communication channel. For example, the second communication channel may implement security that is more secure than the security of the first communication channel in some embodiments. The second communication channel may be referred to as a secure channel in some embodiments.

In the case where the data receiving device is a host for a data transfer (for example, the data receiving device communicates via an external network to other entities for completing the data transfer), the data transfer may be initiated based at least in part on the data receiving device and the data originating device being located within a proximity corresponding to the first communication channel. The data receiving device may function as a POS device and the data originating device may function as a NFC payment device. For example, the data receiving device may detect when the data originating device has moved within the proximity of the data receiving device. The data receiving device and the data originating device may communicate via the first communication channel to setup the second communication channel with a different communication protocol than the first communication channel. The second communication channel may provide for communication between the data receiving device and the data originating device at a greater distance than the first communication channel. Being able to communicate at a greater distance may allow for one or more user input fields to be displayed on the data originating device and indications of value data to be transmitted from the data originating device to the data receiving device when located within the proximity provided by the second communication channel. Accordingly, a user of the data originating device may interact with the data originating device to provide value data, and/or other data, for completing the data transfer hosted by the data receiving device rather than having to interact with the data receiving device to provide the value data, and/or other data.

Figure 4A:
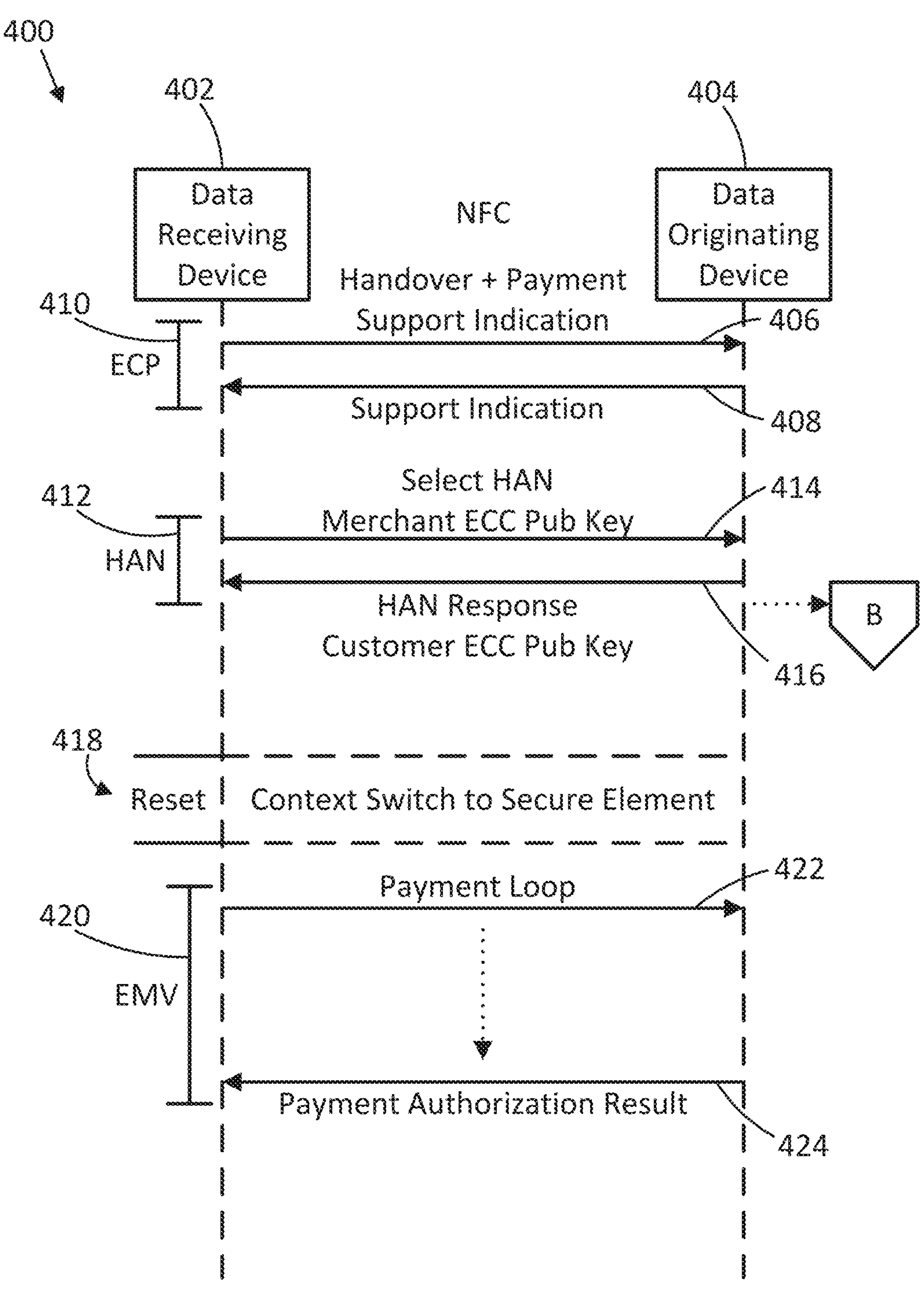
FIG. 4A illustrates an example first communication channel signal flow in accordance with some embodiments.
Figure 4B:
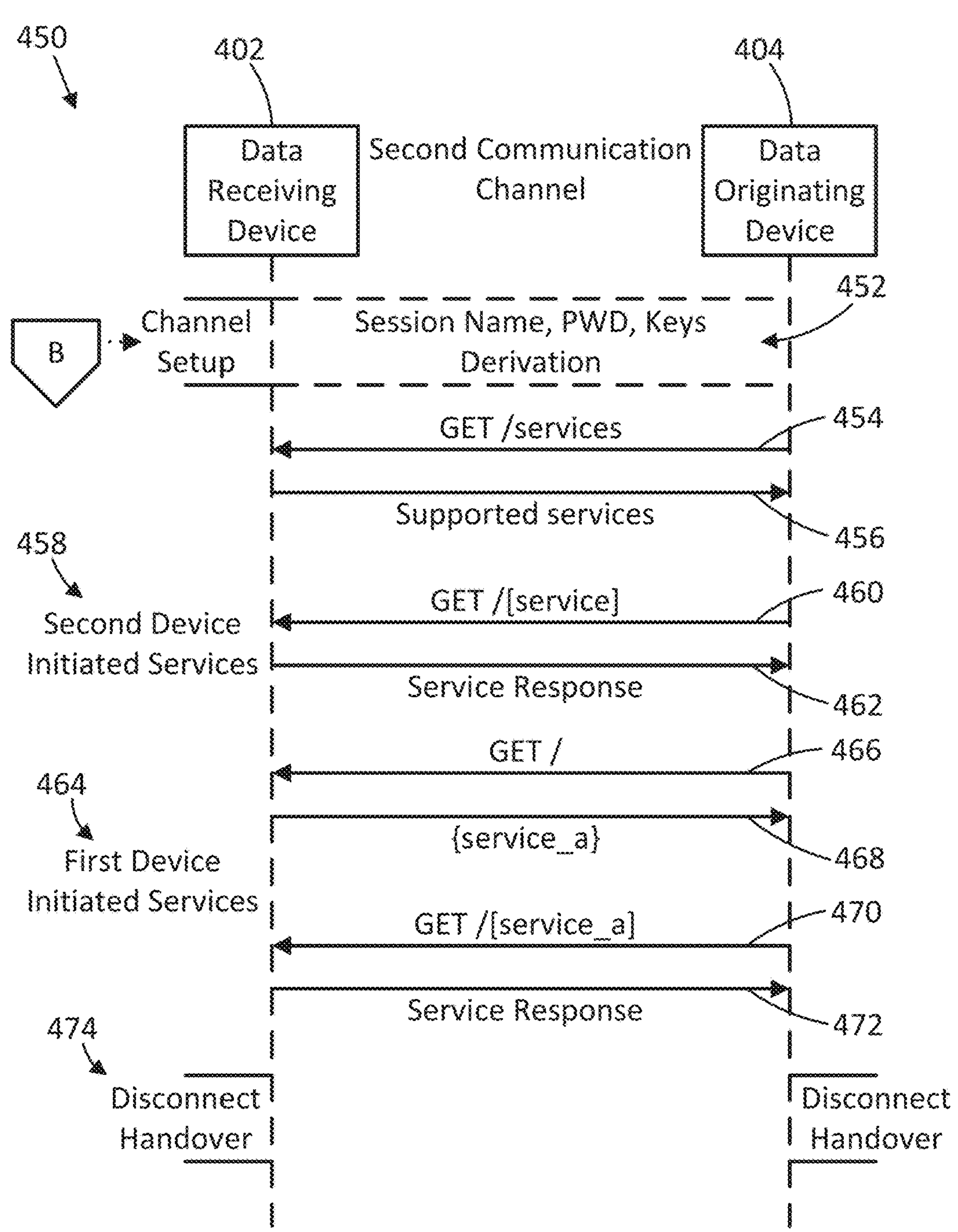
FIG. 4B illustrates an example second communication channel signal flow in accordance with some embodiments.

FIG. 4A illustrates an example first communication channel signal flow 400 in accordance with some embodiments and FIG. 4B illustrates an example second communication channel signal flow 450 in accordance with some embodiments. The first communication channel signal flow 400 may occur via a first communication channel (such as the first communication channel 112 (FIG. 1)) between a data receiving device 402 and a data originating device 404. The data receiving device 402 may include one or more of the features of the data receiving device 102 (FIG. 1) and/or the data receiving device 202 (FIG. 2). The data originating device 404 may include one or more of the features of the data originating device 104 (FIG. 1) and/or the data originating device 204 (FIG. 2). The first communication channel signal flow 400 may establish the second communication channel (such as the second communication channel 114 (FIG. 1)) between the data receiving device 402 and the data originating device 404 for second communication channel signal flow 450 as described further below.

A user of the data receiving device 402 may input an amount for a data transfer. The data receiving device 402 may monitor for entry of the data originating device 404 within a proximity of the data receiving device 402 via a first communication channel associated with the first communication channel signal flow 400 based on the input of the amount for the data transfer being input by the user of the data receiving device 402. The proximity may be based on the communication protocol of the first communication channel, which may be NFC in the illustrated embodiment. The data receiving device 402 may transmit a handover support indication 406 to the data originating device 404 in response to detection of the data originating device 404 being within the proximity of the data receiving device 402. The data receiving device 402 may transmit the handover support indication 406 via the first communication channel. The handover support indication 406 transmitted by the data receiving device 402 may indicate that the data receiving device 402 supports communication handover to a second communication channel for at least a part of the data transfer. In some embodiments, the handover support indication 406 may further indicate services, such as tipping, that the data receiving device 402 supports being performed via the second communication channel.

The data originating device 404 may detect the handover support indication 406 received from the data receiving device 402. In response to detecting the handover support indication 406, the data originating device 404 may respond with a support indication 408. The data originating device 404 may transmit the support indication 408 via the first communication channel. The support indication 408 may indicate whether the data originating device 404 supports the communication handover to the second communication channel. In some embodiments, the support indication 408 may further indicate whether the data originating device 404 supports the services via the second communication channel indicated as being supported in the handover support indication 406. The handover support indication 406 and the support indication 408 may be part of an ECP procedure 410. The ECP procedure 410 may be utilized to determine whether both the data receiving device 402 and the data originating device 404 support the second communication channel. If one or both of the data receiving device 402 and the data originating device 404 indicate that the second communication channel is not supported, the data transfer may proceed without establishing the second communication channel. If both of the data receiving device 402 and the data originating device 404 indicate that the second communication channel is supported, the second communication channel may be established as part of the data transfer.

The data receiving device 402 may detect the support indication 408 received from the data originating device 404. The data receiving device 402 may determine based on the support indication 408 whether the data receiving device 402 and the data originating device 404 both support the second communication channel. In some embodiments, the data receiving device 402 may further determine based on the support indication 408 which of the services both the data receiving device 402 and the data originating device 404 support being performed via the second communication channel. In response to the data receiving device 402 determining that both the data receiving device 402 and the data originating device 404 support communication handover to the second communication channel, the data receiving device 402 may initiate a handover procedure 412. The handover procedure 412 may be utilized to establish a second communication channel between the data receiving device 402 and the data originating device 404.

The data receiving device 402 may transmit a selection handover message 414 to the data originating device 404 as part of the handover procedure 412. The selection handover message 414 may indicate an application selected for establishing the second communication channel. The selection handover message 414 may include a first ECC key to be utilized for establishing the second communication channel. In some embodiments, the first ECC key may comprise a merchant ECC key. The first ECC key may comprise a public key. The selection handover message 414 may further indicate a communication protocol for the second communication channel, where the communication protocol may be a different communication protocol from NFC. For example, the selection handover message 414 may indicate that the second communication channel is to implement Wi-Fi, ultra-wideband, Bluetooth, or another wireless communication protocol. In some embodiments, the second communication channel may be established via a wide area and/or public network, such as the Internet. In these embodiments, the selection handover message 414 may include an indication of a network construct (such as an internet protocol (IP) address) that may be utilized for the second communication channel. In other embodiments, the communication protocol may be predefined for the second communication channel and the selection handover message 414 may omit the indication of the communication protocol.

The data originating device 404 may detect the selection handover message 414 received from the data receiving device 402. In response to detecting the selection handover message 414, the data originating device 404 may transmit a handover response message 416 to the data receiving device 402. The handover response message 416 may include a second ECC key to be utilized for establishing the second communication channel. The second ECC key may be a customer ECC key in some embodiments. In some embodiments, the second ECC key may comprise a public key. The handover response message 416 may acknowledge indication of the application selected for establishing the second communication channel and may indicate approval of establishing the second communication channel via the application. Further, the handover response message 416 may indicate approval of the communication protocol indicated in the selection handover message 414 in some embodiments.

The data receiving device 402 and the data originating device 404 may transition to the second communication channel to establish the second communication channel between the data receiving device 402 and the data originating device 404. For example, the data receiving device 402 and the data originating device 404 may enter a channel setup procedure 452 to establish the second communication channel, as shown in FIG. 4B. In particular, the procedures of the data transfer performed via the second communication channel may be illustrated via the second communication channel signal flow 450. The data receiving device 402 and the data originating device 404 may utilize the first ECC key from the selection handover message 414 and/or the second ECC key from the handover response message 416 to establish the second communication channel. For example, the data receiving device 402 and/or the data originating device 404 may derive information from the first ECC key and/or the second ECC key to establish the second communication channel. In some embodiments, the second communication channel may be established between the data receiving device 402 and the data originating device 404 based further on a session name for the second communication channel, a password for the second communication channel, or some combination thereof. The data receiving device 402 and the data originating device 404 may exchange one or more messages via the second communication channel to establish the second communication channel.

Establishing the second communication channel may further include setting up the communication protocol for the second communication channel. The communication protocol for the second communication channel may be a different communication protocol from the NFC of the first communication channel. In some embodiments, the communication protocol may be the communication protocol defined in the selection handover message 414. The communication protocol for the second communication channel may be Wi-Fi, ultra-wideband, Bluetooth, or another wireless communication protocol. In some embodiments, the second communication channel may be established via a wide area and/or public network, such as the Internet. The communication protocol for the second communication channel may provide communication over a greater distance than the NFC utilized for the first communication channel. For example, the NFC may provide of proximity of 20 cm in which the data receiving device 402 and the data originating device 404 may communicate, whereas the communication protocol for the second communication channel may provide a proximity of greater than 20 cm in which the data receiving device 402 and the data originating device 404 may communicate. In some embodiments, the communication protocol for the second communication channel may be Wi-Fi, where the Wi-Fi may provide communication between the data receiving device 402 and the data originating device 404 up to 300 feet in some instances.

Establishing the second communication channel may further include setting up security for the second communication channel. For example, transmissions between the data receiving device 402 and the data originating device 404 via the second communication channel may be encrypted. An encryption for the transmissions may be determined based on the first ECC key, the second ECC key, or some combination thereof. The encryption of the transmissions via the second communication channel may protect the communications transmitted between the data receiving device 402 and the data originating device 404. In some embodiments, the second communication channel may implement different security than the first communication channel. For example, the security of second communication channel may provide greater security than the first communication channel in some embodiments. The second communication channel may be referred to as a secure channel in some embodiments.

Once the second communication channel has been established, the data originating device 404 may transmit a service query message 454 to the data receiving device 402. The service query message 454 may request an indication of the services provided by the data receiving device 402. For example, the service query message 454 may query the data receiving device 402 to indicate which services are provided by the data receiving device 402 via the second communication channel.

The data receiving device 402 may detect the service query message 454 received from the data originating device 404. Based on the service query message 454, the data receiving device 402 may determine which services the data receiving device 402 can provide to the data originating device 404 via the second communication channel. The data receiving device 402 may transmit a supported services message 456 to the data originating device 404 via the second communication channel. The supported services message 456 may indicate the services, such as tipping and/or presenting a receipt, that can be provided by the data receiving device 402 to the data originating device 404 via the second communication channel.

One or more services may be provided via the second communication channel. The services may be initiated by the data receiving device 402 or the data originating device 404. For example, the second communication channel signal flow 450 shows a data originating device initiated service procedure 458. The data originating device initiated service procedure 458 illustrates signals that may be transmitted as part of a service initiated by the data originating device 404. In the data originating device initiated service procedure 458, the data originating device 404 may transmit a get service message 460 to the data receiving device 402 to initiate a service via the second communication channel. The get service message 460 may indicate a service to be provided via the second communication channel. In some instances, the get service message 460 may include information for providing the service. For example, the get service message 460 may indicate a value data indicated by a user of the data originating device 404.

The data receiving device 402 may detect the get service message 460 received from the data originating device 404. The data receiving device 402 may determine a service to be provided via the second communication channel based on the get service message 460. In some instances, the data receiving device 402 may further extract the information from the get service message 460 for performance of the service. The data receiving device 402 may respond with a service response message 462 that provides the service.

The second communication channel signal flow 450 further shows a data receiving device initiated service procedure 464. The data receiving device initiated service procedure 464 illustrates signals that may be transmitted as part of a service initiated by the data receiving device 402. In the data receiving device initiated service procedure 464, the data originating device 404 may transmit a get message 466 to the data receiving device 402. The get message 466 request an indication of a service being initiated by the data receiving device 402.

The data receiving device 402 may detect the get message 466 received from the data originating device 404. The data receiving device 402 may transmit a service indication message 468 to the data originating device 404 in response to detecting the get message 466. The service indication message 468 may indicate a service being initiated by the data receiving device 402. In some instances, the service indication message 468 may include information for performing the service.

The data originating device 404 may detect the service indication message 468 received from the data receiving device 402. The data originating device 404 may determine the service to be provided via the second communication channel based on the service indication message 468. In some instances, the data originating device 404 may perform one or more operations for the service in response to the service indication message 468. The data originating device 404 may transmit a get service message 470 to the data receiving device 402 in response to the service indication message 468. The get service message 470 may indicate the service to be provided via the second communication channel and/or may indicate that the data originating device 404 supports the service. In some instances, the get service message 470 may include information for providing the service.

The data receiving device 402 may detect the get service message 470 received from the data originating device 404. The data receiving device 402 may determine that the data originating device 404 supports the service via the second communication channel based on the get service message 470. In some instances, the data receiving device 402 may further extract the information from the get service message 470 for performance of the service. The data receiving device 402 may respond with a service response message 472 that provides the service. The service response message 472 may provide the service (such as a receipt) from the data receiving device 402 to the data originating device 404.

The data receiving device 402 and the data originating device 404 may terminate the second communication channel after the operations to be performed via the second communication channel for the data transfer have been completed. For example, the data receiving device 402 and the data originating device 404 may perform a disconnection operation 474 after the service response message 472 has been transmitted in the illustrated embodiment. The disconnection operation 474 may result in the second communication channel between the data receiving device 402 and the data originating device 404 being terminated.

The first communication channel signal flow 400 may proceed with a reset operation 418. In particular, the data receiving device 402 and the data originating device 404 may perform a reset operation 418 for the first communication channel. The reset operation 418 may result in a context switch to a secure element of the data receiving device 402. For example, the operations performed via the first communication channel between the data receiving device 402 and the data originating device 404 prior to the reset operation 418 may be performed via one or more processors of the data receiving device 402. The operations performed via the first communication channel between the data receiving device 402 and the data originating device 404 may be performed via the secure element of the data receiving device 402. The secure element may implement a security level that protects sensitive data associated with the accounts of the user of the data receiving device 402 and the user of the data originating device 404. The security level of the secure element may be in accordance with a defined security level for EMV data transfers. The secure element may prevent the sensitive data from being shared with the processors of the data receiving device 402, thereby providing a high level of protection for the sensitive data. In some embodiments, the secure element may establish a connection with the data originating device 404 via another communication protocol that provides for communication between the data receiving device 402 and the data originating device 404 at a greater distance than the first communication channel. Further, the secure element may establish a secure connection with a PSP server to complete the data transfer. The operations performed after the reset operation may be performed via the first communication channel, the connection of the secure element via the other communication protocol, the secure connection with the PSP server, or some combination thereof.

Once the reset operation 418 has been completed, the data receiving device 402 and the data originating device 404 may perform an EMV operation 420. The EMV operation 420 may result in the transfer value being transferred from the account associated with the user of the data originating device 404 (which may be a customer) to the account associated with the user of the data receiving device 402 (which may be a merchant).

The EMV operation 420 may initiate with a payment loop 422 between the data receiving device 402 and the data originating device 404. The payment loop 422 may be performed with the initial value of the preliminary receipt prior to taking into account any values that exchanged via the second communication channel. For example, the payment loop 422 may utilize the initial value for the data transfer before the value data is added to the initial value for the data transfer. The payment loop 422 may include exchanging information between the data receiving device 402 and the data originating device 404 via the first communication channel, exchanging information between the data receiving device 402 and the data originating device 404 via the connection established by the secure element, exchanging information with the PSP server, or some combination thereof.

The EMV operation 420 may further have a payment authorization result 424. The payment authorization result 424 may take into account any values exchanged via the second communication channel. The payment authorization result 424 may result in the transfer of the transfer value from the account associated with the user of the data originating device 404 to the account associated with the user of the data receiving device 402. For example, the data receiving device 402 may utilize information associated with the payment authorization result 424 to complete the data transfer with PSPs associated with the account of the user of the data receiving device 402 and the account of the user of the data originating device 404. In particular, the data receiving device 402 may communicate with a PSP server associated with the user of the data receiving device 402 to complete the data transfer. The data receiving device 402 may communicate with the PSP server to have the value transferred from the account of the user of the data originating device 404 to the account of the user of the data receiving device 402. In some embodiments, the second communication channel may be terminated based on the completion of the data transfer.

Portions of the reset operation 418 and the EMV operation 420 may be performed concurrently with the establishment of the second communication channel and/or the operations performed via the second communication channel. For example, the reset operation 418 and/or the payment loop 422 may be performed concurrently with the establishment of the second communication channel and/or the operations performed via the second communication channel in some instances. The payment authorization result 424 of the EMV operation 420 may be performed after operations performed via the second communication channel. The completion of the EMV operation 420 may result in the completion of the data transfer in accordance with at least some of the information exchanged via the second communication channel.

IV. Second Communication Channel with Value Added Services

In some embodiments disclosed herein, a procedure for performing a data transfer between a data receiving device (such as the data receiving device 102 (FIG. 1)) and a data originating device (such as the data originating device 104 (FIG. 1)) may include value added services (VAS) in addition to establishing a second communication channel. For example, the data transfer may allow for use of loyalty numbers, coupons, and/or VAS within the data transfer.

Figure 5A:
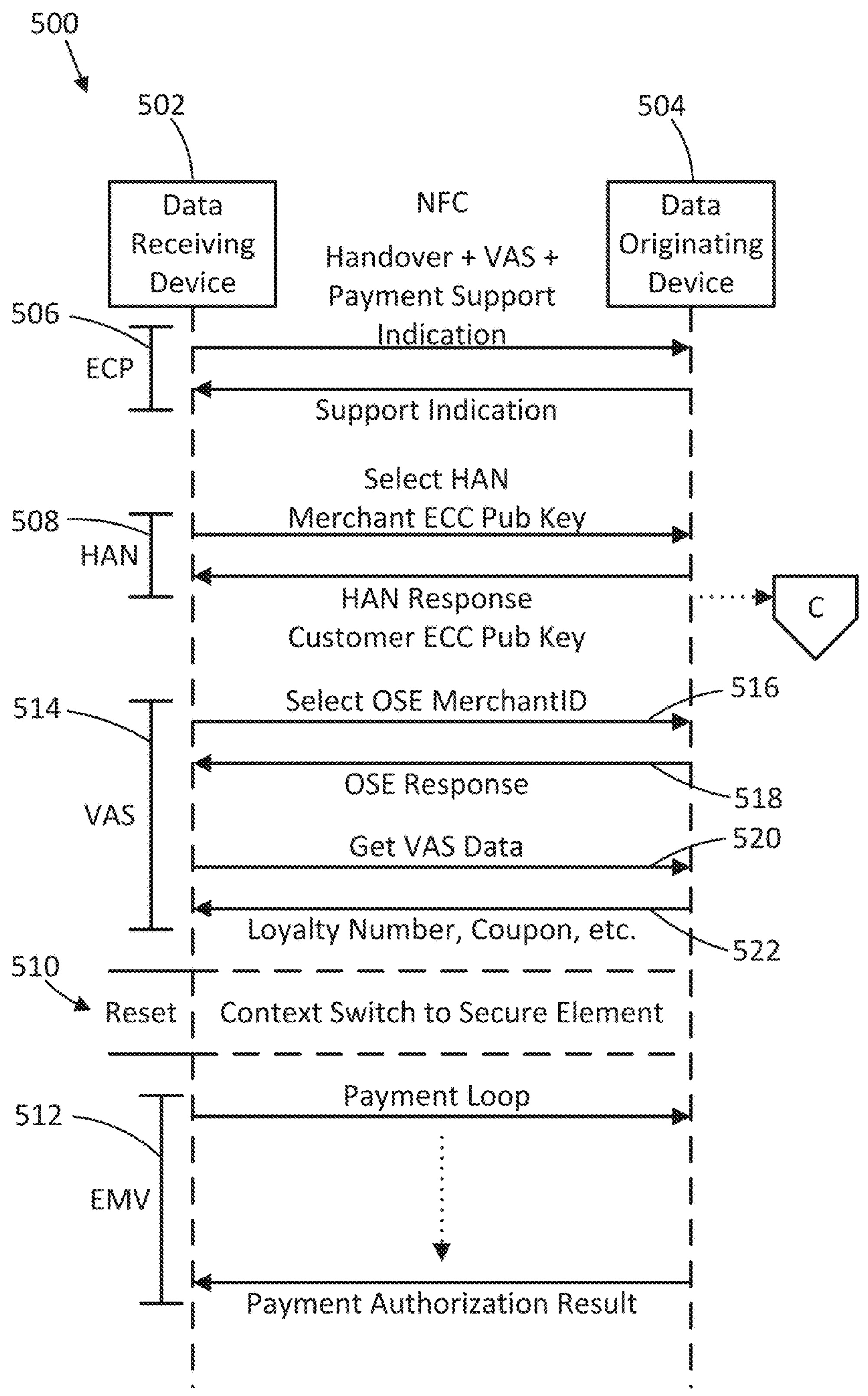
FIG. 5A illustrates an example first communication channel signal flow with value added services (VAS) in accordance with some embodiments.
Figure 5B:
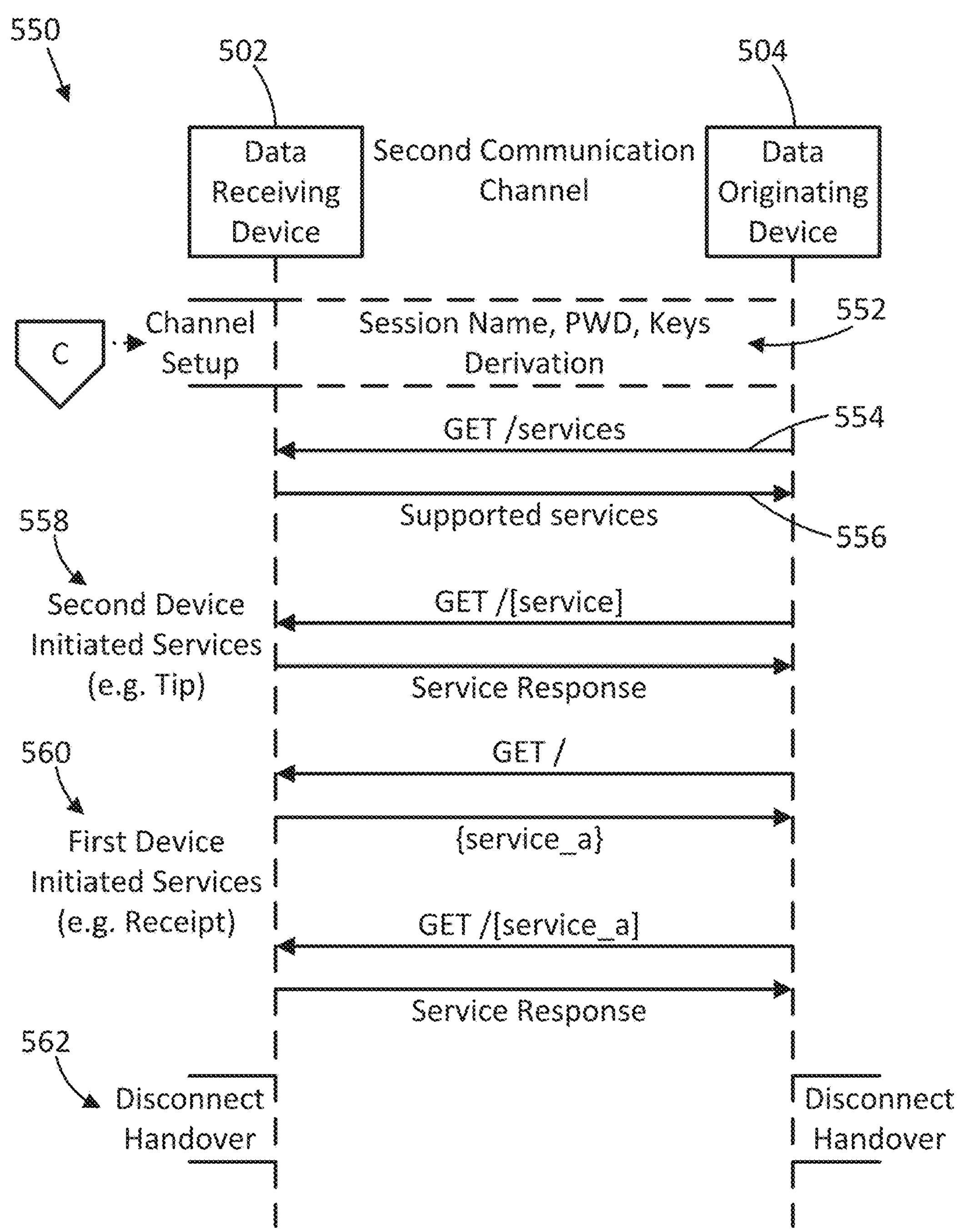
FIG. 5B illustrates an example second communication channel signal flow in accordance with some embodiments.

FIG. 5A illustrates an example first communication channel signal flow 500 with VAS in accordance with some embodiments and FIG. 5B illustrates an example second communication channel signal flow 550 in accordance with some embodiments. The first communication channel signal flow 500 may occur via a first communication channel (such as the first communication channel 112 (FIG. 1)) between a data receiving device 502 and a data originating device 504. The data receiving device 502 may include one or more of the features of the data receiving device 102 (FIG. 1), the data receiving device 202 (FIG. 2), and/or the data receiving device 402 (FIG. 4A). The first communication channel signal flow 500 may establish the second communication channel (such as the second communication channel 114 (FIG. 1)) between the data receiving device 502 and the data originating device 504 for the second communication channel signal flow 550 as described further below.

The first communication channel signal flow 500 may include one or more of the features of the first communication channel signal flow 400 (FIG. 4A). In particular, the first communication channel signal flow 500 may include one or more the procedures described in relation to the first communication channel signal flow 400. For example, the first communication channel signal flow 500 may include an ECP procedure 506, a handover procedure 508, and an EMV operation 512. The ECP procedure 506 may include one or more of the features of the ECP procedure 410 (FIG. 4A). The handover procedure 508 may include one or more of the features of the handover procedure 412 (FIG. 4A). The EMV operation 512 may include one or more of the features of the EMV operation 420 (FIG. 4A). The first communication channel signal flow 500 may further perform a communication handover to the second communication channel signal flow 550, which may include one or more features of the communication handovers from the first communication channel signal flow 400 to the second communication channel signal flow 450 (FIG. 4B).

The second communication channel signal flow 550 may include one or more of the features of the second communication channel signal flow 450. In particular, the second communication channel signal flow 550 may include one or more of the procedures described in relation to the second communication channel signal flow 450. For example, the second communication channel signal flow 550 may include a channel setup procedure 552, a service query message 554, a supported services message 556, a data originating device initiated service procedure 558, a data receiving device initiated service procedure 560, and a disconnection operation 562. The channel setup procedure 552 may include one or more of the features of the channel setup procedure 452 (FIG. 4B). The service query message 554 may include one or more of the features of the service query message 454 (FIG. 4B). The supported services message 556 may include one or more of the features of the supported services message 456 (FIG. 4B). The data originating device initiated service procedure 558 may include one or more of the features of the data originating device initiated service procedure 458 (FIG. 4B). The data receiving device initiated service procedure 560 may include one or more of the features of the data receiving device initiated service procedure 464 (FIG. 4B). The disconnection operation 562 may include one or more of the features of the disconnection operation 474 (FIG. 4B).

The first communication channel signal flow 500 may further include a VAS procedure 514. The VAS procedure 514 may be performed for providing one or more VAS for the data transfer. The VAS procedure 514 may be performed in response to a completion of the handover procedure 508. The reset procedure 510 may be performed in response to a completion of the VAS procedure 514. Further, the VAS procedure 514 may be performed while one or more of the procedures of the second communication channel signal flow 550 is being performed, or after the disconnection operation 562 has been completed.

The first communication channel signal flow 500 may include a select identifier (ID) message 516. In particular, the data receiving device 502 may transmit the select ID message 516 via the NFC to the data originating device 504. The select ID message 516 may indicate a user of the data receiving device 502. For example, the select ID message 516 may comprise a first ID in some embodiments. In some embodiments, the first ID may be a merchant ID that indicates a merchant associated with the data receiving device 502. The data receiving device 502 may transmit the select ID message 516 in response to the data receiving device 502 detecting that the handover procedure 508 has been completed.

The data originating device 504 may detect the select ID message 516 received from the data receiving device 502. The data originating device 504 may determine the user of the data receiving device 502 based at least in part on the select ID message 516. For example, the data originating device 504 may determine the merchant associated with the data receiving device 502 based on the first ID included in the select ID message 516. The data originating device 504 may transmit a response message 518 via the NFC to the data receiving device 502 in response to the select ID message 516. The response message 518 may indicate that the data originating device 504 recognizes the user of the data receiving device 502.

The data receiving device 502 may detect the response message 518 received from the data originating device 504. The data receiving device 502 may transmit a get VAS data message 520 via the first communication channel to the data originating device 504. The get VAS data message 520 may indicate VAS supported by the data receiving device 502. The get VAS data message 520 may further include a request for information related to the VAS from the data originating device 504.

The data originating device 504 may detect the get VAS data message 520 received from the data receiving device 502. The data originating device 504 may determine what VAS is supported by the data receiving device 502 based at least on part on the get VAS data message 520. Based on the determined supported VAS and/or the request for information, the data originating device 504 may determine whether information related to the VAS is stored by the data originating device 504. In response to the get VAS data message 520, the data originating device 504 may transmit a VAS indication message 522 via the first communication channel to the data receiving device 502. The VAS indication message 522 may indicate whether the data originating device 504 has information related to the VAS stored. If the data originating device 522 has the information related to the VAS stored, the VAS indication message 522 may further include the information related to the VAS. For example, the VAS indication message 522 may include one or more loyalty numbers, coupons, and/or other information related to the VAS. The data receiving device 502 may provide the VAS with the information provided in the VAS indication message 522.

V. Proximity for Second Communication Channel

As described throughout this disclosure, a proximity of the second communication channel between a data receiving device and a data originating device may be greater than a proximity of another communication channel between the data receiving device and the data originating device. For example, a communication protocol for the second communication channel may allow for communication between the data receiving device and the data originating device at a greater distance than a communication protocol for the other communication channel. Having the greater proximity for the second communication channel may allow for the communication at a greater distance between the data receiving device and the data originating device than if the second communication channel was not established.

Figure 6:
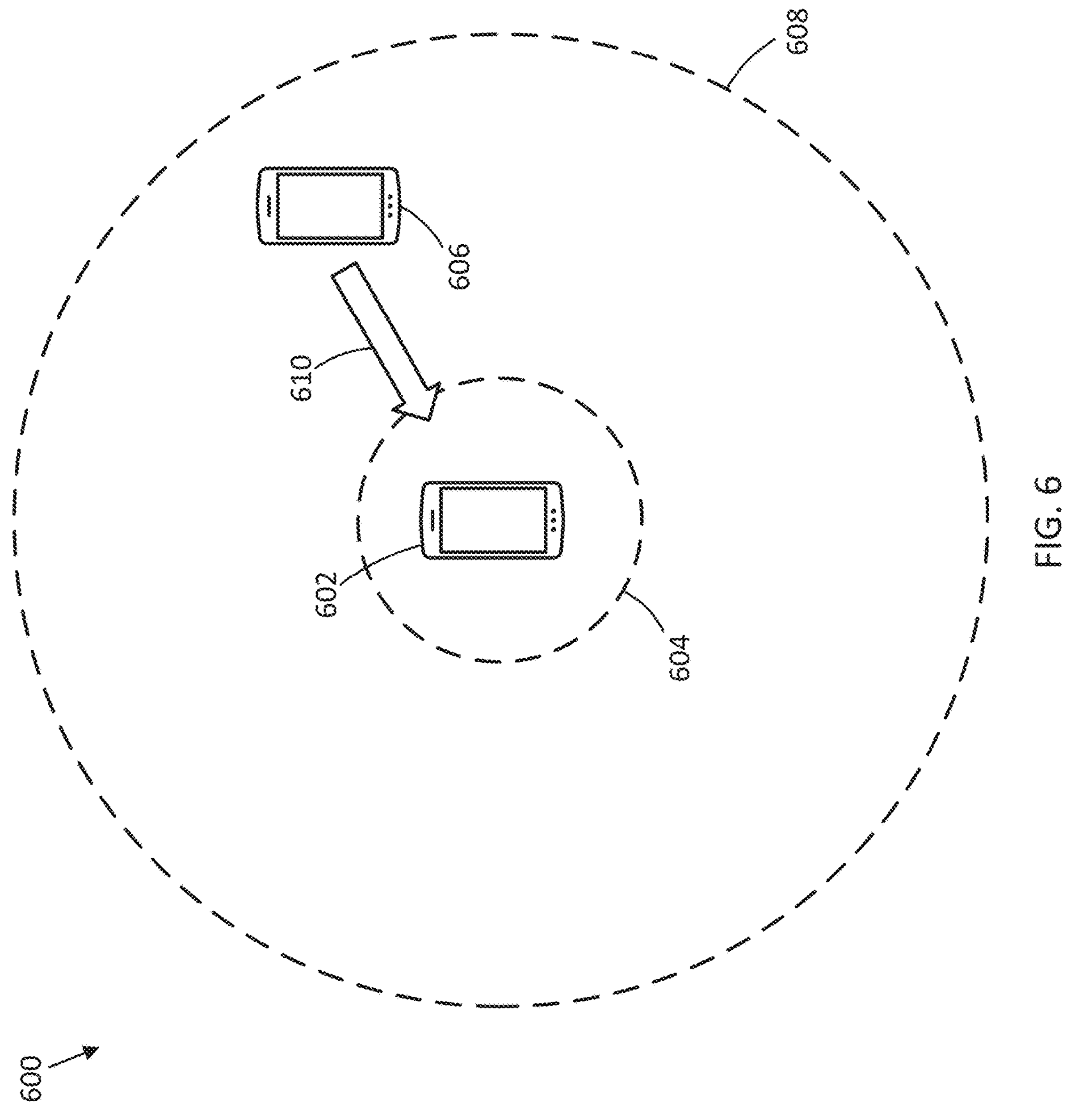
FIG. 6 illustrates an example proximity illustration for communication channels of devices in accordance with some embodiments.

FIG. 6 illustrates an example proximity illustration 600 for communication channels of devices in accordance with some embodiments. In particular, the proximity illustration 600 illustrates example proximities for a second communication channel (such as the second communication channels described throughout the disclosure) and another communication channel (such as the first communication channel described throughout the disclosure). The different proximities for the second communication channel and the other communication channel may be due to different communication protocols implemented by the channels.

The proximity illustration 600 includes a data receiving device 602. The data receiving device 602 may include one or more of the features of the data receiving device 102 (FIG. 1), the data receiving device 202 (FIG. 2), the data receiving device 402 (FIG. 4A), and/or the data receiving device 502 (FIG. 5A). The data receiving device 602 may be associated with a merchant and may be utilized in a data transfer for sale and/or transfer of goods and/or services to a customer.

The data receiving device 602 may detect a user input of an initial value for the data transfer. In response to the detection of the user input, the data receiving device 602 may begin monitoring for devices within a first proximity 604 of the data receiving device 602. A range of the first proximity 604 may be defined based on a communication protocol implemented by a first communication channel associated with the first proximity 604. In some embodiments, the first communication channel may implement NFC that defines the range of the first proximity 604. The first proximity 604 may have a proximity of 20 cm or less, where the data receiving device 602 may detect devices located within the first proximity 604. The first proximity 604 being relatively small may limit an amount of devices that may be detected by the data receiving device 602, which may be beneficial for the data receiving device 602 identifying another device to establish a connection. In particular, it may be relatively uncommon for devices to be located within the first proximity 604 of the data receiving device 602, such that having another device within the first proximity 604 may indicate that a connection is to be established between the data receiving device 602 and the other device.

The proximity illustration 600 further includes a data originating device 606. The data originating device 606 may include one or more of the features of the data originating device 104 (FIG. 1), the data originating device 204 (FIG. 2), the data originating device 404 (FIG. 4A), and/or the data originating device 504 (FIG. 5A). The data originating device 606 may be associated with a customer and may be utilized in the data transfer for transfer of a transfer value to an account associated with the user of the data receiving device 602 for the goods and/or services.

The data receiving device 602 may detect when the data originating device 606 is located within the first proximity 604 while monitoring for devices within the first proximity 604. For example, the data receiving device 602 may detect when the data originating device 606 enters the first proximity 604, as indicated by arrow 610. The data receiving device 602 may determine whether a first communication channel is to be established with the data originating device 606. For example, the data receiving device 602 may determine whether the data originating device 606 has been configured as an electronic element when located within the first proximity 604. The data originating device 606 may be configured as an electronic element by a user of the data originating device 606 interacting with the data originating device 606 to indicate that the data originating device 606 is to operate as an electronic element. In some embodiments, the data receiving device 602 may function as a POS device and the data originating device 606 may function as a NFC payment device. The data receiving device 602 may establish a first communication channel with the data originating device 606 in response to determining that the data originating device 606 is located within the first proximity 604, is configured to operate as an electronic element, and/or the data receiving device 602 is monitoring for a device within the first proximity 604 for the data transfer. The first communication channel may be established via the communication protocol associated with the first proximity 604 and may have a range of the first proximity 604.

The data receiving device 602 and the data originating device 606 may utilize the first communication channel to establish a second communication channel in some embodiments. For example, the data receiving device 602 and the data originating device 606 may perform the ECP procedure 306 (FIG. 3A), the ECP procedure 410 (FIG. 4A), the handover procedure 308 (FIG. 3A), and/or the handover procedure 412 (FIG. 4A) to establish the second communication channel. The data receiving device 602 and the data originating device 606 may establish the second communication channel via a different communication protocol from the communication protocol of the first communication channel. The communication protocol of the second communication channel may be Wi-Fi, ultra-wideband, Bluetooth, or another wireless communication protocol different from the communication protocol of the first communication channel. Based on the communication protocol, the second communication channel may have a second proximity 608. The data receiving device 602 and the data originating device 606 may communicate via the second communication channel when the data originating device 606 is located within the second proximity of the data receiving device 602. The second proximity 608 may be larger than the first proximity 604. In some embodiments, the second proximity 608 may have a proximity of up to 300 feet. In some embodiments, the second communication channel may be established via a wide area and/or public network, such as the Internet. In these embodiments, the second communication channel may provide for communication at any location that has access to the network, thereby providing for the second proximity 608 being an area from which the network can be accessed. The second communication channel having the second proximity 608 that is larger than the first proximity 604 of the first communication channel may allow the data receiving device 602 and the data originating device 606 to communicate with each other at greater distances than if the second communication channel was not established. One or more operations (such as the operations described in relation to the second communication channel signal flow 350 (FIG. 3B) and/or the operations described in relation to the second communication channel signal flow 450 (FIG. 4B)) may be performed via the second communication channel. The second communication channel may allow for one or more user input fields related to the data transfer to be displayed on the data originating device 606. Accordingly, a user of the data originating device 606 may interact with the data originating device 606 to enter information for the data transfer rather than having the interact with the data receiving device 602.

For an example of the single tap approach with the second communication channel, a customer may be purchasing a hot dog from a merchant. The merchant may enter a cost for the hot dog into a smart phone of the merchant, where the smart phone may be functioning as a POS device for the merchant. The smart phone of the merchant may correspond to the data receiving device. The smart phone of the merchant may be linked to account of the merchant that can receive payments. The smart phone of the merchant may begin to monitor for a payment element.

The customer may have a smart phone that is linked to a payment account of the customer, where the account can be utilized to pay for items. The smart phone of the customer may function as a payment element for the customer. The smart phone of the customer may be functioning as an NFC payment device for the customer. The smart phone of the customer may correspond to the data originating device. The customer may move the smart phone of the customer within a first proximity of the smart phone of the merchant to initiate a payment for the hot dog.

The smart phone of the merchant may detect the smart phone of the customer being moved within the first proximity. The smart phone of the merchant and the smart phone of the customer may exchange data related to the purchase of the hot dog and for establishing a second communication channel between the smart phone of the merchant and the smart phone of the customer. The second communication channel may provide a greater range of communication than the first communication channel, such that the smart phone of the customer may continue to communicate with the smart phone of the merchant when the smart phone of the customer is within a second proximity of the smart phone of the merchant that is larger than the first proximity.

The smart phone of the customer may display a receipt showing the cost for the hot dog based on data received from the smart phone of the merchant. The smart phone of the customer may also provide the customer with the option to input a tip for the purchase of the hot dog. The smart phone of the customer may transmit an indication of any tip entered by the customer to the smart phone of the merchant via the second communication channel. The smart phone of the merchant then may complete the sale of the hot dog with the tip resulting in transfer of funds from the account associated with the customer to the account associated with the merchant.

VI. Double Tap Approach

In some embodiments, a procedure for performing a data transfer may be performed using a double tap between a data receiving device (such as the data receiving device 102 (FIG. 1)) and a data originating device (such as the data originating device 104 (FIG. 1)). The double tap approach may provide for a user input field being displayed on a display of the data originating device as part of the data transfer. A value data input by a user of the data originating device into the user input field may be utilized for completing the data transfer. The double tap approach may allow for exchange of information related to the data transfer during a first tap between the data receiving device and the data originating device and exchange of additional information related to the data transfer during a second tap between the data receiving device and the data originating device. The user input field may be displayed on a display of the data originating device between the first tap and the second tap, thereby allowing a user of the data originating device to input information utilized for the data transfer that can be transmitted from the data originating device to the data receiving device during the second tap.

Figure 7:
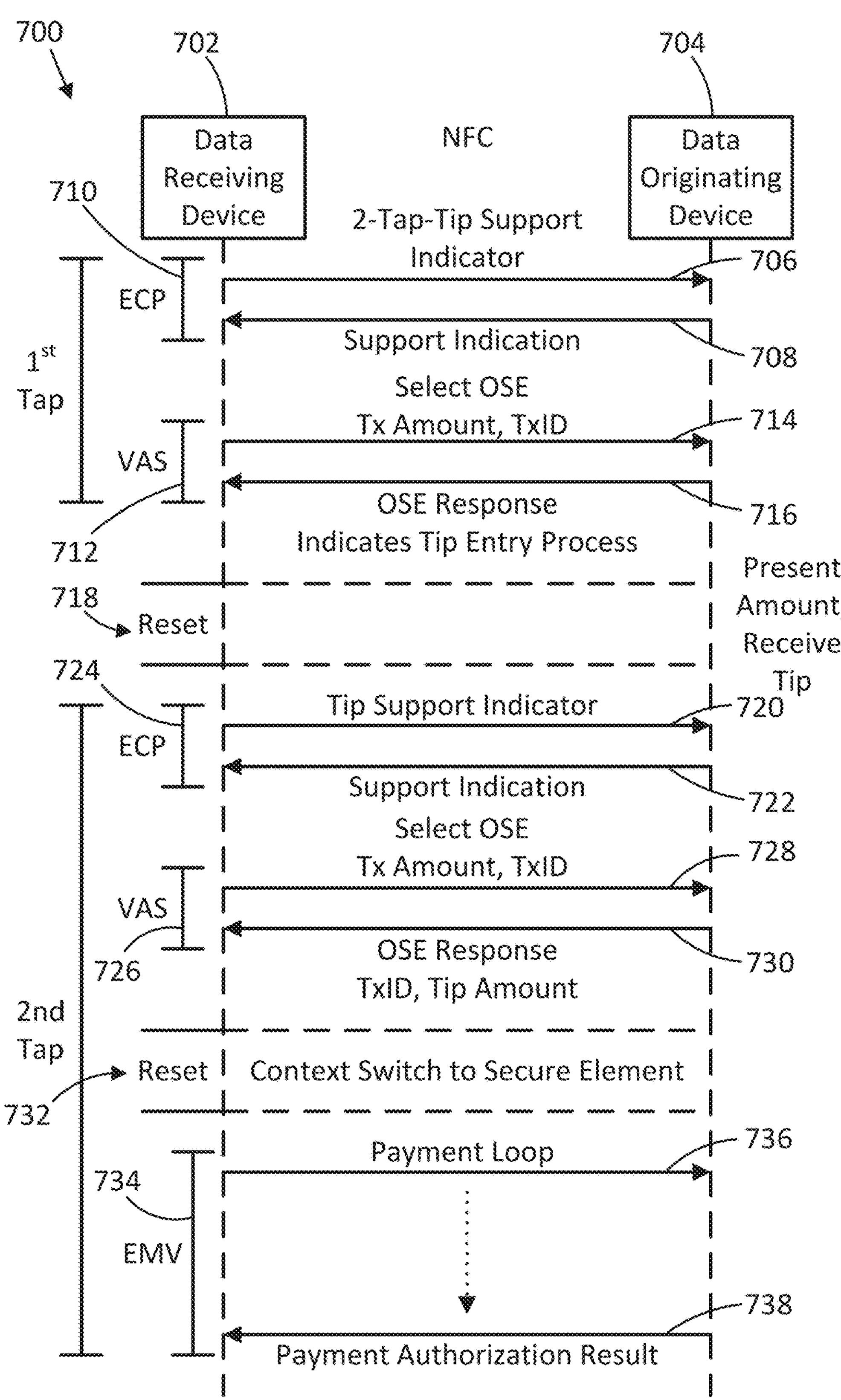
FIG. 7 illustrates an example double tap signal flow in accordance with some embodiments.

FIG. 7 illustrates an example double tap signal flow 700 in accordance with some embodiments. The double tap signal flow 700 may be part of a data transfer between a data receiving device 702 and a data originating device 704. The data receiving device 702 may include one or more of the features of the data receiving device 102 (FIG. 1), the data receiving device 202 (FIG. 2), the data receiving device 402 (FIG. 4A), and/or the data receiving device 502 (FIG. 5). The data receiving device 702 may host the data transfer and may be associated with a first user. The data originating device 704 may include one or more of the features of the data originating device 104 (FIG. 1), the data originating device 204 (FIG. 2), the data originating device 404 (FIG. 4A), and/or the data originating device 504 (FIG. 5).

Figure 8A:
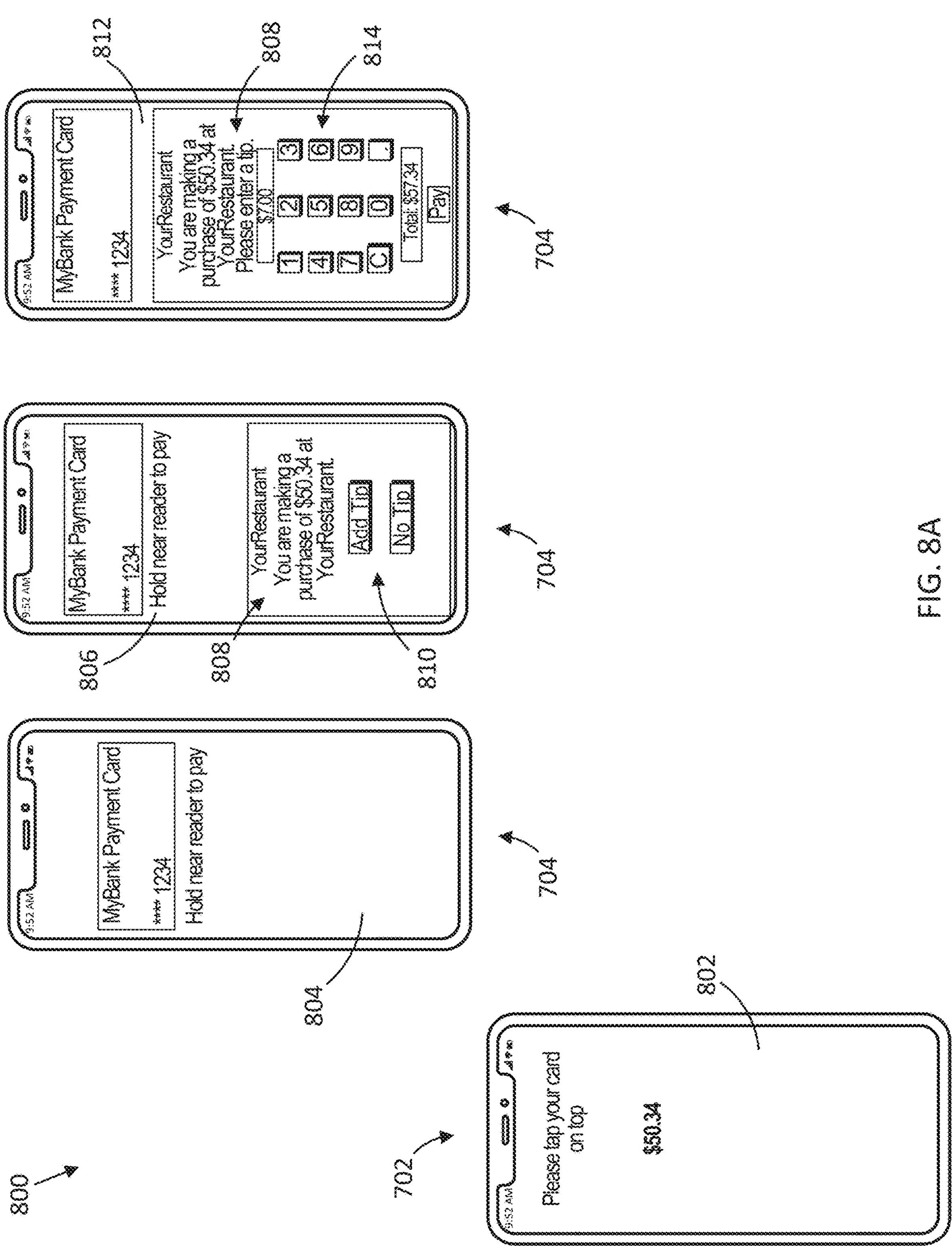
FIG. 8A illustrates a first portion of an example device display sequence for the double tap approach in accordance with some embodiments.
Figure 8B:
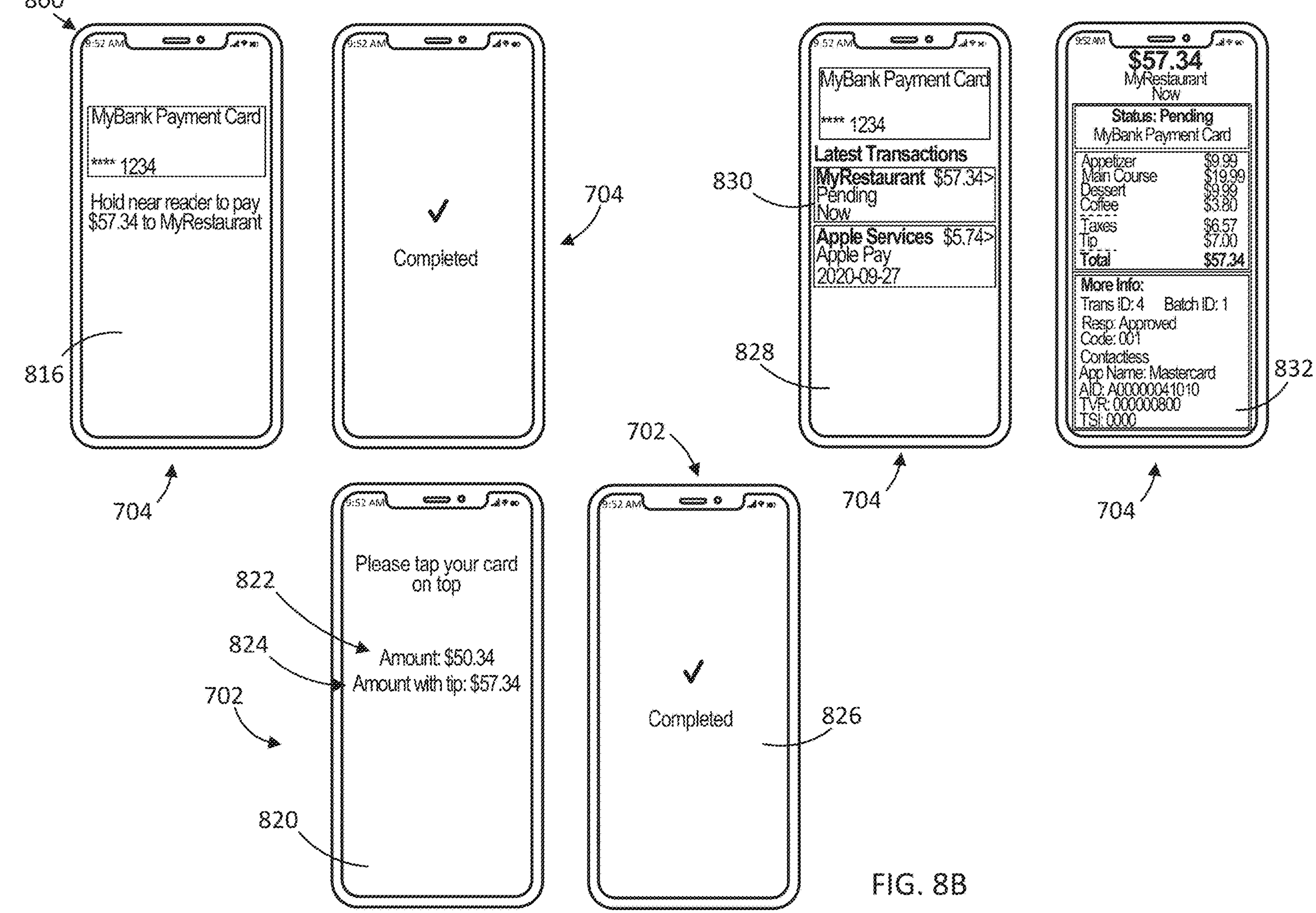
FIG. 8B illustrates a second portion of the example device display sequence for the double tap approach in accordance with some embodiments.

FIG. 8A illustrates a first portion of an example device display sequence 800 for the double tap approach in accordance with some embodiments, and FIG. 8B illustrates a second portion of the example device display sequence 800 for the double tap approach in accordance with some embodiments. The device display sequence 800 illustrates a sequence of displays that may be displayed on the data receiving device 702 and the data originating device 704 during a data transfer with a double tap approach.

At a beginning of the data transfer, a user of the data receiving device 702 may input an initial value for the data transfer. The initial value may be a value that the user of the data receiving device 702 is charging for one or more goods and/or services that have been provided to or will be provided to a user of the data originating device 704. The data receiving device 702 may display an electronic element request interface 802 on a display of the data receiving device 702 based on the user inputting the initial value for the data transfer. In particular, the data receiving device 702 may detect the input of the initial value and may display the electronic element request interface 802 in response to the data receiving device 702 detecting the input of the value. The electronic element request interface 802 may request an electronic element be positioned within a proximity of the data receiving device 702. For example, the electronic element request interface 802 recites "Please tap your card on top" in the illustrated embodiment. The data receiving device 702 may monitor for an electronic element being positioned within a proximity of the data receiving device 702 after the user has input the initial value into the data receiving device 702. In some embodiments, the data receiving device 702 may monitor for the electronic element by transmitting a signal one or more times and waiting for a response from an electronic element. The electronic element may be associated with an account of a user of the data originating device 704, where the transfer value is transferred from the account of the user of the data originating device 704 to an account associated with a user of the data receiving device 702 for the data transfer. In some instances, the electronic element may comprise a PICC. The PICC may comprise the data originating device 704 in some embodiments.

The data originating device 704 may operate as an electronic element for the data transfer with the data receiving device 702. For example, the data originating device 704 may be associated with an account of the user of the data originating device 704 that may transfer the transfer value to an account associated with the data receiving device 702. In some embodiments, the data receiving device 702 may function as a POS device and the data originating device 704 may function as a NFC payment device. The data originating device 704 may display an electronic element interface 804 to indicate that the data originating device 704 is operating as an electronic element. In some embodiments, the data originating device 704 may begin operating as an electronic element based on a user interaction with the data originating device 704 indicating that the data originating device 704 is to be operating as an electronic element, or the data originating device 704 being moved within the proximity of the data receiving device 702 while the data receiving device 702 is monitoring for the electronic element. The proximity may be defined by a communication protocol for a communication channel established between the data receiving device 702 and the data originating device 704. For example, the data receiving device 702 may utilize NFC for the communication channel to transmit the signal during monitoring for the electronic element and the data originating device 704 may respond via the communication channel. The communication channel may have a proximity of 20 cm or less, where the data receiving device 702 and the data originating device 704 are to be within 20 cm or less of each other to communicate via the communication channel. When located within the proximity of the data receiving device 702, the data originating device 704 may detect the signal transmitted by the data receiving device 702 when monitoring for the electronic element and the data originating device 704 may respond as the electronic element.

The data receiving device 702 may detect the response from the data originating device 704 and detect that the data originating device 704 has entered the proximity of the data receiving device 702. Further, the data receiving device 702 may detect an initiation of the data transfer based on the data receiving device 702 detecting that the data originating device 704 has entered the proximity of the data receiving device 702.

The data receiving device 702 may transmit a double tap support indication 706 to the data originating device 704 in response to detection of the data originating device 704 being within the proximity of the data receiving device 702. The data receiving device 702 may transmit the double tap support indication 706 via the communication channel, which is via NFC in the illustrated embodiment. The double tap support indication 706 transmitted by the data receiving device 702 may indicate that the data receiving device 702 supports a double tap data transfer. In some embodiments, the double tap support indication 706 may further indicate services, such as tipping, that the data receiving device 702 supports with the double tap data transfer. For example, the double tap support indication 706 may indicate that data receiving device 702 supports setup of the services in a first tap and transfer of information related to the services in the second tap.

The data originating device 704 may detect the double tap support indication 706 received from the data receiving device 702. In response to detecting the double tap support indication 706, the data originating device 704 may respond with a support indication 708. The data originating device 704 may transmit the support indication 708 via the NFC. The support indication 708 may indicate whether the data originating device 704 supports the double tap data transfer. In some embodiments, the support indication 708 may further indicate whether the data originating device 704 supports the services indicated as being supported in the double tap support indication 706. The double tap support indication 706 and the support indication 708 may be part of an ECP procedure 710. The ECP procedure 710 may be utilized to determine whether both the data receiving device 702 and the data originating device 704 support a double tap data transfer. If one or both of the data receiving device 702 and the data originating device 704 indicate that a double tap data transfer is not supported, the data transfer may proceed without the double tap data transfer. If both the data receiving device 702 and the data originating device 704 indicate that a double tap data transfer is supported, the data transfer may proceed according to the double tap data transfer.

The data receiving device 702 may detect the support indication 708 received from the data originating device 704. The data receiving device 702 may determine, based on the support indication 708, whether the data receiving device 702 and the data originating device 704 support the double tap data transfer. In some embodiments, the data receiving device 702 may further determine, based on the support indication 708 which of the services both the data receiving device 702 and the data originating device 704 support being performed via the double tap data transfer. In response to the data receiving device 702 determining that both the data receiving device 702 and the data originating device 704 support the double tap data transfer, the data receiving device 702 may initiate a VAS procedure 712. The VAS procedure 712 may provide the information for providing the services on the data originating device 704 in the double tap data transfer.

The data receiving device 702 may transmit a selection message 714 to the data originating device 704 via the communication channel as part of the VAS procedure 712. The selection message 714 may provide information for one or more user input fields to be displayed on the data originating device 704. For example, the selection message 714 may include an initial value for the data transfer and/or a transaction ID.

The data originating device 704 may detect the selection message 714. The data originating device 704 may extract the information for the one or more user input fields, such as the initial value for the data transfer and/or the transaction ID. The data originating device 704 may transmit a response message 716 via the communication channel to the data receiving device 702 in response to the selection message 714. The response message 716 may indicate a value data entry process to be utilized for the data transfer. For example, the response message 716 may indicate that the double tap data transfer is to be utilized for the data transfer. In some embodiments, the response message 716 may define the procedure for completing the data transfer, such as the transmissions and/or resets described further in the double tap signal flow 700.

The data receiving device 702 may detect the response message 716 received from the data originating device 704. The data receiving device 702 may proceed in accordance with the tip entry process indicated in the response message 716. The data receiving device 702 and the data originating device 704 may perform a reset 718 based on the response message 716. For example, the data receiving device 702 and the data originating device 704 may complete a first portion of the double tap signal flow 700 that corresponds to a first tap of the data originating device 704 to the data receiving device 702. In particular, the first portion of the double tap signal flow 700 may correspond to a first time that the data originating device 704 is located within the proximity of the data receiving device 702. The data originating device 704 may be located outside of the proximity of the data receiving device 702 to initiate the reset 718 and/or during the reset 718. The communication channel may be terminated during the reset 718.

The data originating device 704 may display a first preliminary receipt interface 806 on a display of the data originating device 704. The data originating device 704 may display the first preliminary receipt interface 806 in response to detecting the selection message 714, in response to transmitting the response message 716, during the reset 718, or some combination thereof. The data originating device 704 may display the first preliminary receipt interface 806 while the data originating device 704 is outside of the proximity of the data receiving device 702 and/or the first preliminary receipt interface 806 may be displayed by the data originating device 704 while the communication channel is not present between the data receiving device 702 and the data originating device 704. Further, the data originating device 704 may display the first preliminary receipt interface 806 when a communication channel is not present between the data receiving device 702 and the data originating device 704.

The first preliminary receipt interface 806 may include one or more of the features of the first preliminary receipt interface 212 (FIG. 2). For example, the first preliminary receipt interface 806 may include a preliminary receipt 808. The preliminary receipt 808 may include an indication of an initial value of the data transfer without any tipping included. The first preliminary receipt interface 806 may further include a first user input field 810. The first user input field 810 may allow a user of the data originating device 704 to indicate whether a value data is to be added to the data transfer. In some embodiments, the value data may comprise a tip.

In response to the data originating device 704 determining that user indicated a value data is to be added to the data transfer in the first preliminary receipt interface 806, the data originating device 704 may display a second preliminary receipt interface 812 on the display of the data originating device 704. The second preliminary receipt interface 812 may include one or more of the features of the second preliminary receipt interface 218 (FIG. 2). For example, the second preliminary receipt interface 812 may include the preliminary receipt 808 or a modified version of the preliminary receipt 808. Further, the second preliminary receipt interface 812 may further include a second user input field 814. The second user input field 814 may allow a user of the data originating device 704 to provide a value data related to the data transfer. In the illustrated embodiment, the value data may comprise a tip to be added to the data transfer. The data originating device 704 may detect the user input of the value data and determine the value data related to the data transfer.

The data originating device 704 may display a second electronic element interface 816 on a display of the data originating device 704. The second electronic element interface 816 may indicate that the data originating device 704 is to be moved within the proximity of the data receiving device 702 to continue the data transfer. In particular, the second electronic element interface 816 may indicate that the data originating device 704 is to be moved within the proximity of the data receiving device 702 to establish a communication channel via the NFC between the data receiving device 702 and the data originating device 704. The proximity in which the data originating device 704 is to be moved may be the same proximity in which the data originating device 704 was moved to start the double tap signal flow 700.

The data receiving device 702 may detect the data originating device 704 being moved within the proximity of the data receiving device 702. In response to detecting that the data originating device 704 has moved within the proximity of the data receiving device 702, the data receiving device 702 may transmit a support indication 720 to the data originating device 704 via the communication channel. The support indication 720 may include one or more of the features of the double tap support indication 706. For example, the support indication 720 may indicate that the data receiving device 702 supports the double tap data transfer.

The data originating device 704 may detect the support indication 720 received from the data receiving device 702. The data originating device 704 may determine whether the data receiving device 702 supports the double tap data transfer based on the support indication 720. In response to the data originating device 704 determining that the data receiving device 702 supports the double tap data transfer, the data originating device 704 may transmit a support indication 722 to the data receiving device 702 via the communication channel. The support indication 722 may include one or more of the features of the support indication 708. The support indication 722 may indicate whether the data originating device 704 supports the double tap data transfer. In some embodiments, the support indication 722 may further indicate that the data originating device 704 has entered the proximity of the data receiving device 702 a second time for the data transfer. The support indication 722 may further include the transaction ID received in the selection message 714.

The support indication 720 and the support indication 722 may be part of an ECP procedure 724. The ECP procedure 724 may include one or more of the features of the ECP procedure 710. The ECP procedure 724 may be utilized to determine whether both the data receiving device 702 and the data originating device 704 support the double tap data transfer. In one or both of the data receiving device 702 and the data originating device 704 indicate that the double tap data transfer is not supported, the data transfer may proceed without the double tap data transfer. If both the data receiving device 702 and the data originating device 704 indicate that the double tap data transfer is supported, the data transfer may proceed according to the double tap data transfer.

The data receiving device 702 may detect the support indication 722 received from the data originating device 704. The data receiving device 702 may determine, based on the support indication 722, whether the data receiving device 702 and the data originating device 704 support the double tap data transfer. In some embodiments, the data receiving device 702 may further determine, based on the support indication 722 which of the services both the data receiving device 702 and the data originating device 704 support being performed via the double tap data transfer. In response to the data receiving device 702 determining that both the data receiving device 702 and the data originating device 704 support the double tap data transfer, the data receiving device 702 may initiate a VAS procedure 726. The VAS procedure 726 may include one or more of the features of the VAS procedure 712. The VAS procedure 726 may provide the information for providing the services on the data originating device 704 in the double tap data transfer.

The data receiving device 702 may transmit a selection message 728 to the data originating device 704 via the communication channel as part of the VAS procedure 726. The selection message 728 may include one or more of the features of the selection message 714. The selection message 728 may include an initial value for the data transfer and/or the transaction ID.

The data originating device 704 may detect the selection message 728. The data originating device 704 may extract the initial value for the data transfer and/or the transaction ID. The data originating device 704 may transmit a response message 730 via the NFC to the data receiving device 702 in response to the selection message 728. The response message 730 may include the transaction ID and an indication of the value data. For example, the response message 730 may include an indication of a value data. The indication of the value data comprises an indication of a tip amount in the illustrated embodiment.

Based on the ECP procedure 724, the VAS procedure 726, or portions thereof, the data originating device 704 may display a data transfer complete interface 818. The data transfer complete interface 818 may indicate that the ECP procedure 724, the VAS procedure 726, or portions thereof have been completed.

The data receiving device 702 may detect response message 730 received from the data originating device 704. The data receiving device 702 may extract the transaction ID and/or the value data from the response message 730. The data receiving device 702 may determine a transfer value for the data transfer based on the value data extracted from the response message 730. For example, the data receiving device 702 may determine the transfer value to be the initial value for the data transfer plus the value data in some embodiments.

The double tap signal flow 700 may proceed with a reset operation 732 after the response message 730. The reset operation 732 may include one or more of the features of the reset operation 314 (FIG. 3). For example, the data receiving device 702 and the data originating device 704 may perform a reset operation 732 for the communication channel in response to the response message 730. The reset operation 732 may result in a context switch to a secure element of the data receiving device 702. For example, the operations performed via the communication channel between the data receiving device 702 and the data originating device 704 prior to the reset operation 732 may be performed via one or more processors of the data receiving device 702. The operations performed via the communication channel between the data receiving device 702 and the data originating device 704 after the reset operation 732 may be performed via the secure element of the data receiving device 702. The secure element may implement a security level that protects sensitive data associated with the accounts of the user of the data receiving device 702 and the user of the data originating device 704. The security level of the secure element may be in accordance with a defined security level for EMV data transfers. The secure element may prevent the sensitive data from being shared with the processors of the data receiving device 702, thereby providing a high level of protection for the sensitive data. In some embodiments, the secure element may establish a connection with the data originating device 704. Further, the secure element may establish a secure connection with a PSP server to complete the data transfer. The operations performed after the reset operation may be performed via the communication channel, the connection of the secure element with the data originating device 704, the secure connection with the PSP server, or some combination thereof.

Once the reset operation 732 has been completed, the data receiving device 702 and the data originating device 704 may perform an EMV operation 734. The EMV operation 734 may include one or more of the features of the EMV operation 316 (FIG. 3). The EMV operation 734 may result in the transfer value being transferred from the account associated with the user of the data originating device 704 (which may be a customer) to the account associated with the user of the data receiving device 702 (which may be a merchant).

The EMV operation 734 may initiate with a payment loop 736 between the data receiving device 702 and the data originating device 704. The payment loop 736 may be performed with the transfer value with the value data taken into account. The payment loop 736 may include exchanging information between the data receiving device 702 and the data originating device 704 via the communication channel, exchanging information between the data receiving device 702 and the data originating device 704 via the connection established by the secure element, exchanging information with the PSP server, or some combination thereof.

The EMV operation 734 may further have a payment authorization result 738. The payment authorization result 738 may utilize the transfer value, which may include the initial value of the data transfer plus the value data. The payment authorization result 738 may result in the transfer of the transfer value from the account associated with the user of the data originating device 704 to the account associated with the user of the data receiving device 702. For example, the data receiving device 702 may utilize information associated with the payment authorization result 738 (such as the transfer value) to complete the data transfer with PSPs associated with the account of the user of the data receiving device 702 and the account of the user of the data originating device 704. In particular, the data receiving device 702 may communicate with a PSP server associated with the user of the data receiving device 702 to complete the data transfer. For example, the data receiving device 702 may communicate with the PSP server to complete the data transfer in accordance with the value data received from the data originating device 704. The data receiving device 702 may communicate with the PSP server to have the transfer value transferred from the account of the user of the data originating device 704 to the account of the user of the data receiving device 702.

The data receiving device 702 may display a data transfer result interface 820. The data receiving device 702 may display the data transfer result interface 820 in response to detection of the response message 730, completion of the VAS procedure 726, completion of the reset operation 732, completion of the EMV operation 734, or some portion thereof. The data transfer result interface 820 may include an initial value 822, an transfer value 824, the value data, or some combination thereof. The data transfer result interface 820 may indicate the value data extracted from the response message 730 to a user of the data receiving device 702. The initial value 822 may be the initial value for the data transfer without the value data taken into account and the transfer value 824 may be the value for the data transfer with the value data taken into account. For example, the initial value 822 may be a value for the data transfer without a tip and the transfer value 824 may be the value for the data transfer with the tip in some embodiments. The data receiving device 702 may generate the transfer value 824 in accordance with the value data.

The data receiving device 702 may further display a data transfer complete interface 826. The data transfer complete interface 826 may be displayed by the data receiving device 702 after the data transfer results interface 820 has been displayed by the data receiving device 702. For example, the data receiving device 702 may display the data transfer complete interface 826 in response to a user interaction with the data transfer result interface 820, an expiration of a predefined amount of time that the data transfer result interface 820, or some combination thereof. The data transfer complete interface 826 may indicate that the data transfer has been completed.

Based on the value data, the data originating device 704 may generate an updated receipt in accordance with the value data in some embodiments. In other embodiments, the data receiving device 702 may generate the updated receipt in accordance with the value data and transmit the updated receipt to the data originating device 704 via the communication channel in response to the response message 730. The data originating device 704 may display the updated receipt and/or the transfer value for the data transfer, and/or store the updated receipt and/or the transfer value for the data transfer within a receipt store of the data originating device 704. For example, the data originating device 704 may implement a wallet application, where the updated receipt and/or the transfer value for the data transfer may be stored as an entry within the wallet application. The data originating device 704 may display a data transfer list interface 828 of the wallet application that lists the entries within the wallet application. The data transfer list interface 828 may include an entry 830 corresponding to the updated receipt, where the entry 830 may display a portion of the information from the updated receipt on the data originating device 704.

The data originating device 704 may detect a user interaction with the entry 830 within the data transfer list interface 828. In response to the detection of the user interaction with the entry 830, the data originating device 704 may display a detailed receipt interface 832 associated with the updated receipt. The detailed receipt interface 832 may display details of the updated receipt. The details of the updated receipt displayed in the detailed receipt interface 832 may include an indication of a user of the data receiving device 702 (such as a merchant) associated with the data transfer, an indication of the account of the user of the data originating device 704 utilized for the data transfer, information associated with the account, itemized goods and/or services of the data transfer, the value data input by the user as part of the data transfer (such as the value data from the second user input field 814), any additional amounts associated with the data transfer (such as taxes), the updated value from the updated receipt, or some combination thereof.

For an example of the double tap approach with the second communication channel, a customer may be purchasing a hot dog from a merchant. The merchant may enter a cost for the hot dog into a smart phone of the merchant, where the smart phone may be functioning as a POS device for the merchant. The smart phone of the merchant may correspond to the data receiving device. The smart phone of the merchant may be linked to account of the merchant that can receive payments. The smart phone of the merchant may begin to monitor for a payment element.

The customer may have a smart phone that is linked to a payment account of the customer, where the account can be utilized to pay for items. The smart phone of the customer may function as a payment element for the customer. The smart phone of the customer may be functioning as an NFC payment device for the customer. The smart phone of the customer may correspond to the data originating device. The customer may move the smart phone of the customer within a proximity of the smart phone of the merchant a first time to initiate a payment for the hot dog.

The smart phone of the merchant may detect the smart phone of the customer being moved within the proximity. The smart phone of the merchant and the smart phone of the customer may exchange data related to the purchase of the hot dog between the smart phone of the merchant and the smart phone of the customer during the first time that the smart phone of the customer is located within the proximity of the smart phone of the merchant. For example, the smart phone of the merchant may provide an indication of the cost for the hot dog to the smart phone of the customer.

The smart phone of the customer may display a receipt showing the cost for the hot dog based on data received from the smart phone of the merchant. The smart phone of the customer may also provide the customer with the option to input a tip for the purchase of the hot dog. The customer may move the smart phone of the customer into the proximity of the smart phone of the merchant a second time subsequent to the first time. The smart phone of the customer may transmit an indication of any tip entered by the customer during the second time that the smart phone of the customer was located within the proximity of the smart phone of the merchant. The smart phone of the merchant then may complete the sale of the hot dog with the tip resulting in transfer of funds from the account associated with the customer to the account associated with the merchant.

VII. VAS Frame

To perform a data transfer between a data receiving device and a data originating device with VAS, one or more VAS frames may be exchanged between the data receiving device and the data originating device. The VAS frames may be exchanged between the data receiving device and the data originating device in one or more of the communications exchanged between the data receiving device and the data originating device, such as any of the communications described throughout this disclosure. The VAS frames may include particular features to support the single tap approach, double tap approach, the second communication channel, and/or the VAS as described throughout this disclosure. Accordingly, the VAS frames may be modified from legacy VAS frames to include the particular features.

Figures 9, 10:
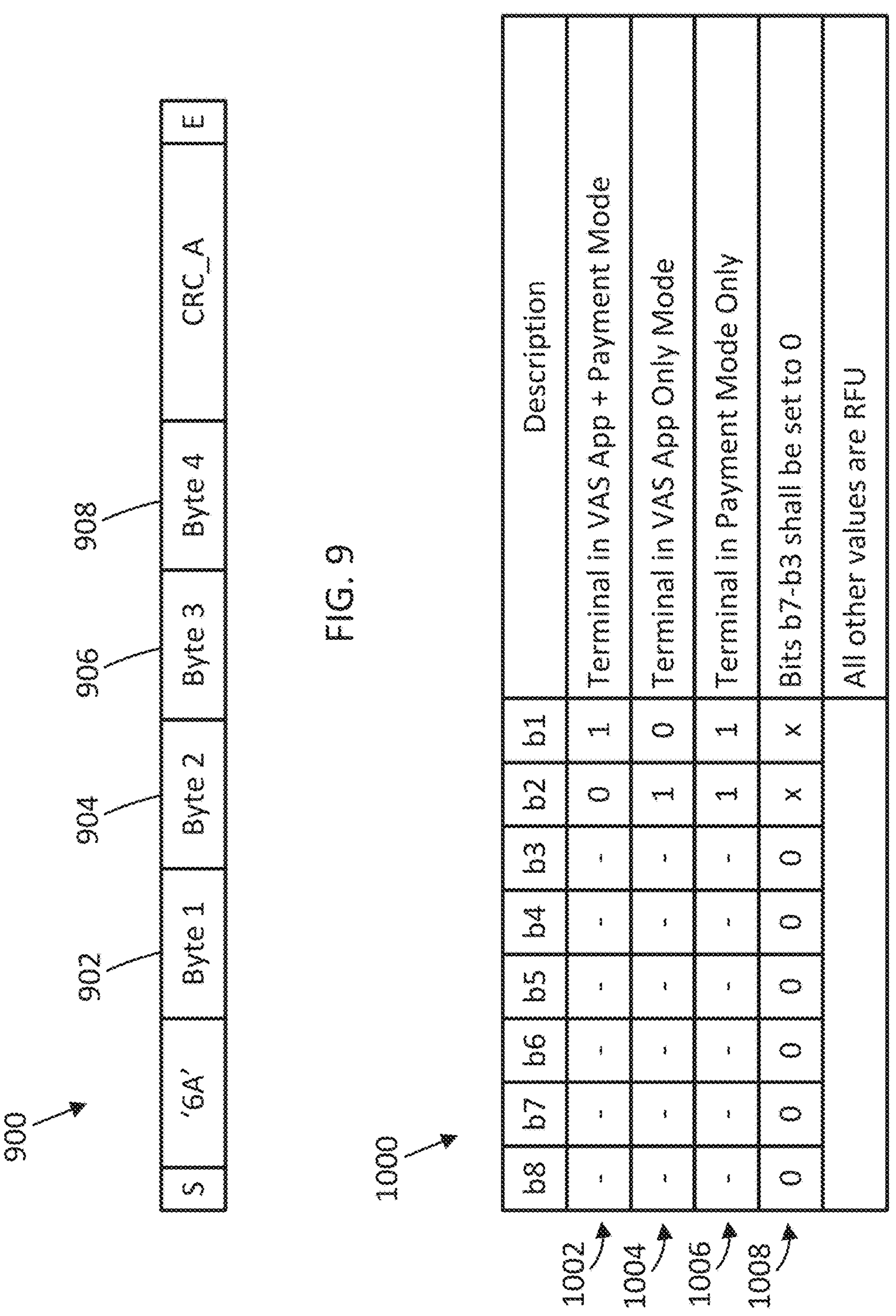
FIG. 9 illustrates an example command frame in accordance with some embodiments.
FIG. 10 illustrates example bit arrangements for the fourth byte of the command frame of FIG. 9 in accordance with some embodiments.

FIG. 9 illustrates an example command frame 900 in accordance with some embodiments. The command frame 900 may comprise a Type A standard frame as defined in section 6.2.3.2 of ISO/IEC 14443-3. (The International Organization for Standardization. (2018-07). International Standard; ISO/IEC 14443-3; Cards and Security Devices for Personal Identification—Contactless Proximity Objects—Part 3: Initialization and Anticollision). The command frame 900 may be utilized for waking up a PICC for a data transfer.

The command frame 900 may include a first byte 902, a second byte 904, a third byte 906, and a fourth byte 908. The first byte, the second byte 904, the third byte 906, the fourth byte 908, or some combination thereof may define operation of devices associated with the data transfer, such as the devices and data transfers described throughout this disclosure. For example, the first byte 902, the second byte 904, the third byte 906, the fourth byte 908, or some combination thereof may define whether the devices are to perform the single tap approach, the double tap approach, the second communication channel, and/or the VAS as described throughout the disclosure.

FIG. 10 illustrates example bit arrangements 1000 for the fourth byte 908 of the command frame 900 of FIG. 9 in accordance with some embodiments. For example, the bit arrangements 1000 illustrated provide possible values for the bits of the fourth byte 908 and the description of the operation or definition of the associated bits. Each of the bit arrangements 1000 may show a portion of the bits of the fourth byte 908 corresponding to the operation or the definition, where the bits of the fourth byte 908 not utilized for determining the operation or definition may be omitted (as indicated by dashes or 'x's).

The bit arrangements 1000 include a first bit arrangement 1002. The first bit arrangement 1002 may correspond to the devices operating in a VAS application and payment mode. In the VAS application and payment mode, the devices may perform VAS operations and payment operations (for example, the transfer of value between accounts) during a data transfer. As shown, the first bit arrangement 1002 may have a first bit (b1) within the fourth byte 908 having a value of 1 and a second bit (b2) within the fourth byte 908 having a value of 0. Accordingly, a command frame (such as the command frame 900 (FIG. 9)) having a fourth byte 908 with the b1 having the value of 1 and the b2 having the value of 0 may indicate to devices performing the data transfer that VAS operations and payment operations are to be performed during the data transfer. As indicated by a third bit (b3) through an eighth bit (b8) being omitted from the first bit arrangement 1002, the values of the b3 through the b8 may not affect the determination of whether the devices are to operate in the VAS application and payment mode.

The bit arrangements 1000 include a second bit arrangement 1004. The second bit arrangement 1004 may correspond to the devices operating in a VAS application mode. In the VAS application mode, the devices may perform VAS operations during a data transfer. Further, the payment operations may be omitted from the VAS application mode. As shown, the second bit arrangement 1004 may have the b1 within the fourth byte 908 having a value of 0 and the b2 with the fourth byte 908 having a value of 1. Accordingly, a command frame (such as the command frame 900) having a fourth byte 908 with the b1 having the value of 0 and the b2 having the value of 1 may indicate to devices performing the data transfer that VAS operations are to be performed during the data transfer and payment operations may not be performed during the data transfer. As indicated by a b3 through a b8 being omitted from the second bit arrangement 1004, the values of the b3 through the b8 may not affect the determination of whether the devices are to operate in the VAS application mode.

The bit arrangements 1000 include a third bit arrangement 1006. The third bit arrangement 1006 may correspond to the devices operating in a payment mode. In the payment mode, the devices may perform payment operations during a data transfer. Further, the VAS operations may be omitted from the payment mode. As shown, the third bit arrangement 1006 may have the b1 within the fourth byte 908 having a value of 1 and the b2 with the fourth byte 908 having a value of 1. Accordingly, a command frame (such as the command frame 900) having a fourth byte 908 with the b1 having the value of 1 and the b2 having the value of 1 may indicate to devices performing the data transfer that payment operations are to be performed during the data transfer and VAS operations may not be performed during the data transfer. As indicated by a b3 through a b8 being omitted from the second bit arrangement 1004, the values of the b3 through the b8 may not affect the determination of whether the devices are to operate in the VAS application mode.

The bit arrangements 1000 include a fourth bit arrangement 1008. In the fourth bit arrangement 1008, a b3 through a b8 may have a value of 0. In particular, the fourth bit arrangement 1008 may indicate that the b3 through the b8 are to be set to a value of 0, whereas a b1 and a b2 may be set in accordance with the first bit arrangement 1002, the second bit arrangement 1004, or the third bit arrangement 1006 to indicate a mode for the devices within a data transfer. For example, the values of the b1 and the b2 of the first bit arrangement 1002, the second bit arrangement 1004, or the third bit arrangement 1006 into the b1 and the b2 positions of the fourth bit arrangement 1008 (where the b3 through b8 have values of 0) to indicate the mode in which the devices in a data transfer are to operate. All other bit arrangements of the bit arrangements 1000 may be reserved for future use.

FIG. 11 illustrates example tags 1100 for a fourth byte according to some embodiments. For example, the tags 1100 may be for the fourth byte 908 (FIG. 9). The tags 1100 may correspond to a response message, such as the response message 518 (FIG. 5A), the response message 716 (FIG. 7), and/or the response message 730 (FIG. 7). For example, the tags 1100 may be utilized with the response message 518, the response message 716, and/or the response message 730.

The tags 1100 include a first tag 1102. The first tag 1102 may comprise a file control information (FCI) template. As shown, the first tag 1102 may have a value of '6F'. A length of the first tag 1102 may vary.

The tags 1100 may include a second tag 1104. The second tag 1104 may comprise an application label. For example, the second tag 1104 may include an application label that indicates an application which is utilized during a data transfer. In some embodiments, the application label may indicate that ApplePay is the application to be utilized during the data transfer. As shown, the second tag 1104 may have a value of '50'. A length of the second tag 1104 may be 8 bytes in some embodiments.

The tags 1100 may include a third tag 1106. The third tag 1106 may comprise an application version number. For example, the third tag 1106 may include an application version number for a device in a data transfer where the device is a mobile device. The application version number may be in Big Endian format. As shown, the third tag 1106 may have a value of '9F21'. A length of the third tag 1106 may be 2 bytes in some embodiments.

The tags 1100 may include a fourth tag 1108. The fourth tag 1108 may comprise an unpredictable number. For example, the fourth tag 1108 may include an unpredictable number for a device in a data transfer where the device is a mobile device. As shown, the fourth tag 1108 may have a value of '9F24'. A length of the fourth tag 1108 may be 4 bytes in some embodiments.

The tags 1100 may include a fifth tag 1110. The fifth tag 1110 may comprise mobile capabilities information. For example, the fifth tag 1110 may indicate capabilities of a mobile device in a data transfer. Some mobile capabilities that may be indicated by the fifth tag 1110 are described further in relation to FIG. 12. As shown, the fifth tag 1110 may have a value of '9F23'. A length of the fifth tag 1110 may be 4 bytes in some embodiments.

FIG. 12 illustrates example bit arrangements 1200 for the fifth tag 1110 in accordance with some embodiments. For example, the bit arrangements 1200 may be implemented in a byte of the fifth tag 1110. The values of the bit arrangements 1200 may indicate mobile capabilities of a device in a data transfer.

The bit arrangements 1200 may include a first bit arrangement 1202. The first bit arrangement 1202 shows values that may be set for a b1 and a b2 of the fifth tag 1110. As shown, the b1 may be set with a value of 1 and the b2 may be set with a value of 0 for the first bit arrangement 1202. The values of b1 and b2 may be set as shown for the byte of the fifth tag 1110.

The bit arrangements 1200 may include a second bit arrangement 1204. The second bit arrangement 1204 shows values that may be set for a b3 and a fourth bit (b4) of the fifth tag 1110. The b3 and the b4 of the fifth tag 1110 may indicate whether loyalty operations (such as VAS related to a merchant loyalty club) are supported by a device within a data transfer. As shown, the b3 may be set with a value of 1 and the b4 may be set with a value of 0 for the second bit arrangement 1204. The b3 having a value of 1 and the b4 having a value of 0 may indicate that loyalty operations are supported and a loyalty protocol is to be skipped.

The bit arrangements 1200 may include a third bit arrangement 1206. The third bit arrangement 1206 shows values that may be set for a b3 and b4 of the fifth tag 1110. The b3 and the b4 of the fifth tag 1110 may indicate whether loyalty operations (such as VAS related to a merchant loyalty club) are supported by a device within a data transfer. As shown, the b3 may be set with a value of 1 and the b4 may be set with a value of 1 for the third bit arrangement 1206. The b3 having a value of 1 and the b4 having a value of 1 may indicate that loyalty operations are supported and the device is to proceed with a loyalty protocol.

The bit arrangements 1200 may include a fourth bit arrangement 1208. The fourth bit arrangement 1208 shows values that may be set for a fifth bit (b5) and a sixth bit (b6) of the fifth tag 1110. The b5 and the b6 of the fifth tag 1110 may indicate whether payment operations (such as the transfer of value between accounts) are supported by a device within a data transfer. As shown, the b5 may be set with a value of 1 and the b6 may be set with a value of 0 for the fourth bit arrangement 1208. The b5 having a value of 1 and the b6 having a value of 0 may indicate that payment operations are supported and no payment data is forthcoming.

The bit arrangements 1200 may include a fifth bit arrangement 1210. The fifth bit arrangement 1210 shows values that may be set for a b5 and a b6 of the fifth tag 1110. The b5 and the b6 of the fifth tag 1110 may indicate whether payment operations (such as the transfer of value between accounts) are supported by a device within a data transfer. As shown, the b5 may be set with a value of 1 and the b6 may be set with a value of 1 for the fifth bit arrangement 1210. The b5 having a value of 1 and the b6 having a value of 1 may indicate that payment operations are supported and payment data is forthcoming.

The bit arrangements 1200 may include a sixth bit arrangement 1212. The sixth bit arrangement 1212 may indicate whether a value data (such as tipping) and/or communication handover are supported. In particular, the sixth bit arrangement 1212 may indicate whether the value data at a data originating device (such as the entry of the value data by the data originating devices as described throughout this disclosure) and/or whether handover from a first communication channel to a second communication channel (such as the establishment of and transmissions via the second communication channel as described throughout this disclosure) are supported. The sixth bit arrangement 1212 indicates that values of a seventh bit (b7) and an eighth bit (b8) of the fifth tag 1110 may be utilized to indicate whether the value data and/or the handover are supported, as indicated by the asterisks shown in positions for the b7 and the b8 in the sixth bit arrangement 1212. Particular values for the b7 and the b8 may indicate whether a device within a data transfer support the value data and/or communication handover. For example, a first combination of values for the b7 and the b8 may indicate that the value data is supported and a second combination of values for the b7 and the b8 may indicate that both the value data and the communication handover are indicated in some embodiments. In some of these embodiments, the b7 having a value of 1 and the b8 having a value of 0 may indicate that the value data is supported, and the b7 having a value of 1 and the b8 having a value of 1 may indicate that the value data and the communication handover is supported. In other embodiments, one of the b7 or the b8 may indicate whether the value data is supported and the other of the b7 or the b8 may indicate whether the handover is supported. For example, a value of the b7 may indicate whether the value data is supported and a value of the b8 may indicate whether the handover is supported.

As the byte represented the bit arrangements 1200 are included in the fifth tag 1110, the bits may be transmitted in a response message, such as the response message 518 (FIG. 5A), the response message 716 (FIG. 7), and/or the response message 730 (FIG. 7). In particular, bit values within a byte of the fifth tag 1110 included in the response message may be set in accordance with the first bit arrangement 1202, the second bit arrangement 1204, the third bit arrangement 1206, the fourth bit arrangement 1208, the fifth bit arrangement 1210, and/or the sixth bit arrangement 1212 to indicate whether loyalty operations are supported, payment operations are supported, value data is supported, communication handover is supported, or some combination thereof is supported by a device in data transfer. In particular, the response message with the byte may be transmitted from a device to another device in the data transfer to indicate whether the device supports the loyalty operations, the payment operations, the value data, and/or the communication handover. Having the byte indicate whether the value data and/or communication handover are supported may enable the entry of the value data at the data originating device and the communication handover to the second communication channel as described throughout this disclosure.

FIG. 13 illustrates example codes 1300 for a VAS frame in accordance with some embodiments. In particular, the codes 1300 may correspond to a get VAS data message, such as the get VAS data message 520 (FIG. 5A). Accordingly, the information included in each of the codes, or some portion thereof, may be transmitted in a get VAS data message during a data transfer.

The codes 1300 may include a CLA code 1302, an INS code 1304, a P1 code 1306, a P2 code 1308, an Lc code 1310, a data code 1312, an Le code 1314, or some combination thereof. The codes may indicate that data is to be retrieved, VAS data is to be retrieved, mobile capabilities information, length of a data field, command data, or some combination thereof in a data transfer.

The P2 code 1308 may be utilized to indicate whether an value data is supported. In particular, the P2 code 1308 may indicate the mobile capabilities information of a device in a data transfer, such as whether uniform resource locator (URL) VAS protocol is supported, whether full VAS protocol is supported, whether entry of a value data at a data originating device is supported, or some combination thereof. Particular values of the P2 code 1308 may indicate the mobile capabilities information of a device within a data transfer. For example, the P2 code 1308 having a value of '10' may indicate that entry of a value data at a data originating device is supported. Having the P2 code 1308 indicate whether entry of the value data is supported may enable entry of a value data during a data transfer.

FIG. 14 illustrates example tags 1400 for a VAS frame in accordance with some embodiments. In particular, the tags 1400 may correspond to a get VAS data message, such as the get VAS data message 520 (FIG. 5A). Accordingly, each of the tags 1400, or some portion thereof, may be transmitted in a get VAS data message during a data transfer.

Each of the tags 1400 may correspond to certain information included in a get VAS data message. For example, the tags 1400 may include a first tag 1402, a second tag 1404, a third tag 1406, a fourth tag 1408, a fifth tag 1410, a sixth tag 1412, a seventh tag 1414, and an eighth tag 1416, where each of the tags 1400 may correspond to different information. For example, the first tag 1402 may correspond to an application version number, where the first tag 1402 may indicate the application version number. The application number version may correspond to a terminal (such as one of the devices described throughout this disclosure) and may be in Big Endian format. The second tag 1404 may correspond to a first ID, where the second tag 1404 may indicate the first ID. In some embodiments, the first ID may be a merchant ID. The third tag 1406 may correspond to an unpredictable number, where the third tag 1406 may indicate an unpredictable number associated with the terminal. The fourth tag 1408 may correspond to terminal capabilities information, where the fourth tag 1408 may indicate the terminal capabilities information for the terminal. The fifth tag 1410 may correspond to a VAS filter, where the fifth tag 1410 may indicate a VAS filter to be utilized. The sixth tag 1412 may correspond to a first URL, where the sixth tag 1412 may indicate a first URL associated with a data receiving device. In some embodiments, the first URL may be a merchant URL.

The seventh tag 1414 may correspond to a value data, where the seventh tag 1414 may indicate a value data for a data transfer. In particular, the seventh tag 1414 may be utilized for value data entered at a data originating device as described throughout this disclosure. The seventh tag 1414 may be utilized for transmission of the value data between devices in a data transfer. The seventh tag 1414 may have a unique value that is utilized to identify the seventh tag 1414. The unique value may indicate the seventh tag 1414 in the get VAS data message to allow a device to identify the value data in the message. The seventh tag 1414 may facilitate the entry of the value data at the data originating device.

The eighth tag 1416 may correspond to a universally unique identifier (UUID), where the eighth tag 1416 may indicate a UUID for a data transfer. For example, the eighth tag 1416 may provide a UUID for a communication handover to a second communication channel, such as the communication handovers described throughout this disclosure. The UUID may uniquely define a second communication channel associated with a data transfer. For example, the devices may utilize the UUID to match a value data transmitted via the second communication channel with a VAS performed via a first communication channel. The eighth tag 1416 may have a unique value that is utilized to identify the eighth tag 1416. The unique value may indicate the eighth tag 1416 in the get VAS data message to allow a device to identify the UUID in the message. The eighth tag 1416 may facilitate the entry of the value data at the data originating device. In particular, the eighth tag 1416 may facilitate the entry of the value data via the single tap approach described throughout this disclosure.

FIG. 15 illustrates example tags 1500 for a VAS frame in accordance with some embodiments. In particular, the tags 1500 may correspond to a VAS response message, such as the VAS indication message 522 (FIG. 5A). Accordingly, each of the tags 1500, or some portion thereof, may be transmitted in a VAS response message during a data transfer.

Each of the tags 1500 may correspond to certain information included in a VAS response message. For example, the tags 1500 may include a first tag 1502, a second tag 1504, a third tag 1506, and a fourth tag 1508, where each of the tags 1500 may correspond to different information. For example, the first tag 1502 may correspond to a VAS data template, where the first tag 1502 may indicate a VAS data template to be utilized in a data transfer. The second tag 1504 may correspond to a mobile token, where the second tag 1504 may indicate a mobile token associated with a device in a data transfer. The third tag 1506 may correspond to VAS data, where the third tag 1506 may indicate VAS data for a data transfer.

The fourth tag 1508 may correspond to a value data, where the fourth tag 1508 may indicate a value data. For example, the fourth tag 1508 may indicate a value data entered via a data originating device in a data transfer. For example, the value data may be a value entered by a user of a data originating device as described throughout this disclosure. The fourth tag 1508 may be utilized for transmission of the value data between devices in a data transfer. The fourth tag 1508 may have a unique value that is utilized to identify the fourth tag 1508. The fourth tag 1508 may indicate the fourth tag 1508 in the VAS response message to allow a device to identify the value data in the message. The fourth tag 1508 may facilitate the entry of the value data at the data originating device.

VIII. Data Transfer Procedures

Figure 16:
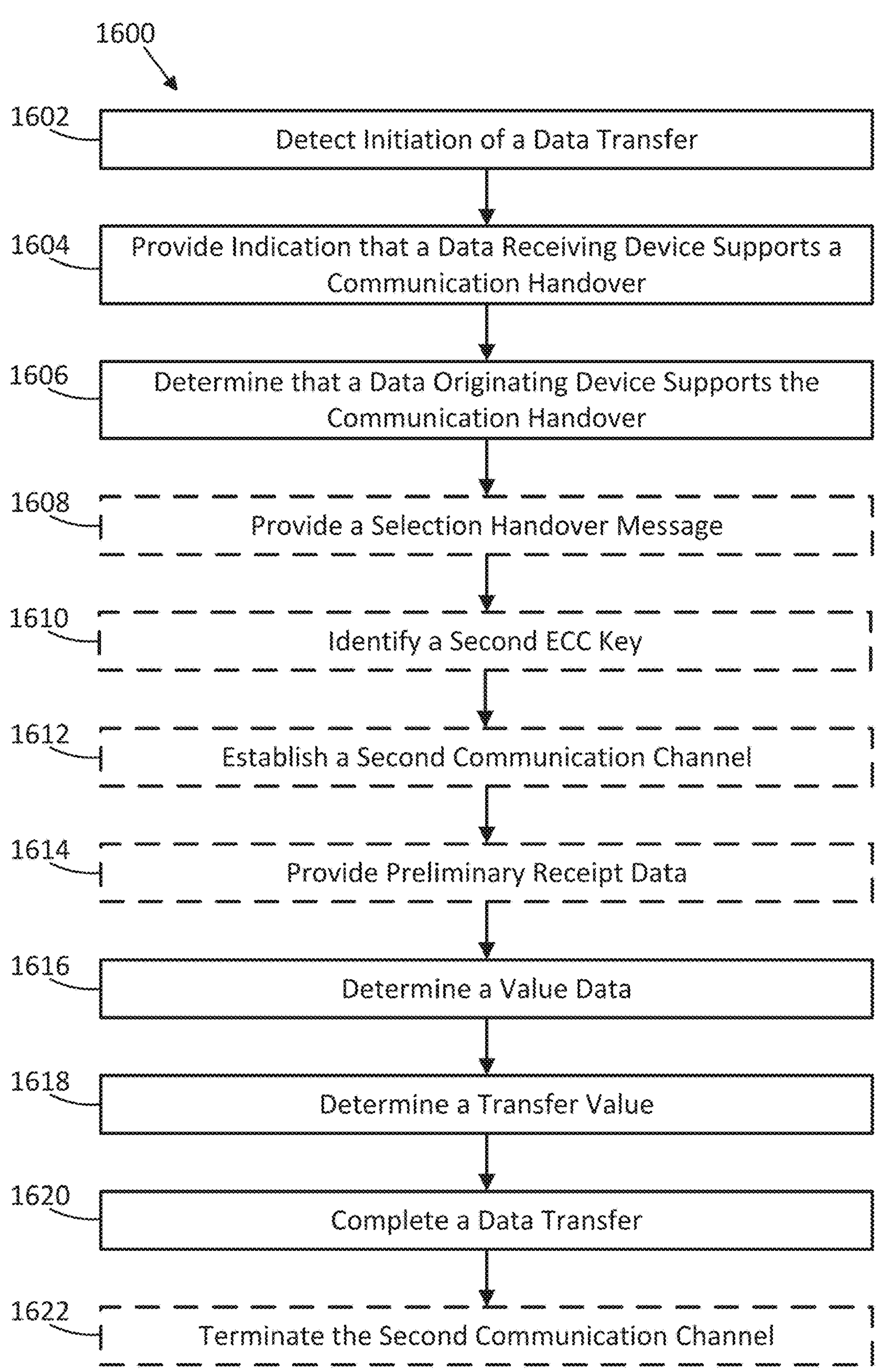
FIG. 16 illustrates an example procedure for a data receiving device within a data transfer with a second communication channel in accordance with some embodiments.

FIG. 16 illustrates an example procedure 1600 for a data receiving device within a data transfer with a second communication channel in accordance with some embodiments. For example, the procedure 1600 may be performed by the data receiving device 102 (FIG. 1), the data receiving device 202 (FIG. 2A), the data receiving device 402 (FIG. 4A), the data receiving device 502 (FIG. 5A), and/or the data receiving device 702 (FIG. 7) as part of a data transfer. The data receiving device may be associated with a merchant selling goods and/or services for value. In some embodiments, the data transfer may be a payment transaction where monetary value is exchanged for goods and/or services being provided by the merchant. The procedure 1600, or portions thereof, may be performed as part of the data transfers described throughout this disclosure on the data receiving device and/or the data originating device.

In 1602, the data receiving device may detect an initiation of a data transfer. The data receiving device may detect an initiation of a data transfer in accordance with any of the approaches of detecting an initiation of a data transfer as described throughout this disclosure. A user of the data receiving device may have interacted with the data receiving device to indicate that the data receiving device is to monitor for an initiation of the data transfer. For example, the user of the data receiving device may have entered a value for the data transfer. The data receiving device may be functioning as a POS device in some embodiments. In response to the entry of the value for the data transfer by the user, the data receiving device may begin to monitor for the initiation of the data transfer. In some embodiments, the data receiving device may detect a data originating device being located within, or entering, a first proximity (such as the first proximity 604 (FIG. 6)) of the data receiving device. The data originating device may be functioning as a NFC payment device in some embodiments. The data receiving device may detect the data originating device via a first communication channel, where the first communication channel may implement NFC. The data originating device may be acting as an electronic element when detected by the data receiving device. The initiation of the data transfer may be detected by the data receiving device based on the detection that the data originating device is within the first proximity of the data receiving device in some embodiments.

In 1604, the data receiving device may provide an indication that the data receiving device supports a communication handover. In particular, the data receiving device may provide to the data originating device an indication that the data receiving device supports a communication handover on a second communication channel for the data transfer. The data receiving device may provide the indication via the first communication channel. For example, the data receiving device may provide an indication (such as the handover support indication 302 (FIG. 3A) and/or the handover support indication 406 (FIG. 4A)) that the data receiving device supports a communication handover on a second communication channel for the data transfer. In some embodiments, providing the indication that the data receiving device supports the communication handover may include providing an indication that the data receiving device supports input of a value data (such as a tip amount) for the data transfer at the data originating device.

In 1606, the data receiving device may determine that the data originating device supports the communication handover. In particular, the data receiving device may determine that the data originating device supports the communication handover on the second communication. The data receiving device may determine that the data originating device supports the communication handover based at least in part on an indication, receiving from the data originating device, that the data originating device supports the communication handover on the second communication channel. The data receiving device may receive the indication on the first communication channel. In some embodiments, the data receiving device may receive the indication in a support indication, such as the support indication 304 (FIG. 3A) and/or the support indication 408 (FIG. 4A). In some embodiments, determining that the data originating device supports the communication handover includes determining that the data originating device supports input of the value data (such as a tip amount) for the data transfer at the data originating device.

In 1608, the data receiving device may provide a selection handover message. For example, the data receiving device may provide a selection handover message to the data originating device. The data receiving device may provide the selection handover message on the first communication channel. The selection handover may include a first ECC key. The first ECC key may be a merchant ECC key in some embodiments. The selection handover message may comprise the selection handover message 310 (FIG. 3A) and/or the selection handover message 414 (FIG. 4A). In some embodiments, 1608 may be omitted.

In 1610, the data receiving device may identify a second ECC key. In particular, the data receiving device may identify a second ECC key received in a handover response message received from the data originating device. The data receiving device may receive the handover response message on the first communication channel. The second ECC key may be a customer ECC key in some embodiments. The handover response message may comprise the handover response message 312 (FIG. 3A) and/or the handover response message 416 (FIG. 4A). In some embodiments, 1610 may be omitted.

In 1612, the data receiving device may establish the second communication channel. In particular, the data receiving device may establish the second communication channel (such as the second communication channel 114 (FIG. 1)) between the data receiving device and the data originating device. The second communication channel may be established via a channel setup procedure, such as the channel setup procedure 352 (FIG. 3B), the channel setup procedure 452 (FIG. 4B), and/or the channel setup procedure 552 (FIG. 5B). In some embodiments, the second communication channel may be established based on the first ECC key, the second ECC key, a session name, a password, or some combination thereof.

The second communication channel may implement a communication protocol different from the first communication channel. For example, the first communication channel may implement NFC and the second communication channel may implement a communication protocol different from the NFC. The second communication channel may implement Wi-Fi, ultra-wideband, Bluetooth, or another wireless communication protocol different from the NFC in some embodiments. In some embodiments, the second communication channel may be established via a wide area and/or public network, such as the Internet. The use of the different protocol for the second communication channel may provide for a greater range of communication between the data receiving device and the data originating device. For example, the second communication channel may have a second proximity (such as the second proximity 608 (FIG. 6)) for communication that is greater than the first proximity for communication via the first communication channel. Accordingly, the data receiving device and the data originating device may communicate via the second communication channel at a greater distance than they can communicate via the NFC. In some embodiments, the second communication channel may implement different security from the security implemented by the first communication channel. The security implemented by the second communication channel may provide stronger security than the security implemented by the first communication channel in some embodiments. In some embodiments, 1612 may be omitted.

In 1614, the data receiving device may provide preliminary receipt data. In particular, the data receiving device may provide the preliminary receipt data to the data originating device on the second communication channel. The preliminary receipt data may include a preliminary receipt (such as the preliminary receipt 214 (FIG. 2B) and/or the preliminary receipt 808 (FIG. 8A)), or data to produce a preliminary receipt at the data originating device. The preliminary receipt may indicate a preliminary receipt value of the data transfer. In some embodiments, the preliminary receipt value may be an amount that a merchant is charging for goods and/or services being purchased by a user of the data originating device. The data receiving device may provide the preliminary receipt data in a service message (such as the service response message 356 (FIG. 3B), the supported services message 456 (FIG. 4B), and/or the supported services message 556 (FIG. 5B)). In some embodiments, 1614 may be omitted.

In 1616, the data receiving device may determine a value data. In particular, the data receiving device may determine the value data based on an indication of the value data received on the second communication channel. The indication of the value data may be received in a value data message (such as the value data message 374 (FIG. 3B)) or a get service message (such as the get service message 460 (FIG. 4B), and/or a get service message 470 (FIG. 4B)). The value data may comprise a value entered into a user input field (such as the user input field 108 (FIG. 1), the first user input field 216 (FIG. 2B), and/or the second user input field 814 (FIG. 8A)) at the data originating device by a user of the data originating device. In some embodiments, the value data may be a tip amount for the data transfer. The data receiving device may receive the indication of the value data via the second communication channel in some embodiments.

In 1618, the data receiving device may determine a transfer value. In particular, the data receiving device may determine a transfer value for the data transfer based at least in part on the value data. The data receiving device may determine the transfer value by adding the value data to the preliminary receipt value in some embodiments. In these embodiments, the transfer value may be equal to the preliminary receipt value plus the tip amount.

In 1620, the data receiving device may complete the data transfer. In particular, the data receiving device may complete the data transfer with the transfer value. The data receiving device may perform a payment loop (such as the payment loop 318 (FIG. 3A) and/or the payment loop 422 (FIG. 4A)) and a payment authorization result (such as the payment authorization result 320 (FIG. 3A) and/or the payment authorization result 424 (FIG. 4A)) to complete the data transfer. In some embodiments, the data receiving device may perform the payment loop with the preliminary receipt value without the value data, may perform the payment loop with the transfer value, or may perform portions of the payment loop with the preliminary receipt value without the value data and other portions of the payment loop with the transfer value. The data receiving device may complete the data transfer via the first communication channel. The completion of the data transfer may result in transfer of the transfer value (such as monetary compensation) from an account associated with the user of the data originating device to an account associated with the user of the data receiving device.

In 1622, the data receiving device may terminate the second communication channel. In particular, the data receiving device may terminate the second communication channel based at least in part on the completion of the data transfer. For example, the data receiving device may terminate the second communication channel between the data receiving device and the data originating device in response to the completion of the data transfer.

Figure 17:
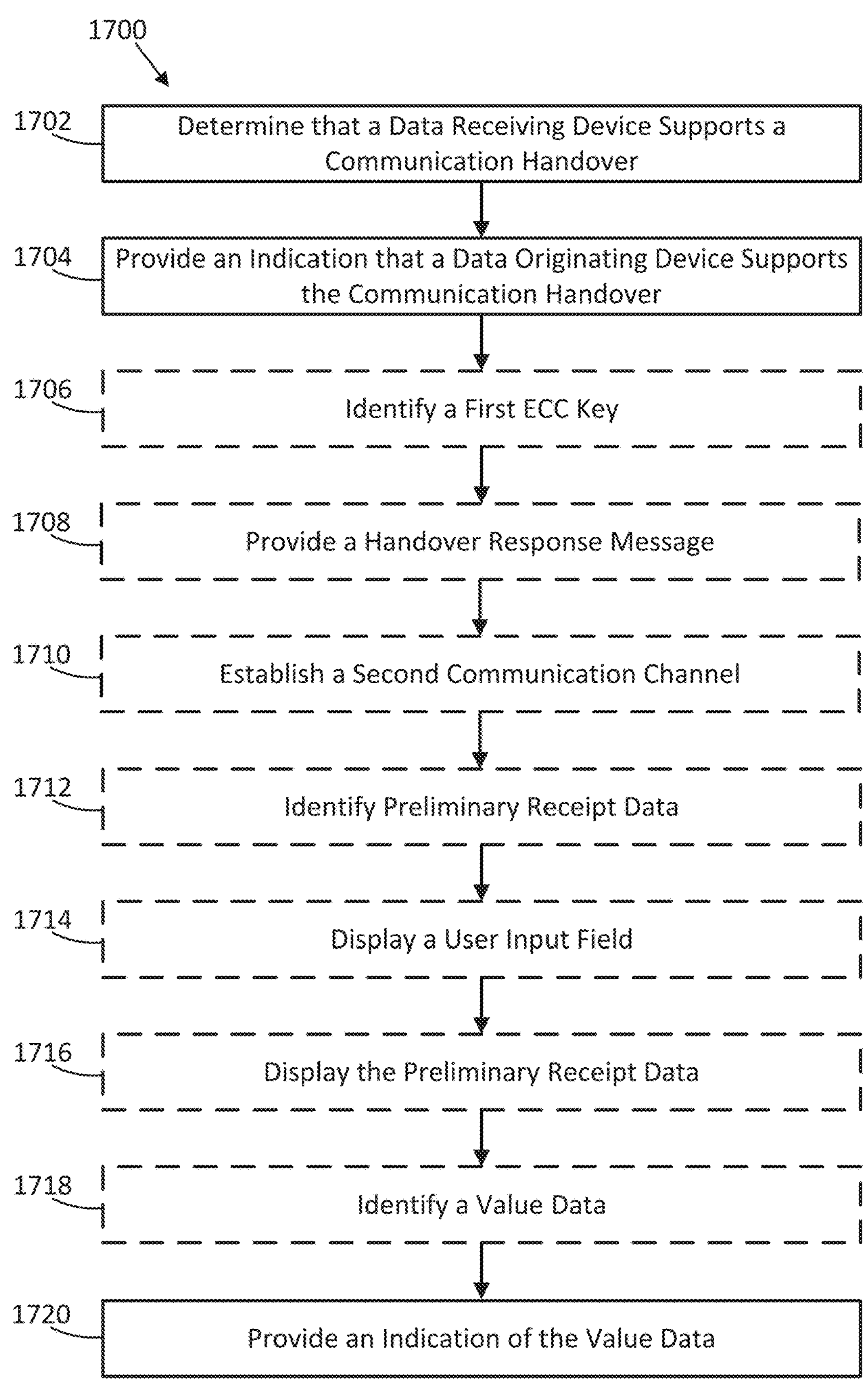
FIG. 17 illustrates an example procedure for a data originating device within a data transfer with a second communication channel in accordance with some embodiments.

FIG. 17 illustrates an example procedure 1700 for a data originating device within a data transfer with a second communication channel in accordance with some embodiments. For example, the procedure 1700 may be performed by the data originating device 104 (FIG. 1), the data originating device 204 (FIG. 2A), the data originating device 404 (FIG. 4A), the data originating device 504 (FIG. 5A), and/or the data originating device 704 (FIG. 7) as part of a data transfer. The data originating device may be associated with a customer purchasing goods and/or services from a merchant for value. In some embodiments, the data transfer may be a payment transaction where monetary value is exchanged for the goods and/or services being provided by the merchant. The procedure 1700, or portions thereof, may be performed as part of the data transfers described throughout this disclosure and may result in the display of the interfaces described throughout this disclosure on the data receiving device and/or the data originating device.

In 1702, the data originating device may determine that a data receiving device supports a communication handover. In particular, the data originating device may determine that the data receiving device supports a communication handover on a second communication channel for the data transfer. The data originating device may determine that the data receiving device supports the communication handover based at least in part on an indication received from the data receiving device. The data originating device may receive the indication on a first communication channel. The first communication channel may implement NFC. The data originating device may receive the indication via the handover support indication 302 (FIG. 3A) and/or the handover support indication 406 (FIG. 4). In some embodiments, the data originating device may be functioning as a NFC payment device and the data receiving device may be functioning as a POS device.

In 1704, the data originating device may provide an indication that the data originating device supports the communication handover. In particular, the data originating device may provide an indication that the data originating device supports the communication handover on the second communication channel to the data receiving device. The data originating device may provide the indication on the first communication channel. The data originating device may provide the indication in a support indication, such as the support indication 304 (FIG. 3A) and/or the support indication 408 (FIG. 4A).

In 1706, the data originating device may identify a first ECC key. In particular, the data originating device may identify the first ECC key received in a selection handover message (such as the selection handover message 310 (FIG. 3A) and/or the selection handover message 414 (FIG. 4A)) received from the data receiving device. The selection handover message may be received In some embodiments, the first ECC key may be a merchant ECC key. In some embodiments, 1706 may be omitted.

In 1708, the data originating device may provide a handover response message. In particular, the data originating device may provide a handover response message (such as the handover response message 312 (FIG. 3A) and/or the handover response message 416 (FIG. 4A)) to the data receiving device on the first communication channel. The data originating device may transmit the handover response message in response to the selection handover message. The data originating device may provide the handover response message on the second communication channel. The handover response message may include a second ECC key. The second ECC key may be a customer ECC key in some embodiments. In some embodiments, 1708 may be omitted.

In 1710, the data originating device may establish a second communication channel. In particular, the data originating device may establish the second communication channel between the data receiving device and the data originating device. The second communication channel may be established via a channel setup procedure, such as the channel setup procedure 352 (FIG. 3B), the channel setup procedure 452 (FIG. 4B), and/or the channel setup procedure 552 (FIG. 5B). The second communication channel may be established based on the first ECC key, the second ECC key, a session name, a password, or some combination thereof. The second communication channel may implement a different communication protocol from the first communication channel. For example, the first communication channel may implement NFC in some embodiments. The second communication channel may implement Wi-Fi, ultra-wideband, Bluetooth, or another wireless communication protocol different from the NFC. In some embodiments, the second communication channel may be established via a wide area and/or public network, such as the Internet. The use of the different protocol for the second communication channel may provide for a greater range of communication between the data receiving device and the data originating device. For example, the second communication channel may have a second proximity (such as the second proximity 608 (FIG. 6)) for communication that is greater than the first proximity for communication via the first communication channel. Accordingly, the data originating device and the data receiving device may communicate via the second communication channel at a greater distance than they can communicate via the first communication channel. In some embodiments, the second communication channel may implement different security from the security implemented by the first communication channel. The security implemented by the second communication channel may provide stronger security than the security implemented by the first communication channel in some embodiments. In some embodiments, 1710 may be omitted.

In 1712, the data originating device may identify preliminary receipt data. In particular, the data originating device may identify preliminary receipt data received from the data receiving device. The data originating device may receive the preliminary receipt data on the second communication channel. The preliminary receipt data may include a preliminary receipt (such as the preliminary receipt 214 (FIG. 2B) and/or the preliminary receipt 808 (FIG. 8A)), or data to produce a preliminary receipt at the data originating device. The preliminary receipt may include a preliminary receipt value of the data transfer. In some embodiments, the preliminary receipt value may be an amount that a merchant is charging for goods and/or services being purchased by a user of the data originating device. The preliminary receipt data may be received in a service message (such as the service response message 356 (FIG. 3B), the supported services message 456 (FIG. 4B), and/or the supported services message 556 (FIG. 5B)). In some embodiments, 1712 may be omitted.

In 1714, the data originating device may display a user input field. In particular, the data originating device may display a user input field for input of a value data for the data transfer. The data originating device may display the user input field on a display of the data originating device. The user input field may comprise the user input field 108 (FIG. 1), the first user input field 216 (FIG. 2B), the second user input field 220 (FIG. 2B), the first user input field 810 (FIG. 8A), and/or the second user input field 814 (FIG. 8A). In some embodiments, the data originating device may receive an indication of the user input field in a service response message (such as the service response message 356 (FIG. 3B), the service response message 462 (FIG. 4B), the service response message 472 (FIG. 4B)) received from the data receiving device. The data originating device may receive the service response message on the first communication channel or the second communication channel. In some embodiments, 1714 may be omitted.

In 1716, the data originating device may display the preliminary receipt data. For example, the data originating device may display the preliminary receipt data with the user input field. In some embodiments, displaying the preliminary receipt data may include displaying the preliminary receipt, such as the preliminary receipt 214 and/or the preliminary receipt 808. In some embodiments, 1716 may be omitted.

In 1718, the data originating device may identify a value data. In particular, the data originating device may identify a value data of the user input field received at the data originating device. For example, the data originating device may identify a value data entered into the user input field displayed on the data originating device. The value data, or some portion thereof, may be entered into the user input field by a user of the data originating device via user interaction with the data originating device. In some embodiments, the user input field may comprise a tip amount input field and the value data may comprise a tip amount for the data transfer. In some embodiments, 1718 may be omitted.

In 1720, the data originating device may provide an indication of the value data. In particular, the data originating device may provide the indication of the value data to the data receiving device on the second communication channel. The data originating device may transmit the indication of the value data in a value data message (such as the value data message 374 (FIG. 3B)) or a get service message (such as the get service message 460 (FIG. 4B), and/or a get service message 470 (FIG. 4B)). The data originating device may transmit the value data message or the get service message on the first communication channel or the second communication channel.

Figure 18:
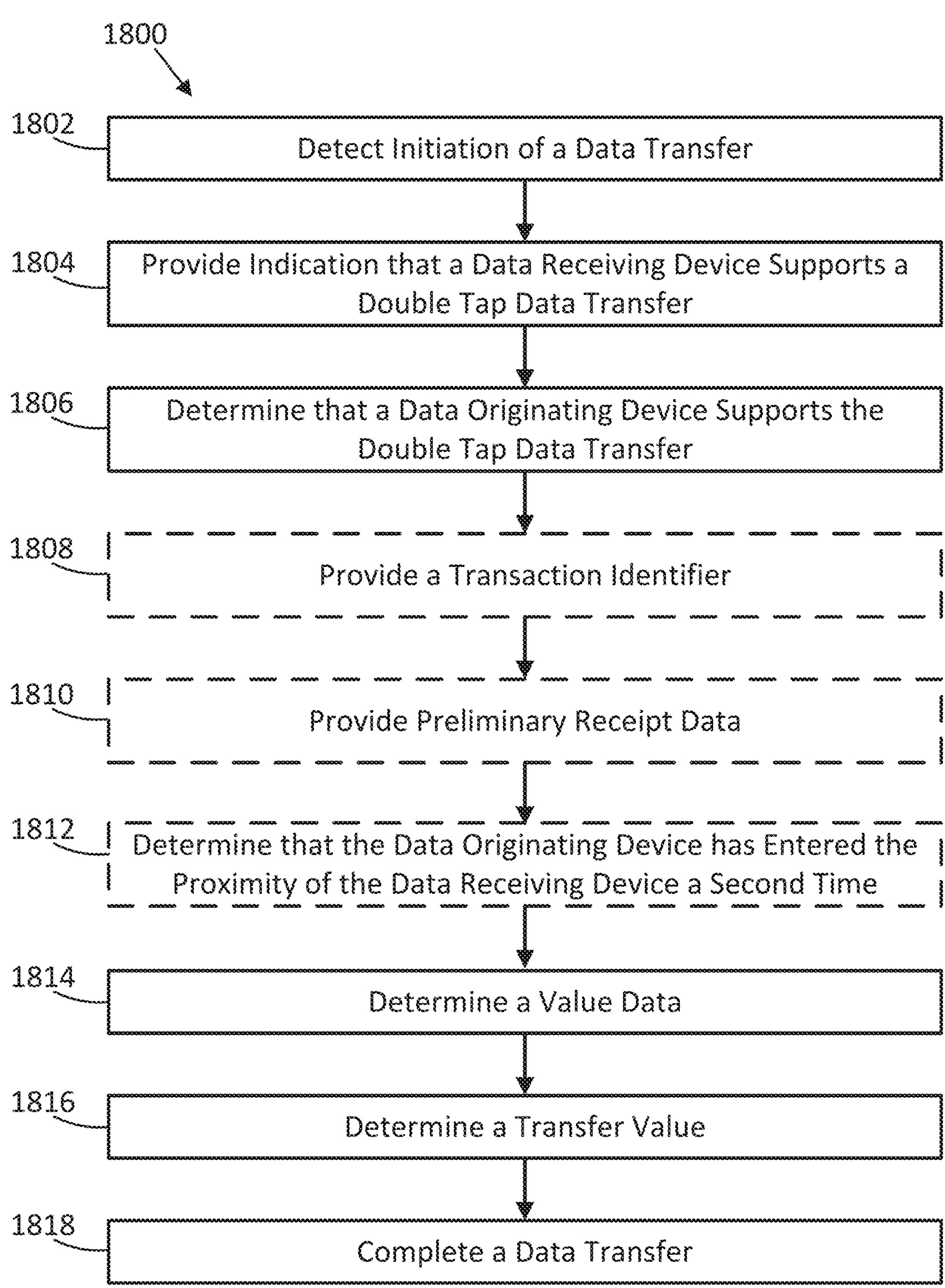
FIG. 18 illustrates an example procedure for a data receiving device within a data transfer with a double tap data transfer in accordance with some embodiments.

FIG. 18 illustrates an example procedure 1800 for a data receiving device within a data transfer with a double tap data transfer in accordance with some embodiments. For example, the procedure 1800 may be performed by the data receiving device 102 (FIG. 1), the data receiving device 202 (FIG. 2A), the data receiving device 402 (FIG. 4A), the data receiving device 502 (FIG. 5A), and/or the data receiving device 702 (FIG. 7) as part of a data transfer. The data receiving device may be associated with a merchant selling goods and/or services for value. In some embodiments, the data transfer may be a payment transaction where monetary value is exchanged for the goods and/or services being provided by the merchant. The procedure 1800, or portions thereof, may be performed as part of the data transfers described throughout this disclosure and may result in the display of the interfaces described throughout this disclosure on the data receiving device and/or the data originating device.

In 1802, the data receiving device may detect an initiation of a data transfer. In particular, the data receiving device may detect an initiation of a data transfer with a data originating device. The data receiving device may detect the initiation based at least in part on a first time that the data originating device has entered a proximity of the data receiving device. A user of the data receiving device may have interacted with the data receiving device to indicate that the data receiving device is to monitor for an initiation of the data transfer. For example, the user of the data receiving device may have entered a value for the data transfer. In response to the entry of the value of the data transfer by the user, the data receiving device may begin to monitor for the initiation of the data transfer. In some embodiments, the data receiving device may detect a data originating device being located within, or entering, a proximity (such as the first proximity 604 (FIG. 6)) of the data receiving device. The data receiving device may detect the data originating device via a communication channel, where the communication channel may implement NFC. The data originating device may be acting as an electronic element when detected by the data receiving device. In some embodiments, the data receiving device may be functioning as a POS device and the data originating device may be functioning as a NFC payment device. The initiation of the data transfer may be detected by the data receiving device based on the detection that the data originating device is within the proximity of the data receiving device in some embodiments.

In 1804, the data receiving device may provide an indication that a data receiving device supports a double tap data transfer. In particular, the data receiving device may provide the indication to the data originating device. The data receiving device may provide the indication based at least in part on the detection that the data originating device has entered the proximity of the data receiving device. In some embodiments, the indication may be provided during a first time that the data originating device has entered the proximity of the data receiving device. The data receiving device may provide the indication via a double tap support indication, such as the double tap support indication 706 (FIG. 7). The indication that the data receiving device supports the double tap data transfer may indicate that the data receiving devices supports receipt of an indication of value data during by the data receiving device during a second time that the data originating device has entered the proximity of the data receiving device. The value data may comprise a tip amount in some embodiments. In some embodiments, the data receiving device may provide the indication via NFC.

In 1806, the data receiving device may determine that the data originating device supports the double tap data transfer. In particular, the data receiving device may determine that the data originating device supports the double tap data transfer based at least in part on an indication that the data originating device supports the double tap data transfer received from the data originating device. In some embodiments, the indication may be received during the first time that the data originating device has entered the proximity of the data receiving device. The data receiving device may receive the indication via a support indication, such as the support indication 708 (FIG. 7). The indication that the data originating device supports the double tap data transfer may indicate that the data originating device supports transmission of the indication of the value data during the second time that the data originating device has entered the proximity of the data receiving device. In some embodiments, the data receiving device may receive the indication via NFC.

In 1808, the data receiving device may provide a transaction ID. In particular, the data receiving device may provide a transaction ID during the first time that the data originating device has entered the proximity of the data receiving device. The data receiving device may provide the transaction ID in a selection message, such as the selection message 714 (FIG. 7). The transaction ID may correspond to the data transfer, such that the data transfer may be identified from the transaction ID. In some embodiments, 1808 may be omitted.

In 1810, the data receiving device may provide preliminary receipt data. In particular, the data receiving device may provide the preliminary receipt data to the data originating device. The data receiving device may provide the preliminary receipt data during the first time that the data originating device has entered the proximity of the data receiving device. The preliminary receipt data may include a preliminary receipt (such as the preliminary receipt 214 (FIG. 2B) and/or the preliminary receipt 808 (FIG. 8A)), or data to produce a preliminary receipt at the data originating device. The preliminary receipt may indicate a preliminary receipt value of the data transfer. In some embodiments, the preliminary receipt value may be an amount that a merchant is charging for goods and/or services being purchased by a user of the data originating device. The data receiving device may provide the preliminary receipt data in a selection message, such as the selection message 714. In some embodiments, 1810 may be omitted.

In 1812, the data receiving device may determine that the data originating device has entered the proximity of the data receiving device a second time. The second time that the data originating device has entered the proximity may be subsequent to the first time that the data originating device has entered the proximity of the data receiving device. In some embodiments, 1812 may be omitted.

In 1814, the data receiving device may determine a value data. In particular, the data receiving device may determine a value data based at least in part on an indication of the value data received from the data originating device. The data receiving device may receive the indication during the second time that the data originating device has entered the proximity of the data receiving device. The data receiving device may receive the indication of the value data in a response message, such as the response message 730 (FIG. 7). In some embodiments, the response message may further include the transaction ID. The data receiving device may utilize the transaction ID to determine that the value data corresponds to the particular data transfer. In some embodiments, the value data may be a tip amount for the data transfer.

In 1816, the data receiving device may determine a transfer value. In particular, the data receiving device may determine the transfer value based at least in part on the value data. The data receiving device may determine the transfer value by adding the value data to the preliminary receipt value in some embodiments. In these embodiments, the transfer value may be equal to the preliminary receipt value plus the tip amount.

In 1818, the data receiving device may complete the data transfer. In particular, the data receiving device may complete the data transfer with the transfer value. The data receiving device may perform a payment loop (such as the payment loop 736 (FIG. 7)) and a payment authorization result (such as the payment authorization result 738 (FIG. 7)) to complete the data transfer. In some embodiments, the data receiving device may perform the payment loop with the preliminary receipt value without the value data, may perform the payment loop with the transfer value, or may perform portions of the payment loop with the preliminary receipt value without the value data and other portions of the payment loop with the transfer value. The completion of the data transfer may result in transfer of the transfer value (such as monetary compensation) from an account associated with the user of the data originating device to an account associated with the user of the data receiving device.

Figure 19:
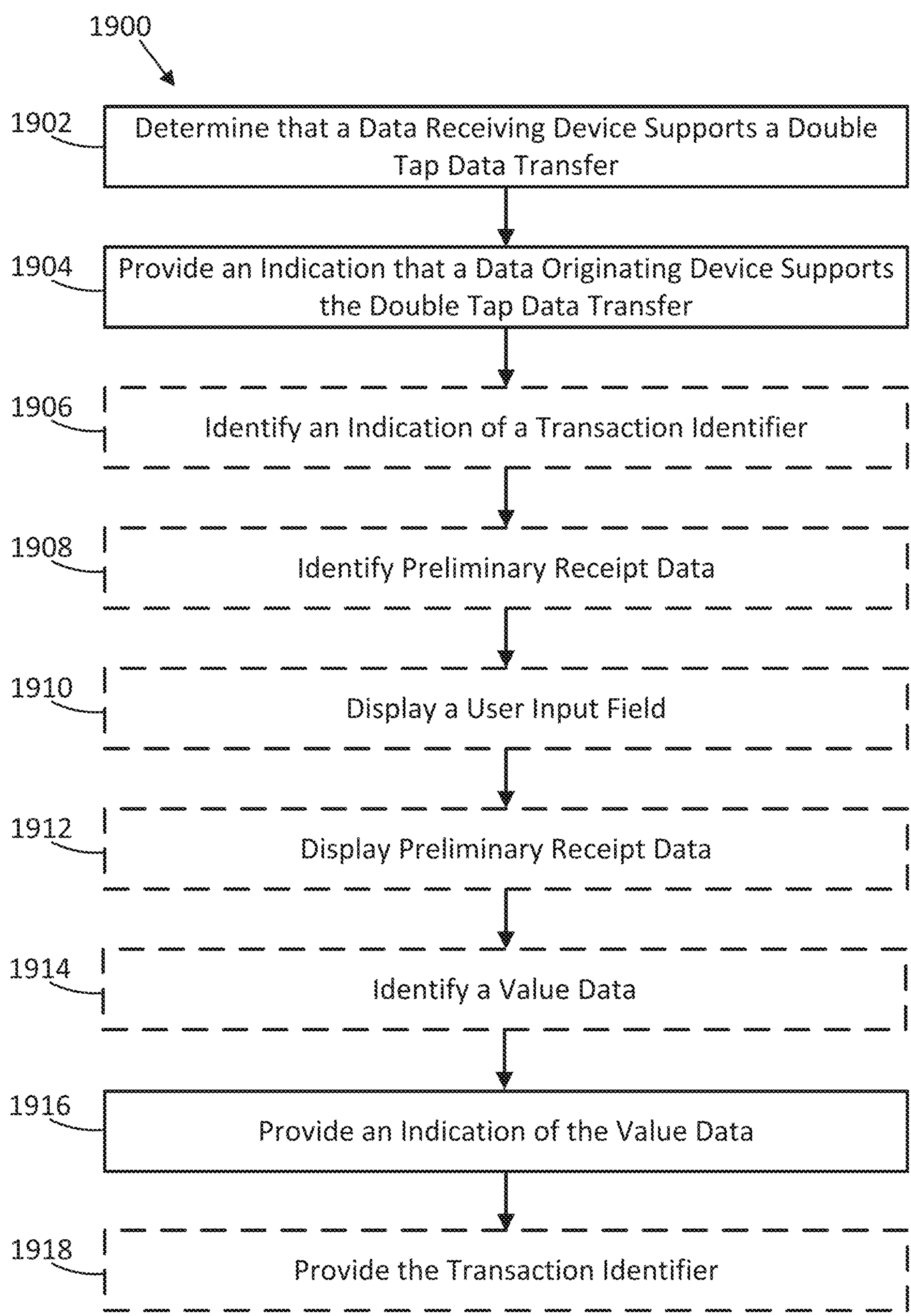
FIG. 19 illustrates an example procedure for a data originating device within a data transfer with a double tap data transfer in accordance with some embodiments.

FIG. 19 illustrates an example procedure 1900 for a data originating device within a data transfer with a double tap data transfer in accordance with some embodiments. For example, the procedure 1900 may be performed by the data originating device 104 (FIG. 1), the data originating device 204 (FIG. 2A), the data originating device 404 (FIG. 4A), the data originating device 504 (FIG. 5A), and/or the data originating device 704 (FIG. 7) as part of a data transfer. The data originating device may be associated with a customer purchasing goods and/or services from a merchant for value. In some embodiments, the data transfer may be a payment transaction where monetary value is exchanged for the goods and/or services being provided by the merchant. The procedure 1900, or portions thereof, may be performed as part of the data transfers described throughout this disclosure and may result in the display of the interfaces described throughout this disclosure on the data receiving device and/or the data originating device.

In 1902, the data originating device may determine that a data receiving device supports a double tap data transfer. In particular, the data originating device may determine that a data receiving device supports the double tap data transfer based at least in part on an indication that the data receiving device supports the double tap data transfer received from the data receiving device. The data originating device may receive the indication during a first time that the data originating device has entered a proximity (such as the first proximity 604 (FIG. 6)) of the data receiving device. The data originating device may receive the indication via a double tap support indication, such as the double tap support indication 706 (FIG. 7). The indication that the data receiving device supports the double tap data transfer may indicate that the data receiving devices supports receipt of an indication of value data by the data receiving device during a second time that the data originating device has entered the proximity of the data receiving device. In some embodiments, the data receiving device may be functioning as a POS device and the data originating device may be functioning as a NFC payment device. The value data may comprise a tip amount in some embodiments. In some embodiments, the data originating device may receive the indication via NFC.

In 1904, the data originating device may provide an indication that the data originating device supports the double tap data transfer. For example, the data originating device may provide the indication that the data originating device supports the double tap data transfer to the data receiving device during the first time that the data originating device has entered the proximity of the data receiving device. The data originating device may provide the indication via a support indication, such as the support indication 708 (FIG. 7). The indication that the data originating device supports the double tap data transfer may indicate that the data originating device supports transmission of the indication of the value data during the second time that the data originating device has entered the proximity of the data receiving device. In some embodiments, the data originating device may provide the indication via NFC.

In 1906, the data originating device may identify an indication of a transaction identifier. In particular, the data originating device may identify an indication of a transaction identifier received from the data receiving device during the first time that the data originating device has entered the proximity of the data receiving device. The data originating device receive the transaction ID in a selection message, such as the selection message 714 (FIG. 7). The transaction ID may correspond to the data transfer, such that the data transfer may be identified from the transaction ID. In some embodiments, 1906 may be omitted.

In 1908, the data originating device may identify preliminary receipt data. In particular, the data originating device may identify preliminary receipt data received from the data receiving device. The data originating device may receive the preliminary receipt data during the first time that the data originating device has entered the proximity of the data receiving device. The preliminary receipt data may include a preliminary receipt (such as the preliminary receipt 214 (FIG. 2B) and/or the preliminary receipt 808 (FIG. 8A)), or data to produce a preliminary receipt at the data originating device. The preliminary receipt may indicate a preliminary receipt value of the data transfer. In some embodiments, the preliminary receipt value may be an amount that a merchant is charging for goods and/or services being purchased by a user of the data originating device. The data originating device may receive the preliminary receipt data in a selection message, such as the selection message 714. In some embodiments, 1908 may be omitted.

In 1910, the data originating device may display a user input field. In particular, the data originating device may display a user input field for input of a value data. The data originating device may display the user input field on a display of the data originating device. The user input field may comprise the user input field 108 (FIG. 1), the first user input field 216 (FIG. 2B), the second user input field 220 (FIG. 2B), the first user input field 810 (FIG. 8A), and/or the second user input field 814 (FIG. 8A). In some embodiments, the data originating device may receive an indication of the user input field in a selection message (such as the selection message 728 (FIG. 7)) received from the data receiving device. The data originating device may receive the indication of the user input field the first time that the data originating device has entered the proximity of the data receiving device. In some embodiments, 1910 may be omitted.

In 1912, the data originating device may display the preliminary receipt data. For example, the data originating device may display the preliminary receipt data with the user input field. In some embodiments, displaying the preliminary receipt data may include displaying the preliminary receipt, such as the preliminary receipt 214 and/or the preliminary receipt 808. In some embodiments, 1912 may be omitted.

In 1914, the data originating device may identify a value data. In particular, the data originating device may identify a value data received via the user input field displayed by the data originating device. For example, the data originating device may identify a value data entered into the user input field displayed on the data originating device. The value data, or some portion thereof, may be entered into the user input field by a user of the data originating device via user interaction with the data originating device. In some embodiments, the user input field may comprise a tip amount input field and the value data may comprise a tip amount for the data transfer. In some embodiments, 1718 may be omitted.

In 1916, the data originating device may provide an indication of the value data. In particular, the data originating device may provide the indication of the value data during a second time that the data originating device has entered the proximity of the data receiving device. The data originating device may transmit the indication of the value data in a response message (such as the response message 730 (FIG. 7)). The data originating device may transmit the response message during the second time that the data originating device has entered the proximity of the data receiving device.

In 1918, the data originating device may provide the transaction identifier. In particular, the data originating device may provide the transaction identifier with the indication of the value data during the second time that the data originating device has entered the proximity of the data receiving device. For example, the data originating device may transmit the transaction identifier in the response message (such as the response message 730). In some embodiments 1918 may be omitted.

Figure 20:
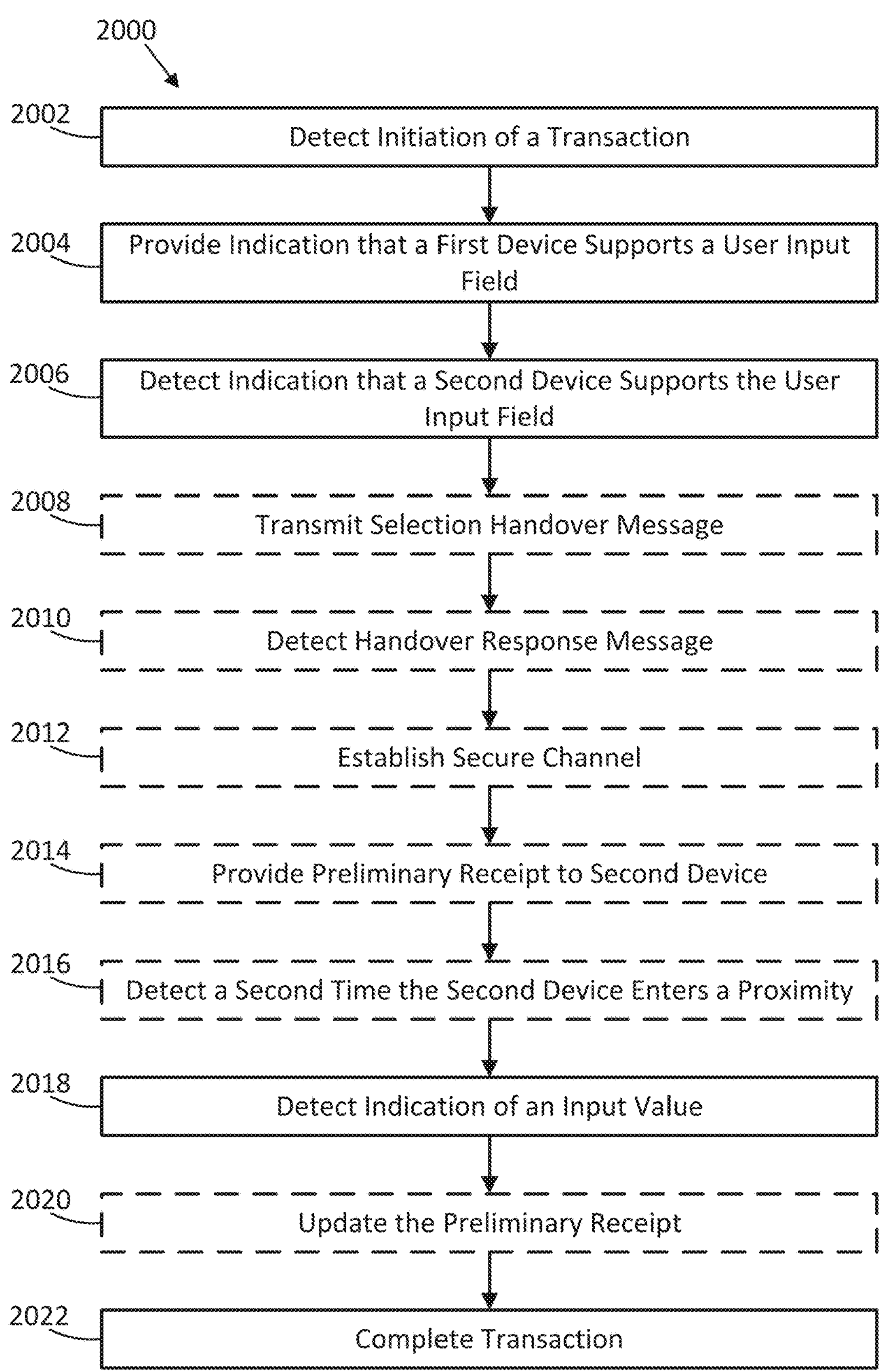
FIG. 20 illustrates an example procedure for a device within a data transfer with user input field in accordance with some embodiments.

FIG. 20 illustrates an example procedure 2000 for a first device within a data transfer with user input field in accordance with some embodiments. For example, the procedure 2000 may be performed by the data receiving device 102 (FIG. 1), the data receiving device 202 (FIG. 2A), the data receiving device 402 (FIG. 4A), the data receiving device 502 (FIG. 5A), and/or the data receiving device 702 (FIG. 7) as part of a data transfer. The first device may be associated with a merchant selling goods and/or services for value. In some embodiments, the data transfer may be a payment transaction where monetary value is exchanged for the goods and/or services being provided by the merchant. The procedure 2000, or portions thereof, may be performed as part of the data transfers described throughout this disclosure and may result in the display of the interfaces described throughout this disclosure on the data receiving device and/or the data originating device.

In 2002, the first device may detect an initiation of a data transfer. The first device may detect an initiation of a data transfer in accordance with any of the approaches of detecting an initiation of a data transfer as described throughout this disclosure. A user of the first device may have interacted with the first device to indicate that the first device is to monitor for an initiation of the data transfer. For example, the user of the first device may have entered a value for the data transfer. In response to the entry of the value of the data transfer by the user, the first device may begin to monitor for the initiation of the data transfer. In some embodiments, the first device may detect a second device being located within, or entering, a first proximity (such as the first proximity 604 (FIG. 6)) of the first device. The first device may detect the second device via a first communication channel, where the first communication channel may implement NFC. The second device may be acting as an electronic element when detected by the first device. The initiation of the data transfer may be detected by the first device based on the detection that the second device is within the first proximity of the first device in some embodiments.

In 2004, the first device may provide an indication that the first device supports a user input field. In particular, the first device may provide an indication (such as the handover support indication 302 (FIG. 3A), the handover support indication 406 (FIG. 4A), and/or the double tap support indication 706 (FIG. 7)) that the first device supports a user input field at the second device for the data transfer to the second device. For example, the first device may support a user input field being displayed on a display of the second device and a user of second device entering a value data related to the data transfer into the user input field. The first device may provide the indication via the NFC. In some embodiments, the user input field may be a tip input field and the user of the second device may input a tip amount into the tip input field.

In 2006, the first device may detect an indication that the second device supports the user input field. In particular, the first device may detect an indication that the second device supports the user input field received from the second device. The first device may receive the indication in a support indication, such as the support indication 304 (FIG. 3A), the support indication 408 (FIG. 4A), and/or the support indication 708 (FIG. 7). The first device may receive the indication via the NFC.

In 2008, the first device may transmit a selection handover message. In particular, the first device may transmit a selection handover message (such as the selection handover message 310 (FIG. 3A) and/or the selection handover message 414 (FIG. 4A)) to the second device. The first device may transmit the selection handover message via the NFC. The selection handover message may include a first ECC key. The first ECC key may be a merchant ECC key in some embodiments. In some embodiments, 2004 may be omitted. For example, 2004 may be omitted in the double tap approach where a handover to a second communication channel does not occur.

In 2010, the first device may detect a handover response message. In particular, the first device may detect a handover response message (such as the handover response message 312 (FIG. 3A) and/or the handover response message 416 (FIG. 4A)) received from the second device. The first device may receive the handover response message via the NFC. The handover response message may include a second ECC key in some embodiments. The second ECC key may be a customer ECC key in some embodiments. In some embodiments, 2006 may be omitted. For example, 2006 may be omitted in the double tap approach where a handover to a second communication channel does not occur.

In 2012, the first device may establish a second communication channel. In particular, the first device may establish a second communication channel (such as the second communication channel 114 (FIG. 1)) with the second device. The second communication channel may be established via a channel setup procedure, such as the channel setup procedure 352 (FIG. 3B), the channel setup procedure 452 (FIG. 4B), and/or the channel setup procedure 552 (FIG. 5B). The second communication channel may be established based on the first ECC key, the second ECC key, a session name, a password, or some combination thereof. The second communication channel may implement a communication protocol different from the NFC. For example, the second communication channel may implement Wi-Fi, ultra-wideband, Bluetooth, or another wireless communication protocol different from the NFC. In some embodiments, the second communication channel may be established via a public and/or wide area network, such as the Internet. The use of the different protocol for the second communication channel may provide for a greater range of communication between the first device and the second device. For example, the second communication channel may have a second proximity (such as the second proximity 608 (FIG. 6)) for communication that is greater than the first proximity for communication via the NFC. Accordingly, the first device and the second device may communicate via the second communication channel at a greater distance than they can communicate via the NFC. In some embodiments, 2008 may be omitted. For example, 2008 may be omitted in the double tap approach where a second communication channel is not established.

In 2014, the first device may provide a preliminary receipt to the second device. In particular, the first device may provide a preliminary receipt (such as the preliminary receipt 214 (FIG. 2B), and/or the preliminary receipt 808 (FIG. 8A)) to the second device, where the preliminary receipt may indicate a value of the data transfer. For example, the preliminary receipt may indicate an amount that the merchant is charging for the goods and/or services. The first device may provide the preliminary receipt in a service message (such as the service response message 356, the supported services message 456, and/or the supported services message 556) or an selection message (such as the selection message 714 (FIG. 7) and/or the selection message 728 (FIG. 7)). The first device may provide the preliminary receipt via the NFC in some embodiments (such as for the double tap approach) and via the second communication channel in other embodiments (such as for the single tap approach). In some embodiments, 2014 may be omitted.

In 2016, the first device may detect a second time that the second device enters the first proximity. In particular, the second device may have entered the first proximity of the first device for the first time in the initiation of the data transfer in 2002. After entering the first proximity for the first time, the second device may have exited the first proximity of the first device. In 2016, the first device may detect the second time that the second device has entered the first proximity of the first device. The first device may have been monitoring for the second entry of the second device into the first proximity since the second device exited the first proximity after the first entry. In some embodiments, 2016 may be omitted. For example, 2016 may be omitted in the single tap approach where the second device does not have to enter the first proximity a second time for the data transfer.

In 2018, the first device may detect an indication of a value data. In particular, the first device may detect an indication of a value data received from the second device. The value data may be a value entered into the user input field (such as the user input field 108 (FIG. 1), the first user input field 216 (FIG. 2B), the first user input field 810 (FIG. 8A), and/or the second user input field 814 (FIG. 8A)) at the second device by a user of the second device. In some embodiments, the value data may be a tip amount for the data transfer. The first device may receive the indication of the value data via the NFC in some embodiments (such as for the double tap approach) and via the second communication channel in other embodiments (such as for the single tap approach).

In 2020, the first device may update the preliminary receipt. In particular, the first device may update the preliminary receipt in accordance with the value data received from the second device. The first device may update the preliminary receipt to produce a billable amount for the data transfer. In embodiments where the value data comprises a tip amount, the first device may produce the billable amount by adding the tip amount to the amount that the merchant is charging for the good and/or services. In some embodiments, 2020 may be omitted.

In 2022, the first device may complete the data transfer. In particular, the first device may complete the data transfer in accordance with the value data received from the second device. For example, the first device may perform a payment loop (such as the payment loop 318 (FIG. 3A), the payment loop 422 (FIG. 4A), and/or the payment loop 736 (FIG. 7)) and a payment authorization result (such as the payment authorization result 320 (FIG. 3A), the payment authorization result 424 (FIG. 4A), and/or the payment authorization result 738 (FIG. 7)) to complete the data transfer. The first device may perform the payment loop with the initial value for the data transfer without the value data, may perform the payment loop with the billable amount for the data transfer, or may perform portions of the payment loop with the initial value for the data transfer and other portions of the payment loop with the billable amount. For example, the first device may perform the payment loop with the billable amount for the data transfer for the double tap approach. For the single tap approach, the first device may perform the payment loop with the initial value for the data transfer, may perform the payment loop with the billable amount for the data transfer, or may perform portions of the payment loop with the initial value for the data transfer and other portions of the payment loop with the billable amount. The first device may complete the data transfer via the NFC. The completion of the data transfer may result in transfer of value (such as monetary compensation) from an account associated with the user of the second device to an account associated with the user of the first device.

Figure 21:
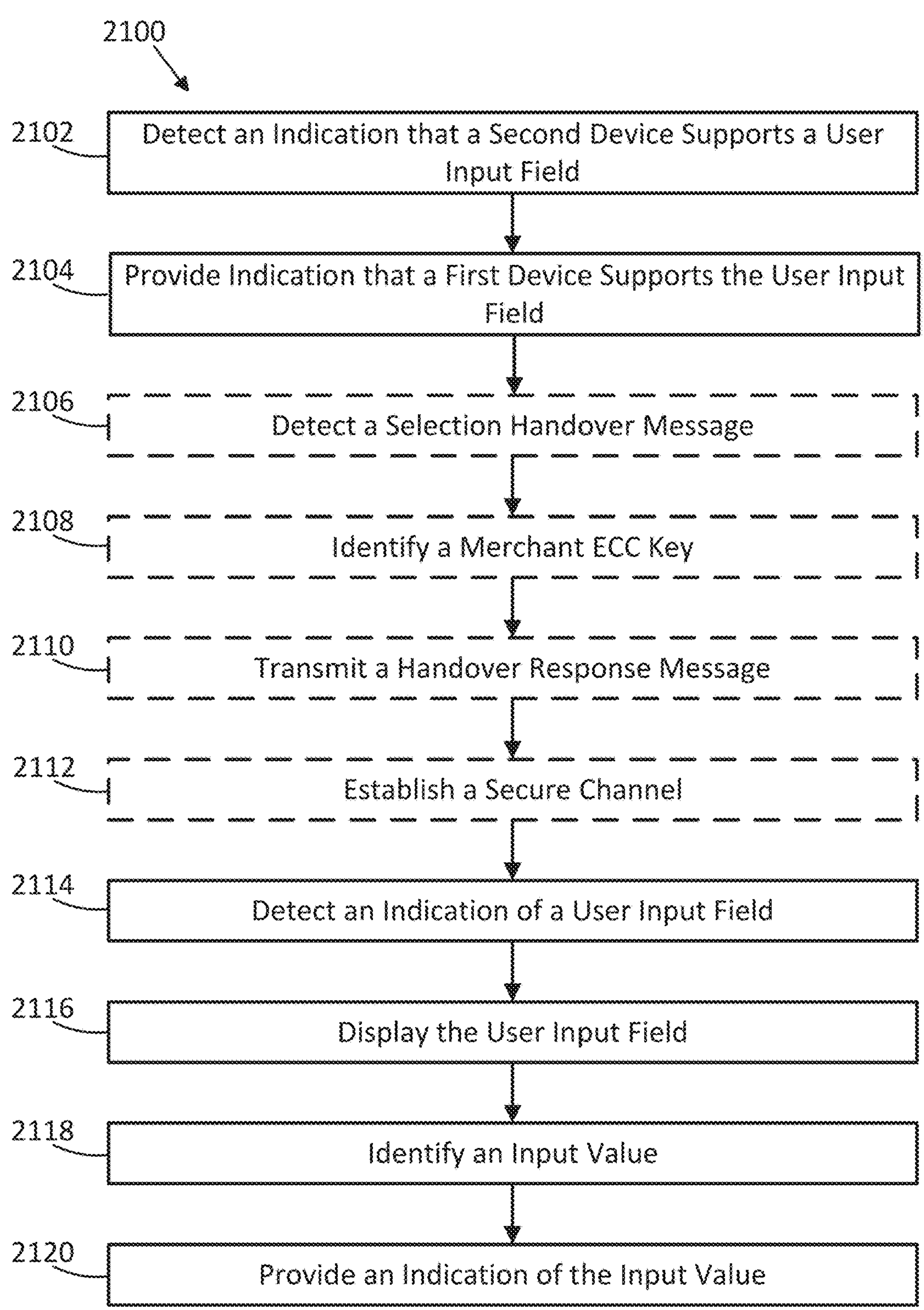
FIG. 21 illustrates an example procedure for a data originating device within a data transfer with user input field in accordance with some embodiments.

FIG. 21 illustrates an example procedure 2100 for a second device within a data transfer with user input field in accordance with some embodiments. For example, the procedure 2100 may be performed by the data originating device 104 (FIG. 1), the data originating device 204 (FIG. 2A), the data originating device 404 (FIG. 4A), the data originating device 504 (FIG. 5A), and/or the data originating device 704 (FIG. 7) as part of a data transfer. The second device may be associated with a customer purchasing goods and/or services from a merchant for value. In some embodiments, the data transfer may be a payment transaction where monetary value is exchanged for the goods and/or services being provided by the merchant. The procedure 2100, or portions thereof, may be performed as part of the data transfers described throughout this disclosure and may result in the display of the interfaces described throughout this disclosure on the data receiving device and/or the data originating device.

In 2102, the first device may detect an indication that a second device supports a user input field. In particular, the first device may detect an indication, received from the second device, that the second device supports a user input field being displayed on the first device and a user interaction with the first device to provide a value data for a data transfer between the first device and the second device. The first device may receive the indication via the handover support indication 302 (FIG. 3A), the handover support indication 406 (FIG. 4A), and/or the double tap support indication 706 (FIG. 7). The indication may be received via a first communication channel, which the first communication channel may implement NFC. In some embodiments, the user input field may be a tip input filed and the user of the first device may input a tip amount into the tip input field.

In 2104, the first device may provide an indication that the first device supports the user input field. In particular, the first device may provide an indication to the second device that the first device supports the user input field. The first device may provide the indication in a support indication, such as the support indication 304 (FIG. 3A), the support indication 408 (FIG. 4A), and/or the support indication 708 (FIG. 7). The first device may provide the indication via the NFC.

In 2106, the first device may detect a selection handover message. In particular, the first device may detect a selection handover message (such as the selection handover message 310 (FIG. 3A) and/or the selection handover message 414 (FIG. 4A)) received from the second device. The selection handover message may be received via the NFC. The selection handover message received may include a first ECC key. The first ECC key may be a merchant ECC key in some embodiments. In some embodiments, 2106 may be omitted. For example, 2106 may be omitted in the double tap approach where a handover to a second communication channel does not occur.

In 2108, the first device may identify a first ECC key. In particular, the first device may identify the first ECC key received in the selection handover message. In some embodiments, 2108 may be omitted. For example, 2108 may be omitted in the double tap approach where a handover to a second communication channel does not occur.

In 2110, the first device may transmit a handover response message. In particular, the first device may transmit a handover response message (such as the handover response message 312 (FIG. 3A) and/or the handover response message 416 (FIG. 4A)) to second device. The first device may transmit the handover response message in response to the selection handover message. Further, the first device may transmit the handover response message via the NFC. The handover response message may include a second ECC key. The second ECC key may be a customer ECC key in some embodiments. In some embodiments, 2110 may be omitted. For example, 2110 may be omitted in the double tap approach where a handover to a second communication channel does not occur.

In 2112, the first device may establish a second communication channel. In particular, the first device may establish a second communication channel (such as the second communication channel 114 (FIG. 1)) with the second device. The second communication channel may be established via a channel setup procedure, such as the channel setup procedure 352 (FIG. 3B), the channel setup procedure 452 (FIG. 4B), and/or the channel setup procedure 552 (FIG. 5B). The second communication channel may be established based on the first ECC key, the second ECC key, a session name, a password, or some combination thereof. The second communication channel may implement a communication protocol different from the NFC. For example, the second communication channel may implement Wi-Fi, ultra-wideband, Bluetooth, or another wireless communication protocol different from the NFC. In some embodiments, the second communication channel may be established via a wide area and/or public network, such as the Internet. The use of the different protocol for the second communication channel may provide for a greater range of communication between the first device and the second device. For example, the second communication channel may have a second proximity (such as the second proximity 608 (FIG. 6)) for communication that is greater than the first proximity for communication via the NFC. Accordingly, the first device and the second device may communicate via the second communication channel at a greater distance than they can communicate via the NFC. In some embodiments, 2112 may be omitted. For example, 2112 may be omitted in the double tap approach where a second communication channel is not established.

In 2114, the first device may detect an indication of a user input field. In particular, the first device may detect an indication of a user input field (such as the user input field 108 (FIG. 1), the first user input field 216 (FIG. 2B), the second user input field 220 (FIG. 2B), the first user input field 810 (FIG. 8A), and/or the second user input field 814 (FIG. 8A)), to be displayed on a display of the first device received from the second device. The first device may receive the indication of the user input field in a service response message (such as the service response message 356 (FIG. 3B), the service response message 462 (FIG. 4B), the service response message 472 (FIG. 4B)) or a selection message (such as the selection message 728 (FIG. 7)). The first device may receive the service response message or the selection message via the NFC or the second communication channel. The indication of the user input field may further include a value of the data transfer to be displayed with the user input field on the display of the first device. In some embodiment, the value of the data transfer may comprise a preliminary receipt that includes the value of the data transfer.

In 2116, the first device may display the user input field. In particular, the first device may display the user input field indicated in 2114 on a display of the first device. The first device may display the user input field in response to detecting the indication of the user input field. For example, the first device receiving the service response message or the selection message from the first device may cause the first device to display the user input field.

In 2118, the first device may identify a value data. In particular, the first device may identify a value data entered into the user input field displayed on the first device. The value data may be entered into the user input field by a user of the first device via user interaction with the first device. In some embodiments, the user input field may comprise a tip amount input field and the value data may comprise a tip amount for the data transfer.

In 2120, the first device may provide an indication of the value data. In particular, the first device may transmit an indication of the value data to the second device. The first device may transmit the indication of the value data in a value data message (such as the value data message 374 (FIG. 3B)), a get service message (such as the get service message 460 (FIG. 4B), and/or a get service message 470 (FIG. 4B)), or a response message (such as the response message 730 (FIG. 7)). The first device may transmit the value data message, the get service message, or the response message via the NFC or the second communication channel. In some embodiments, the indication of the value data may comprise an indication of the tip amount for the data transfer. The second device may utilize the value data indicated to in the indication to complete the data transfer.

Figure 22:
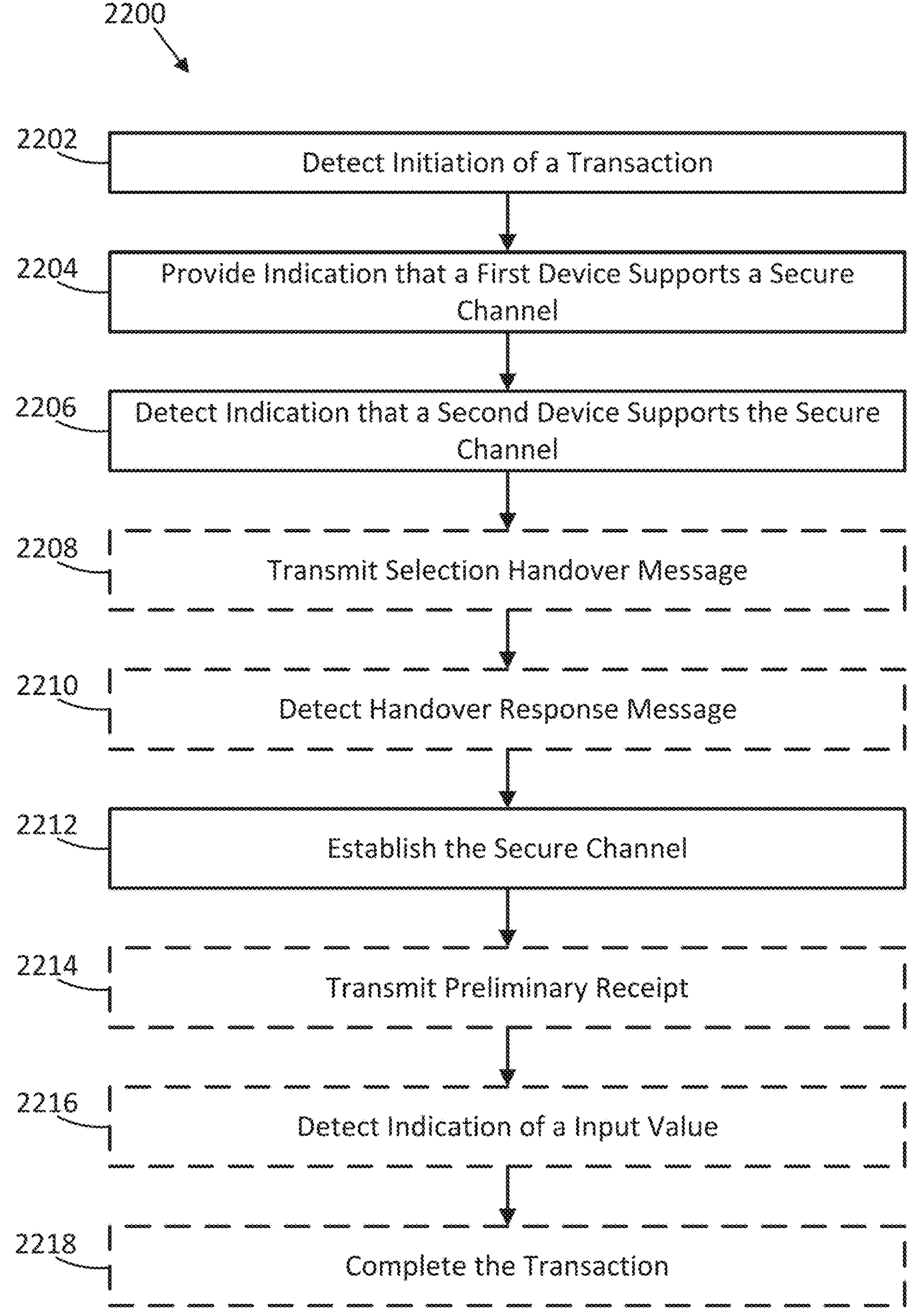
FIG. 22 illustrates an example procedure for a device within a data transfer with a second communication channel in accordance with some embodiments.

FIG. 22 illustrates an example procedure 2200 for a first device within a data transfer with a second communication channel in accordance with some embodiments. For example, the procedure 2200 may be performed by the data receiving device 102 (FIG. 1), the data receiving device 202 (FIG. 2A), the data receiving device 402 (FIG. 4A), the data receiving device 502 (FIG. 5A), and/or the data receiving device 702 (FIG. 7) as part of a data transfer. The first device may be associated with a merchant selling goods and/or services for value. In some embodiments, the data transfer may be a payment transaction where monetary value is exchanged for the goods and/or services being provided by the merchant. The first device may be referred to as a first device and a second device may be referred to as a second device in relation to the procedure 2200. The procedure 2200, or portions thereof, may be performed as part of the data transfers described throughout this disclosure and may result in the display of the interfaces described throughout this disclosure on the data receiving device and/or the data originating device.

In 2202, the first device may detect an initiation of a data transfer. The first device may detect an initiation of a data transfer in accordance with any of the approaches of detecting an initiation of a data transfer as described throughout this disclosure. A user of the first device may have interacted with the first device to indicate that the first device is to monitor for an initiation of the data transfer. For example, the user of the first device may have entered a value for the data transfer. In response to the entry of the value of the data transfer by the user, the first device may begin to monitor for the initiation of the data transfer. In some embodiments, the first device may detect a second device being located within, or entering, a first proximity (such as the first proximity 604 (FIG. 6)) of the first device. The first device may detect the second device via a first communication channel (such as the first communication channel 112 (FIG. 1)), where the first communication channel may implement NFC. The second device may be acting as an electronic element when detected by the first device. The initiation of the data transfer may be detected by the first device based on the detection that the second device is within the first proximity of the first device in some embodiments.

In 2204, the first device may provide an indication that the first device supports a second communication channel. In particular, the first device may provide an indication (such as the handover support indication 302 (FIG. 3A), and/or the handover support indication 406 (FIG. 4A)) that the first device supports a second communication channel to the second device. For example, the first device may support establishment of a second communication channel (such as the second communication channel 114 (FIG. 1)) for a data transfer. The first device may provide the indication via a first communication channel, where the first communication channel may implement NFC.

In 2206, the first device may detect an indication that the second device supports the second communication channel. In particular, the first device may detect the indication (such as the support indication 304 (FIG. 3A), and/or the support indication 408 (FIG. 4A)) that the second device supports the second communication channel received from the second device. The first device may receive the indication via the NFC.

In 2208, the first device may transmit a selection handover message. In particular, the first device may transmit a selection handover message (such as the selection handover message 310 (FIG. 3A) and/or selection handover message 414 (FIG. 4A)) to the second device. The first device may transmit the selection handover message via the NFC. The selection handover message may include a first ECC key. The first ECC key may be a merchant ECC key in some embodiments. In some embodiments, 2208 may be omitted.

In 2210, the first device may detect a handover response message. In particular, the first device may detect a handover response message (such as the handover response message 312 (FIG. 3A) and/or the handover response message 416 (FIG. 4A)) received from the second device. The first device may receive the handover response message via the NFC. The handover response message may include a second ECC key in some embodiments. The second ECC key may be a customer ECC key in some embodiments. In some embodiments, 2210 may be omitted.

In 2212, the first device may establish a second communication channel. In particular, the first device may establish a second communication channel (such as the second communication channel 114 (FIG. 1)) with the second device. The second communication channel may be established via a channel setup procedure, such as the channel setup procedure 352 (FIG. 3B), the channel setup procedure 452 (FIG. 4B), and/or the channel setup procedure 552 (FIG. 5B). The second communication channel may be established based on the first ECC key, the second ECC key, a session name, a password, or some combination thereof. The second communication channel may implement a communication protocol different from the NFC. For example, the second communication channel may implement Wi-Fi, ultra-wideband, Bluetooth, or another wireless communication protocol different from the NFC. In some embodiments, the second communication channel may be established via a wide area and/or public network, such as the Internet. The use of the different protocol for the second communication channel may provide for a greater range of communication between the first device and the second device. For example, the second communication channel may have a second proximity (such as the second proximity 608 (FIG. 6)) for communication that is greater than the first proximity for communication via the NFC. Accordingly, the first device and the second device may communicate via the second communication channel at a greater distance than they can communicate via the NFC.

In 2214, the first device may transmit a preliminary receipt. In particular, the first device may transmit a preliminary receipt (such as the preliminary receipt 214 (FIG. 2B) and/or the preliminary receipt 808 (FIG. 8A)) to the second device, where the preliminary receipt may indicate a value of the data transfer. For example, the preliminary receipt may indicate an amount that the merchant is charging for the goods and/or services. The first device may transmit the preliminary receipt in a service message (such as the service response message 356 (FIG. 3B), the supported services message 456 (FIG. 4B), and/or the supported services message 556 (FIG. 5B)). The first device may transmit the preliminary receipt via the second communication channel. In some embodiments, 2214 may be omitted.

In 2216, the first device may detect an indication of a value data. In particular, the first device may detect an indication of a value data received from the second device. The value data may be a value entered into the user input field at the second device by a user of the second device. In some embodiments, the value data may be a tip amount for the data transfer. The first device may receive the indication of the value data via the second communication channel.

In 2218, the first device may complete the data transfer. In particular, the first device may complete the data transfer in accordance with the value data received from the second device. For example, the first device may perform a payment loop (such as the payment loop 318 (FIG. 3A), and/or the payment loop 422 (FIG. 4A)) and a payment authorization result (such as the payment authorization result 320 (FIG. 3A), and/or the payment authorization result 424 (FIG. 4A)) to complete the data transfer. The first device may perform the payment loop with the initial value for the data transfer without the value data, may perform the payment loop with a billable amount (which takes into account the value data) for the data transfer, or may perform portions of the payment loop with the initial value for the data transfer and other portions of the payment loop with the billable amount. In some embodiments, the billable amount may be generated by adding the value data to the initial value for the data transfer, such as where the value data is a tip amount. the first device may perform the payment loop with the billable amount for the data transfer for the double tap approach. The first device may perform the payment loop with the initial value for the data transfer, may perform the payment loop with the billable amount for the data transfer, or may perform portions of the payment loop with the initial value for the data transfer and other portions of the payment loop with the billable amount in some embodiments. The first device may complete the data transfer via the NFC. The completion of the data transfer may result in transfer of value (such as monetary compensation) from an account associated with the user of the second device to an account associated with the user of the first device.

Figure 23:
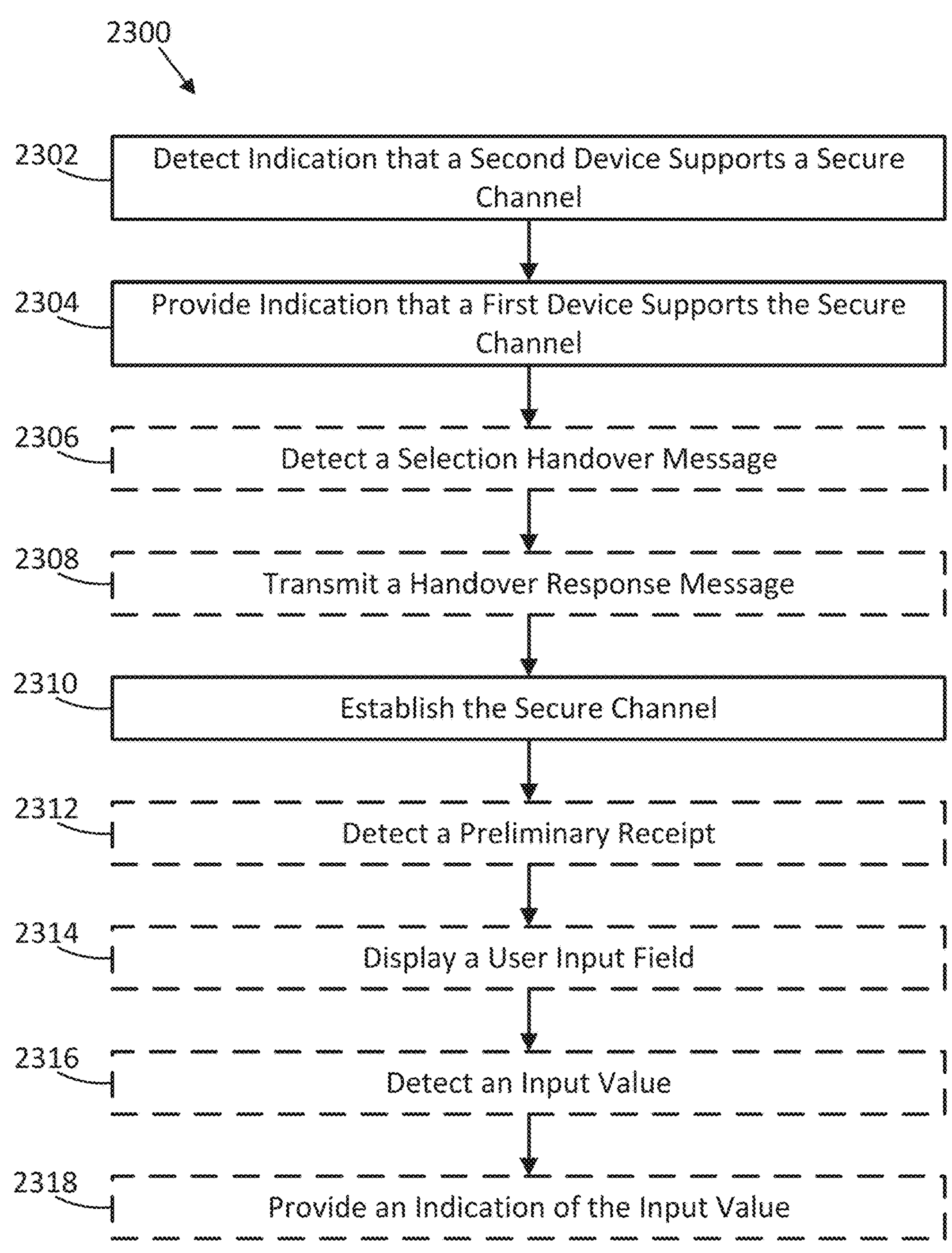
FIG. 23 illustrates an example procedure for a data originating device within a data transfer with a second communication channel in accordance with some embodiments.

FIG. 23 illustrates an example procedure 2300 for a second device within a data transfer with a second communication channel in accordance with some embodiments. For example, the procedure 2300 may be performed by the data originating device 104 (FIG. 1), the data originating device 204 (FIG. 2A), the data originating device 404 (FIG. 4A), the data originating device 504 (FIG. 5A), and/or the data originating device 704 (FIG. 7) as part of a data transfer. The second device may be associated with a customer purchasing goods and/or services from a merchant for value. In some embodiments, the data transfer may be a payment transaction where monetary value is exchanged for the goods and/or services being provided by the merchant. The procedure 2300, or portions thereof, may be performed as part of the data transfers described throughout this disclosure and may result in the display of the interfaces described throughout this disclosure on the data receiving device and/or the data originating device.

In 2302, the first device may detect an indication that a second device supports a second communication channel. In particular, the first device may detect an indication (such as the handover support indication 302 (FIG. 3A) and/or the handover support indication 406 (FIG. 4A)) that a second device supports a second communication channel (such as the second communication channel 114 (FIG. 1)) received from the second device. The first device may receive the indication via a first communication channel, where the first communication channel may implement NFC.

In 2304, the first device may provide an indication that the first devices supports the second communication channel. In particular, the first device may provide the indication (such as the support indication 304 (FIG. 3A) and/or the support indication 408 (FIG. 4A)) that the first device supports the second communication channel to the second device. The first device may provide the indication via the NFC.

In 2306, the first device may detect a selection handover message. In particular, the first device may detect a selection handover message (such as the selection handover message 310 (FIG. 3A) and/or selection handover message 414 (FIG. 4A)) received from the second device. The second device may receive the selection handover message via the NFC. The selection handover message may include a first ECC key. The first ECC key may be a merchant ECC key in some embodiments. In some embodiments, 2304 may be omitted.

In 2308, the first device may transmit a handover response message. In particular, the first device may transmit a handover response message (such as the handover response message 312 (FIG. 3A) and/or the handover response message 416 (FIG. 4A)) to the second device. The first device may transmit the handover response message via the NFC. The handover response message may include a second ECC key in some embodiments. The second ECC key may be a customer ECC key in some embodiments. In some embodiments, 2306 may be omitted.

In 2310, the first device may establish the second communication channel. In particular, the first device may establish a second communication channel (such as the second communication channel 114 (FIG. 1)) with the second device. The second communication channel may be established via a channel setup procedure, such as the channel setup procedure 352 (FIG. 3B), the channel setup procedure 452 (FIG. 4B), and/or the channel setup procedure 552 (FIG. 5B). The second communication channel may be established based on the first ECC key, the second ECC key, a session name, a password, or some combination thereof. The second communication channel may implement a communication protocol different from the NFC. For example, the second communication channel may implement Wi-Fi, ultra-wideband, Bluetooth, or another wireless communication protocol different from the NFC. In some embodiments, the second communication channel may be established via a wide area and/or public network, such as the Internet. The use of the different protocol for the second communication channel may provide for a greater range of communication between the first device and the second device. For example, the second communication channel may have a second proximity (such as the second proximity 608 (FIG. 6)) for communication that is greater than the first proximity for communication via the NFC. Accordingly, the first device and the second device may communicate via the second communication channel at a greater distance than they can communicate via the NFC.

In 2312, the first device may detect a preliminary receipt. In particular, the first device may detect a preliminary receipt (such as the preliminary receipt 214 (FIG. 2B) and/or the preliminary receipt 808 (FIG. 8A)) received from the second device, where the preliminary receipt may indicate a value of the data transfer. For example, the preliminary receipt may indicate an amount that the merchant is charging for the goods and/or services. The first device may receive the preliminary receipt in a service message (such as the service response message 356 (FIG. 3B), the supported services message 456 (FIG. 4B), and/or the supported services message 556 (FIG. 5B)). The first device may receive the preliminary receipt via the second communication channel. In some embodiments, 2312 may be omitted.

In 2314, the first device may display a user input field. In particular, the first device may display a user input field (such as the user input field 108 (FIG. 1), the first user input field 216 (FIG. 2B), the second user input field 220 (FIG. 2B), the first user input field 810 (FIG. 8A), and/or the second user input field 814 (FIG. 8A)) on a display of the first device. In some embodiments, 2314 may be omitted.

In 2316, the first device may detect a value data. In particular, the first device may detect a value data entered into the user input field displayed on the first device. The value data may be entered into the user input field by a user of the first device via user interaction with the first device. In some embodiments, the user input field may comprise a tip amount input field and the value data may comprise a tip amount for the data transfer. In some embodiments, 2316 may be omitted.

In 2318, the first device may provide an indication of the value data. In particular, the first device may transmit an indication of the value data to the second device. The first device may transmit the indication of the value data in a value data message (such as the value data message 374 (FIG. 3B)) or a get service message (such as the get service message 460 (FIG. 4B), and/or a get service message 470 (FIG. 4B)). The first device may transmit the value data message or the get service message via the second communication channel. In some embodiments, the indication of the value data may comprise an indication of the tip amount for the data transfer. The second device may utilize the value data indicated to in the indication to complete the data transfer.

IX. Example System Arrangement

Figure 24:
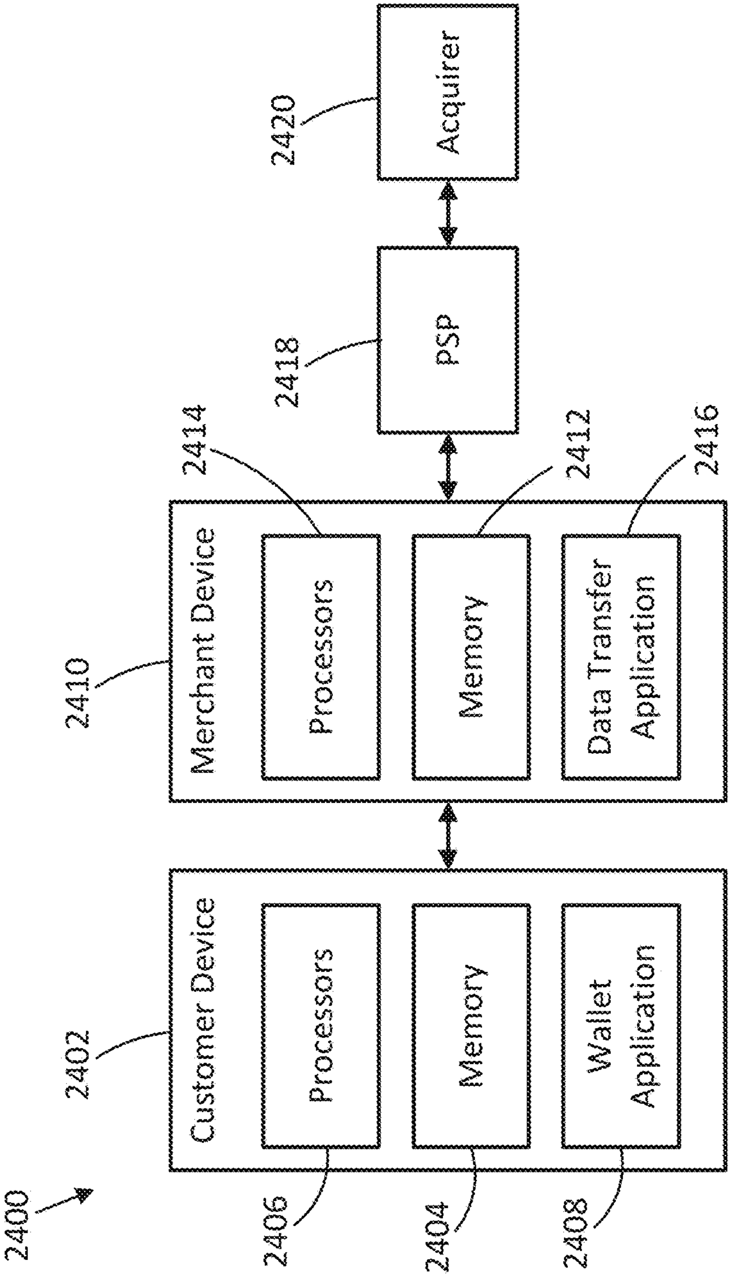
FIG. 24 illustrates an example system arrangement in accordance with some embodiments.

FIG. 24 illustrates an example system arrangement 2400 in accordance with some embodiments. The system arrangement 2400 may perform one or more of the operations related to data transfers as described throughout this application. For example, the system arrangement 2400 may allow devices to facilitate transfer of value from an account associated with one of the devices to an account associated with another of the devices. In some embodiments, the system arrangement 2400 may facilitate a payment transaction where one device is associated with a merchant selling goods and/or services and another device is associated with a customer purchasing the goods and/or services with monetary value (or other legal tender).

The system arrangement 2400 may include a data originating device 2402. The data originating device 2402 may perform one or more of the operations performed by the data originating devices described throughout this disclosure, such as the data originating device 104 (FIG. 1), the data originating device 204 (FIG. 2A), the data originating device 404 (FIG. 4A), the data originating device 504 (FIG. 5A), and/or the data originating device 704 (FIG. 7). The data originating device 2402 may comprise a computer device enabled for wireless communication.

The data originating device 2402 may include memory 2404. The memory 2404 may comprise one or more computer-readable media that can store items. In some embodiments, the computer-readable media may comprise non-transitory computer-readable media. The memory 2404 may store instructions associated with one or more of the operations described throughout this disclosure, as well as other elements described throughout this disclosure (such as value of the data transfer, the value data, the first ECC key, the second ECC key, or other elements described throughout this disclosure.

The data originating device 2402 may further include one or more processors 2406. The processors 2406 may be coupled to the memory 2404. The processors 2406 may execute the instructions stored on the memory 2404 to perform one or more of the operations described throughout this disclosure. For example, the instructions, when executed by the processors 2406 on the data originating device 2402, may cause the data originating device 2402 to perform one or more of the operations described throughout this disclosure.

The data originating device 2402 may further include a wallet application 2408. The wallet application 2408 may be an application implemented by the processors 2406 executing one or more of the instructions from the memory 2404. The wallet application 2408 may store information for one or more accounts associated with a user of the data originating device 2402. Further, the wallet application 2408 may store information associated with one or more data transfers performed with the accounts associated with the user of the data originating device 2402. The wallet application 2408 may facilitate the purchase of goods and/or services using the data originating device 2402, where the payment for the goods and/or services may be made from one or more of the accounts. The wallet application 2408 may interact with one or more applications on other devices to complete a data transfer.

The system arrangement 2400 may further include a data receiving device 2410. The data receiving device 2410 may perform one or more of the operations performed by the data receiving devices described throughout this disclosure, such as the data receiving device 102 (FIG. 1), the data receiving device 202 (FIG. 2A), the data receiving device 402 (FIG. 4A), the data receiving device 502 (FIG. 5), and/or the data receiving device 702 (FIG. 7). The data receiving device 2410 may comprise a computer device enabled for wireless communication.

In some embodiments, the data receiving device 2410 may comprise essentially a same operating system as the data originating device 2402. For example, the data receiving device 2410 and the data originating device 2402 may both implement a mobile device operating system. In some embodiments, the data receiving device 2410 and the data originating device 2402 may comprise essentially the same hardware components. For example, the data receiving device 2410 and the data originating device 2402 may have the same type of core components (such as each having one or more processors, one or more memory devices, one or more wireless communication components, and a display), whereas the peripheral components may differ between the data receiving device 2410 and the data originating device 2402.

The data receiving device 2410 may include memory 2412. The memory 2412 may comprise one or more computer-readable media that can store items. In some embodiments, the computer-readable media may comprise non-transitory computer-readable media. The memory 2412 may store instructions associated with one or more of the operations described throughout this disclosure, as well as other elements described throughout this disclosure (such as value of the data transfer, the value data, the first ECC key, the second ECC key, or other elements described throughout this disclosure).

The data receiving device 2410 may further include one or more processors 2414. The processors 2414 may be coupled to the memory 2412. The processors 2414 may execute the instructions stored on the memory 2412 to perform one or more of the operations described throughout this disclosure. For example, the instructions, when executed by the processors 2414 on the data receiving device 2410, may cause the data receiving device 2410 to perform one or more of the operations described throughout this disclosure.

The data receiving device 2410 may further include a data transfer application 2416. The data transfer application 2416 may be an application implemented by the processors 2414 executing one or more of the instructions from the memory 2412. The data transfer application 2416 may provide a secure communication portal, or may interact with hardware of the data receiving device 2410 that provides a secure communication portal, for performance of at least a portion of the data transfer. For example, the data transfer application 2416 may communicate with the wallet application 2408 via a first communication channel (such as the first communication channel 112 (FIG. 1)) and/or a second communication channel (such as the second communication channel 114 (FIG. 1)) to complete the data transfer.

The system arrangement 2400 may further include a PSP server 2418. The PSP server 2418 may be maintained by a PSP that maintains an account associated with a user of the data receiving device 2410. For example, the PSP may be a financial institution that maintains the account associated with the user of the data receiving device 2410. The PSP server 2418 may maintain information for the account associated with the user of the data receiving device 2410 and may facilitate transfers between the account associated with the user of the data receiving device 2410 and other accounts. The data receiving device 2410 may communicate with the PSP server 2418 to complete the data transfer. For example, the data receiving device 2410 may communicate with the PSP server 2418 to facilitate transfer of legal tender to or from the account associated with the user of the data receiving device 2410 in accordance with the data transfer.

The system arrangement 2400 may further include an acquirer server 2420. The acquirer server 2420 may be associated with a financial institution that maintains an account associate with a user of the data originating device 2402. The acquirer server 2420 may maintain information for the account associated with the user of the data originating device 2402 and may facilitate transfers between the account associated with the user of the data originating device 2402 and other accounts. The PSP server 2418 may communicate with the acquirer server 2420 to complete the data transfer. For example, the PSP server 2418 may communicate with the acquirer server 2420 to transfer legal tender from the account associated with the user of the data originating device 2402 to the account associated with the user of the data receiving device 2410 in accordance with a data transfer.

EXAMPLES

In the following sections, further exemplary embodiments are provided.

Example 1 may include a method, comprising detecting on a first communication channel, by a data receiving device, an initiation of a data transfer with a data originating device, providing on the first communication channel, by the data receiving device to the data originating device, an indication that the data receiving device supports a communication handover on a second communication channel for the data transfer, determining, by the data receiving device, that the data originating device supports the communication handover on the second communication channel based at least in part on an indication that the data originating device supports the communication handover on the second communication channel received on the first communication channel, determining, by the data receiving device, a value data based at least in part on an indication of the value data received on the second communication channel, determining, by the data receiving device, a transfer value for the data transfer based at least in part on the value data, and completing, by the data receiving device, the data transfer with the transfer value.

Example 2 may include the method of example 1, wherein the communication handover on the second communication channel provides support for available services.

Example 3 may include the method of any of examples 1 or 2, wherein the first communication channel supports communication within a first proximity, wherein the second communication channel supports communication within a second proximity, and wherein the first proximity is different from the second proximity.

Example 4 may include the method of any of examples 1-3, wherein detecting the initiation of the data transfer includes detecting, by the data receiving device, that the data originating device is located within a first proximity of the data receiving device, and wherein the method further comprises establishing, by the data receiving device, the second communication channel that allows the data receiving device to communicate with the data originating device when the data originating device is within a second proximity of the data receiving device, the second proximity larger than the first proximity.

Example 5 may include the method of any of examples 1-4, wherein the first communication channel implements first security, wherein the second communication channel implements second security, and wherein the first security is different from the second security.

Example 6 may include the method of any of examples 1-5, wherein the first communication channel implements near field communication (NFC), and wherein the method further comprises establishing, by the data receiving device, the second communication channel between the data receiving device and the data originating device, wherein the second communication channel implements a communication protocol different than the NFC.

Example 7 may include the method of example 6, wherein the communication protocol of the second communication channel is Wi-Fi.

Example 8 may include the method of example 6, further comprising providing, by the data receiving device to the data originating device, a selection handover message, wherein the selection handover message includes a first elliptic curve cryptography (ECC) key, and identifying, by the data receiving device, a second ECC key received in a handover response message received from the data originating device, wherein the second communication channel is established based at least in part on the first ECC key or the second ECC key.

Example 9 may include the method of example 6, wherein establishing the second communication channel is based at least in part on a session name and a password for the second communication channel.

Example 10 may include the method of any of examples 1-9, wherein the data receiving device is functioning as a point of sale (POS) device, and wherein the data originating device is functioning as a near field communication (NFC) payment device.

Example 11 may include the method of any of examples 1-10, wherein the data receiving device comprises essentially a same operating system as the data originating device.

Example 12 may include the method of any of examples 1-11, further comprising terminating, by the data receiving device, the second communication channel based at least in part on the completion of the data transfer.

Example 13 may include the method of any of examples 1-12, wherein providing the indication that the data receiving device supports the communication handover on the second communication channel includes providing, by the data receiving device, an indication that the data receiving device supports input of a tip amount for the data transfer at the data originating device.

Example 14 may include the method of any of examples 1-13, wherein determining that the data originating device supports the communication handover on the second communication channel includes determining, by the data receiving device, that the data originating device supports input of a tip amount for the data transfer at the data originating device.

Example 15 may include the method of any of examples 1-14, wherein the value data comprises a tip amount.

Example 16 may include the method of example 15, wherein determining the transfer value includes determining, by the data receiving device, the transfer value to be a preliminary receipt value plus the tip amount.

Example 17 may include the method of any of examples 1-16, further comprising providing, by the data receiving device to the data originating device, preliminary receipt data for display on the data originating device.

Example 18 may include one or more computer-readable media having instructions stored thereon, wherein the instructions, when executed by the data receiving device, cause the data receiving device to perform the method of any of examples 1-17.

Example 19 may include a system, comprising memory to store instructions, and one or more processors coupled to the memory, wherein the one or more processors are to execute the instructions to perform the method of any of examples 1-17.

Example 20 may include a method, comprising determining, by a data originating device based at least in part on an indication received on a first communication channel, that a data receiving device supports a communication handover on a second communication channel for a data transfer, providing on the first communication channel, by the data originating device to the data receiving device, an indication that the data originating device supports the communication handover on the second communication channel, and providing, by the data originating device to the data receiving device, an indication of a value data on the second communication channel, the value data to be utilized for completion of the data transfer with a transfer value based at least in part on the value data.

Example 21 may include the method of example 20, wherein the communication handover on the second communication channel provides support for available services.

Example 22 may include the method of any of examples 20 or 21, wherein the first communication channel supports communication within a first proximity, wherein the second communication channel supports communication within a second proximity, and wherein the first proximity is different from the second proximity.

Example 23 may include the method of any of examples 20-22, wherein the first communication channel implements first security, wherein the second communication channel implements second security, and wherein the first security is different from the second security.

Example 24 may include the method of any of examples 20-23, wherein the first communication channel implements near field communication (NFC), and wherein the method further comprises establishing, by the data originating device, the second communication channel between the data receiving device and the data originating device, wherein the second communication channel implements a communication protocol different than the NFC.

Example 25 may include the method of example 24, wherein the communication protocol of the second communication channel is Wi-Fi.

Example 26 may include the method of example 24, further comprising identifying, by the data originating device, a first elliptic curve cryptography (ECC) key included in a selection handover message received from the data receiving device, and providing, by the data originating device to the data receiving device, a handover response message that includes a second ECC key, wherein the first ECC key and the second ECC key are utilized to establish the second communication channel.

Example 27 may include the method of example 24, wherein establishing the second communication channel is based at least in part on a session name and a password for the second communication channel.

Example 28 may include the method of any of examples 20-27, wherein the data originating device is functioning as a near field communication (NFC) payment device, and wherein the data receiving device is functioning as a point of sale (POS) device.

Example 29 may include the method of any of examples 20-28, wherein the data originating device comprises essentially a same operating system as the data receiving device.

Example 30 may include the method of any of examples 20-29, wherein providing the indication that the data originating device supports the communication handover on the second communication channel includes providing, by the data originating device, an indication that the data originating device supports input of a tip amount for the data transfer at the data originating device.

Example 31 may include the method of any of examples 20-30, wherein determining that the data receiving device supports the communication handover on the second communication channel includes determining, by the data receiving device, that the data receiving device supports input of a tip amount for the data transfer at the data originating device.

Example 32 may include the method of any of examples 20-31, wherein the value data comprises a tip amount.

Example 33 may include the method of any of examples 20-32, further comprising displaying, by the data originating device, a user input field for input of the value data for the data transfer, and identifying, by the data originating device, the value data of the user input field received at the data originating device.

Example 34 may include the method of example 33, further comprising identifying, by the data originating device, preliminary receipt data received from the data receiving device, and displaying, by the data originating device, the preliminary receipt data with the user input field.

Example 35 may include one or more computer-readable media having instructions stored thereon, wherein the instructions, when executed by the data originating device, cause the data originating device to perform the method of any of examples 20-34.

Example 36 may include a system, comprising memory to store instructions, and one or more processors coupled to the memory, wherein the one or more processors are to execute the instructions to perform the method of any of examples 20-34.

Example 37 may include a method, comprising detecting, by a data receiving device, an initiation of a data transfer with a data originating device based at least in part on a first time that the data originating device has entered a proximity of the data receiving device, providing, by the data receiving device to the data originating device, an indication that the data receiving device supports a double tap data transfer, determining, by the data receiving device, that the data originating device supports the double tap data transfer based at least in part on an indication that the data originating device supports the double tap data transfer received from the data originating device, determining, by the data receiving device, a value data based at least in part on an indication of the value data received from the data originating device during a second time that the data originating device has entered the proximity of the data receiving device, determining, by the data receiving device, a transfer value for the data transfer based at least in part on the value data, and completing, by the data receiving device, the data transfer with the transfer value.

Example 38 may include the method of example 37, wherein the data receiving device provides the indication that the data receiving device supports the double tap data transfer based at least in part on the detection that the data originating device has entered the proximity of the data receiving device.

Example 39 may include the method of any of examples 37 or 38, further comprising determining, by the data receiving device, that the data originating device has entered the proximity of the data receiving device the second time, wherein the data receiving device completes the data transfer based at least in part on the determination of the second time that the data originating device has entered the proximity of the data receiving device the first time.

Example 40 may include the method of any of examples 37-39, wherein the data receiving device is functioning as a point of sale (POS) device, and wherein the data originating device is functioning as a near field communication (NFC) payment device.

Example 41 may include the method of any of examples 37-40, wherein the data receiving device comprises essentially a same operating system as the data originating device.

Example 42 may include the method of any of examples 37-41, further comprising determining, by the data receiving device, that the data originating device has entered the proximity of the data receiving device the second time, and providing, by the data receiving device to the data originating device, a transaction identifier during the first time that the data originating device has entered the proximity of the data receiving device, wherein the indication of the value data is received during the second time that the data originating device has entered the proximity of the data receiving device and is associated with the transaction identifier.

Example 43 may include the method of any of examples 37-42, wherein the value data comprises a tip amount, and wherein the indication of the value data comprises an indication of the tip amount.

Example 44 may include the method of example 43, wherein the indication that the data receiving device supports the double tap data transfer indicates that the data receiving device supports receipt of the indication of the tip amount by the data receiving device during the second time that the data originating device has entered the proximity of the data receiving device, and wherein the indication that the data originating device supports the double tap data transfer indicates that the data originating device supports transmission of the indication of the tip amount by the data originating device during the second time that the data originating device has entered the proximity of the data receiving device.

Example 45 may include the method of example 43, further comprising providing, by the data receiving device to the data originating device, preliminary receipt data during the first time that the data originating device has entered the proximity of the data receiving device, the preliminary receipt data for display on the data originating device, wherein the indication of the tip amount is received during the second time that the data originating device has entered the proximity of the data receiving device.

Example 46 may include the method of example 45, wherein the preliminary receipt data includes a preliminary receipt value, and wherein determining the transfer value includes determining, by the data receiving device, the transfer value to be the preliminary receipt value plus the tip amount.

Example 47 may include one or more computer-readable media having instructions stored thereon, wherein the instructions, when executed by the data receiving device, cause the data receiving device to perform the method of any of examples 37-46.

Example 48 may include a system, comprising memory to store instructions, and one or more processors coupled to the memory, wherein the one or more processors are to execute the instructions to perform the method of any of examples 37-46.

Example 49 may include a method, comprising determining, by a data originating device, that a data receiving device supports a double tap data transfer based at least in part on an indication that the data receiving device supports the double tap data transfer received from the data receiving device during a first time that the data originating device has entered a proximity of the data receiving device, providing, by the data originating device, an indication that the data originating device supports the double tap data transfer, and providing, by the data originating device to the data receiving device, an indication of a value data during a second time that the data originating device has entered the proximity of the data receiving device.

Example 50 may include the method of example 49, wherein the data originating device provides the indication that the data originating device supports the double tap data transfer during the first time that the data originating device has entered the proximity of the data receiving device.

Example 51 may include the method of any of examples 49 or 50, wherein the data originating device is functioning as a near field communication (NFC) payment device, and wherein the data receiving device is functioning as a point of sale (POS) device.

Example 52 may include the method of any of examples 49-51, wherein the data originating device comprises essentially a same operating system as the data receiving device.

Example 53 may include the method of any of examples 49-52, further comprising identifying, by the data originating device, an indication of a transaction identifier received from the data receiving device during the first time that the data originating device has entered the proximity of the data receiving device, and providing, by the data originating device to the data receiving device, the transaction identifier with the indication of the value data during the second time that the data originating device has entered the proximity of the data receiving device.

Example 54 may include the method of any of examples 49-53, wherein the value data comprises a tip amount, and wherein the indication of the value data comprises an indication of the tip amount.

Example 55 may include the method of example 54, wherein the indication that the data receiving device supports the double tap data transfer indicates that the data receiving device supports receipt of the indication of the tip amount by the data receiving device during the second time that the data originating device has entered the proximity of the data receiving device, and wherein the indication that the data originating device supports the double tap data transfer indicates that the data originating device supports transmission of the indication of the tip amount by the data originating device during the second time that the data originating device has entered the proximity of the data originating device.

Example 56 may include the method of any of examples 49-55, further comprising displaying, by the data originating device, a user input field for input of the value data, and identifying, by the data originating device, the value data received via the user input field displayed by the data originating device.

Example 57 may include the method of example 56, further comprising identifying, by the data originating device, preliminary receipt data received from the data receiving device, and displaying, by the data originating device, the preliminary receipt data with the user input field.

Example 58 may include one or more computer-readable media having instructions stored thereon, wherein the instructions, when executed by the data originating device, cause the data originating device to perform the method of any of examples 49-57.

Example 59 may include a system, comprising memory to store instructions, and one or more processors coupled to the memory, wherein the one or more processors are to execute the instructions to perform the method of any of examples 49-57.

Example 60 may include a method, comprising detecting, by a first device, an initiation of a data transfer with a second device, providing, by the first device to the second device, an indication that the first device supports a user input field at the second device for the data transfer, detecting, by the first device received from the second device, an indication that the second device supports the user input field at the second device, detecting, by the first device received from the second device, an indication of an value data of the user input field, the value data being entered into the user input field displayed on a display of the second device, and completing, by the first device, the data transfer in accordance with the value data received from the second device.

Example 61 may include the method of example 60, wherein providing the indication whether the first device supports a user input field includes providing, by the first device, an indication that the first device supports input of a tip amount for the data transfer at the second device.

Example 62 may include the method of any of examples 60 or 61, wherein detecting the indication that the second device supports the user input field includes detecting, by the first device, an indication that the second device supports input of a tip amount for the data transfer at the second device.

Example 63 may include the method of any of examples 60-62, wherein detecting the indication of the value data includes detecting, by the first device received from the second device, an indication of a tip amount of the user input field, the tip amount being entered into the user input field displayed on the display of the second device.

Example 64 may include the method of any of examples 60-63, wherein completing the data transfer includes completing, by the first device, the data transfer with a tip amount received from the second device, the tip amount being entered into the user input field displayed on the display of the second device.

Example 65 may include the method of any of examples 60-64, wherein the indication that the first device supports a user input field is provided via near field communication (NFC), and wherein detecting the indication of the value data includes establishing, by the first device, a secure channel between the first device and the second device via a communication protocol different than the NFC, and detecting, by the first device, the indication of the value data received from the second device via the secure channel.

Example 66 may include the method of example 65, wherein the communication protocol of the secure channel is Wi-Fi.

Example 67 may include the method of example 65, further comprising transmitting, by the first device to the second device, a selection handover message, wherein the selection handover message includes a first elliptic curve cryptography (ECC) key, and detecting, by the first device received from the second device, a handover response message, wherein the handover response message includes a second ECC key, wherein the secure channel is established based at least in part on the first ECC key or the second ECC key.

Example 68 may include the method of any of examples 60-64, wherein detecting the initiation of the data transfer with the second device includes detecting, by the first device, that the second device is located within a first proximity of the first device, and wherein detecting the indication of the value data includes establishing, by the first device, a secure channel that allows the first device to communicate with the second device when the second device is within a second proximity of the first device, the second proximity larger than the first proximity, and detecting, by the first device, the indication of the value data received from the second device via the secure channel.

Example 69 may include the method of any of examples 60-64, wherein detecting the initiation of the data transfer includes detecting, by the first device, that the second device has entered a proximity of the first device a first time, and wherein the method further comprises detecting, by the first device, a second time that the second device has entered the proximity of the first device, wherein the first device completes the data transfer based at least in part on the detection of the second time that the second device has entered the proximity of the first device.

Example 70 may include the method of any of examples 60-64, wherein detecting the initiation of the data transfer includes detecting, by the first device, that the second device has entered a proximity of the first device, wherein the first device provides the indication that the first device supports the user input field at the second device based at least on part on the detection that the second device has entered the proximity of the first device.

Example 71 may include the method of any of examples 60-64, further comprising providing, by the first device, a first elliptic curve cryptography (ECC) key to the second device, identifying, by the first device, a second ECC key received from the second device, and establishing, by the first device, a secure channel between the first device and the second device based at least in part on the first ECC key or the second ECC key, wherein the secure channel is utilized to cause the second device to display the user input field.

Example 72 may include the method of example 71, wherein establishing the secure channel is further based at least in part on a session name and a password for the secure channel.

Example 73 may include the method of example 71, wherein the user input field comprises a tip input field, and wherein the method further comprises providing, by the first device, a preliminary receipt to the second device via the secure channel to be displayed on the second device.

Example 74 may include the method of example 73, wherein completing the data transfer includes identifying, by the first device, a tip amount received from the second device via the secure channel, the tip amount being input into the tip input field at the second device by a user, and updating, by the first device, the preliminary receipt with the tip amount to produce a billable amount, wherein the billable amount is utilized for completing the data transfer.

Example 75 may include the method of example 71, wherein the indication that the first device supports a user input field at the second device is provided via near field communication (NFC), wherein the indication that the second device supports the user input field is received via the NFC, and wherein the NFC is separate from the secure channel.

Example 76 may include the method of any of examples 60-64, wherein detecting the initiation of the data transfer includes detecting, by the first device, that the second device has entered a proximity of the first device a first time, and wherein the method further comprises detecting, by the first device, that the second device has entered the proximity of the first device a second time, the second time being after the first time, and identifying, by the first device, the value data of the user input field received from the second device when the second device is within the proximity of the first device the second time.

Example 77 may include one or more computer-readable media having instructions stored thereon, wherein the instructions, when executed by the first device, cause the first device to perform the method of any of examples 60-76.

Example 78 may include a system, comprising memory to store instructions; and one or more processors coupled to the memory, wherein the one or more processors are to execute the instructions to perform the method of any of examples 60-76.

Example 79 may include a method, comprising detecting, by a first device received from a second device, an indication that the second device supports a user input field at the first device for a data transfer, providing, by the first device to the second device, an indication that the first device supports the user input field at the first device, detecting, by the first device received from the second device, an indication of the user input field to be displayed on a display of the first device, displaying, by the first device on the display of the first device, the user input field, identifying, by the first device, a value data of the user input field received at the first device, and providing, by the first device to the second device, an indication of the value data for completion of the data transfer.

Example 80 may include the method of example 79, further comprising detecting, by the first device received from the second device, a selection handover message, identifying, by the first device, a first elliptic curve cryptography (ECC) key included in the selection handover message, and transmitting, by the first device to the second device, a handover response message, wherein the handover response message includes a second ECC key, and wherein the first ECC key and the second ECC key are utilized to establish a secure channel between the first device and the second device.

Example 81 may include the method of example 80, further comprising establishing, by the first device, the secure channel between the first device using the first ECC key and the second ECC key.

Example 82 may include the method of example 81, wherein establishing the secure channel is based at least in part on a session name and a password for the secure channel.

Example 83 may include the method of example 81, wherein the user input field comprises a tip input field, and the method further comprises detecting, by the first device received from the second device, a preliminary receipt via the secure channel, and displaying, by the first device on the display of the first device, the preliminary receipt with the user input field.

Example 84 may include the method of any of examples 79-83, further comprising establishing, by the first device, a secure channel between the first device and the second device, wherein the indication of the user input field to be displayed is received via the secure channel and the value data is provided to the second device via the secure channel.

Example 85 may include the method of example 84, wherein the indication that the second device supports the user input field is received via near field communication (NFC) and the indication that the first device supports the user input field is provided via the NFC, and a communication protocol of the secure channel is different from the NFC.

Example 86 may include the method of example 85, wherein the communication protocol of the secure channel is Wi-Fi.

Example 87 may include the method of any of examples 79-83, wherein detecting the indication that the second device supports the user input field includes detecting, by the first device, an indication that the second device supports input of a tip amount for the data transfer at the first device.

Example 88 may include the method of any of examples 79-83, wherein providing the indication that the first device supports the user input field includes providing, by the first device, an indication that the first device supports input of a tip amount for the data transfer at the first device.

Example 89 may include the method of any of examples 79-83, wherein identifying the value data includes identifying, by the first device, a tip amount of the user input field received at the first device.

Example 90 may include the method of any of examples 79-83, wherein providing the indication of the value data includes providing, by the first device, an indication of a tip amount of the user input field received at the first device, the indication of the tip amount for being provided for completion of the data transfer.

Example 91 may include the method of any of examples 79-83, wherein detecting the indication that the second device supports the user input field includes detecting, by the first device, the indication that the second device supports the user input field while the first device is located within a first proximity of the second device, and wherein the method further comprises establishing, by the first device, a secure channel between the first device and the second device, where the secure channel allows the first device to communicate with the second device when the first device is within a second proximity of the second device, wherein second proximity is larger than the first proximity, and wherein the indication of the value data is provided to the second device via the secure channel.

Example 92 may include the method of any of examples 79-83, wherein the first device is to provide the indication that the first device supports the user input field at the first device during a first time that the first device has entered a proximity of the second device, and wherein the first device is to provide the indication of the value data during a second time that the first device has entered the proximity of the second device, the second time after the first time.

Example 93 may include one or more computer-readable media having instructions stored thereon, wherein the instructions, when executed by the first device, cause the first device to perform the method of any of examples 79-92.

Example 94 may include a system, comprising memory to store instructions, and one or more processors coupled to the memory, wherein the one or more processors are to execute the instructions to perform the method of any of examples 79-92.

Example 95 may include a method, comprising detecting, by a first device, an initiation of a data transfer with a second device, providing, by the first device to the second device, an indication that the first device supports a secure channel for the data transfer, detecting, by the first device received from the second device, an indication that the second device supports the secure channel for the data transfer, and establishing, by the first device, the secure channel for communication of data related to the data transfer between the first device and the second device.

Example 96 may include the method of example 95, further comprising transmitting, by the first device to the second device, a selection handover message, wherein the selection handover message includes a first elliptic curve cryptography (ECC) key, and detecting, by the first device received from the second device, a handover response message, wherein the handover response message includes a second ECC key, and wherein the secure channel is established based at least in part on the first ECC key or the second ECC key.

Example 97 may include the method of example 96, wherein the secure channel is established based further at least in part on a session name and a password for the secure channel.

Example 98 may include the method of any of examples 95-97, wherein the initiation of the data transfer is detected via near field communication (NFC), and wherein establishing the secure channel includes establishing the secure channel via a communication protocol different than the NFC.

Example 99 may include the method of example 98, wherein the communication protocol of the secure channel is Wi-Fi.

Example 100 may include the method of any of examples 95-97, wherein detecting the initiation of the data transfer with the second device includes detecting, by the first device, that the second device is located within a first proximity of the first device, and wherein the secure channel allows the communication of the data between the first device and the second device within a second proximity, the second proximity being larger than the first proximity.

Example 101 may include the method of any of examples 95-97, further comprising transmitting, by the first device to the second device via the secure channel, a preliminary receipt for the data transfer, detecting, by the first device received from the second device via the secure channel, an indication of a tip amount for the data transfer, and completing, by the first device, the data transfer with the tip amount received from the second device.

Example 102 may include one or more computer-readable media having instructions stored thereon, wherein the instructions, when executed by the first device, cause the first device to perform the method of any of examples 95-101.

Example 103 may include a system, comprising memory to store instructions, and one or more processors coupled to the memory, wherein the one or more processors are to execute the instructions to perform the method of any of examples 95-101.

Example 104 may include a method, comprising detecting, by a first device received from a second device, an indication that a second device supports a secure channel for a data transfer, providing, by the first device to the second device, an indication that the first device supports the secure channel for the data transfer, and establishing, by the first device, the secure channel for communication of data related to the data transfer between the first device and the second device.

Example 105 may include the method of example 104, further comprising detecting, by the first device received from the second device, a selection handover message, wherein the selection handover message includes a first elliptic curve cryptography (ECC) key, and transmitting, by the first device to the second device, a handover response message, wherein the handover response message includes a second ECC key, and wherein the secure channel is established based at least in part on the first ECC key or the second ECC key.

Example 106 may include the method of example 105, wherein the secure channel is established based further at least in part on a session name and a password for the secure channel.

Example 107 may include the method of any of examples 104-106, wherein the indication that the second device supports the secure channel is received via near field communication (NFC), and wherein establishing the secure channel includes establishing the secure channel via a communication protocol different than the NFC.

Example 108 may include the method of example 107, wherein the communication protocol of the secure channel is Wi-Fi.

Example 109 may include the method of example 107, wherein the NFC has a first proximity for communication between the first device and the second device, and wherein the communication protocol of the secure channel has a second proximity for communication between the first device and the second device, the second proximity being larger than the first proximity.

Example 110 may include the method of any of examples 104-106, further comprising displaying, by the first device, a tip amount input field on a display of the first device, detecting, by the first device, a tip amount input into the tip amount input field, and providing, by the first device to the second device via the secure channel, an indication of the tip amount, the tip amount to be utilized for completion of the data transfer.

Example 111 may include the method of example 110, further comprising detecting, by the first device received from the second device via the secure channel, a preliminary receipt, and displaying, by the first device, the preliminary receipt on the display with the tip amount input field.

Example 112 may include one or more computer-readable media having instructions stored thereon, wherein the instructions, when executed by the first device, cause the first device to perform the method of any of examples 104-111.

Example 113 may include a system, comprising memory to store instructions, and one or more processors coupled to the memory, wherein the one or more processors are to execute the instructions to perform the method of any of examples 104-111.

As described above, one aspect of the present technology may relate to the gathering and use of data available from specific and legitimate sources to allow for interaction with a second device for a data transfer. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to provide for secure data transfers occurring between a first device and a second device. The personal information data may further be utilized for identifying an account associated with the user from a service provider for completing a data transfer.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. For example, a user may "opt in" or "opt out" of having information associated with an account of the user stored on a user device and/or shared by the user device. In addition to providing "opt in" and "opt out" options, the present disclosure contemplates providing notifications relating to the access or use of personal information. For instance, a user may be notified upon downloading an application that their personal information data will be accessed and then reminded again just before personal information data is accessed by the application. In some instances, the user may be notified upon initiation of a data transfer of the device accessing information associated with the account of the user and/or the sharing of information associated with the account of the user with another device.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

What is claimed is:

1. A method, comprising:

detecting on a first communication channel, by one or more processors of a data receiving device, an initiation of a data transfer with a data originating device;

providing on the first communication channel, by the one or more processors of the data receiving device to the data originating device, an indication that the data receiving device supports a communication handover on a second communication channel for the data transfer;

determining, by the one or more processors of the data receiving device, that the data originating device supports the communication handover on the second communication channel based at least in part on an indication that the data originating device supports the communication handover on the second communication channel received on the first communication channel;

providing, by the data receiving device, a selection handover message to the data originating device, the selection handover message comprising a first key; and identifying, by the data receiving device, a second key received in a handover response message received from the data originating device, the second communication channel being established based at least in part on the first key or the second key;

determining, by the data receiving device, a value data based at least in part on an indication of the value data received on the second communication channel;

determining, by the data receiving device, a transfer value for the data transfer based at least in part on the value data;

performing, by the data receiving device, an operation that results in a context switch to a secure element of the data receiving device;

establishing, by the secure element of the data receiving device, a secure connection with a service provider server; and completing, by the secure element of the data receiving device, the data transfer with the transfer value via the service provider server.

2. The method of claim 1, wherein the communication handover on the second communication channel provides support for available services.

3. The method of claim 1, wherein the first communication channel supports communication within a first proximity, wherein the second communication channel supports communication within a second proximity, and wherein the first proximity is different from the second proximity.

4. The method of claim 1, wherein detecting the initiation of the data transfer includes detecting, by the data receiving device, that the data originating device is located within a first proximity of the data receiving device, and wherein the method further comprises:

establishing, by the data receiving device, the second communication channel that allows the data receiving device to communicate with the data originating device when the data originating device is within a second proximity of the data receiving device, the second proximity larger than the first proximity.

5. The method of claim 1, wherein the first communication channel implements first security, wherein the second communication channel implements second security, and wherein the first security is different from the second security.

6. The method of claim 1, wherein the first communication channel implements near field communication (NFC), and wherein the method further comprises:

establishing, by the data receiving device, the second communication channel between the data receiving device and the data originating device, wherein the second communication channel implements a communication protocol different than the NFC.

7. The method of claim 6, wherein the communication protocol of the second communication channel is Wi-Fi.

8. The method of claim 1, wherein the first key is a first elliptic curve cryptography (ECC) key, and wherein the second key is a second ECC key.

9. The method of claim 6, wherein establishing the second communication channel is based at least in part on a session name and a password for the second communication channel.

10. One or more non-transitory, computer-readable media having instructions stored thereon, wherein the instructions, when executed by a data receiving device, cause the data receiving device to perform processes comprising:

detecting, by one or more processors of the data receiving device on a first communication channel, an initiation of a data transfer with a data originating device;

providing on the first communication channel, by the one or more processors of the data receiving device to the data originating device, an indication that the data receiving device supports a communication handover on a second communication channel for the data transfer;

determining, by the one or more processors of the data receiving device, that the data originating device supports the communication handover on the second communication channel based at least in part on an indication that the data originating device supports the communication handover on the second communication channel received on the first communication channel;

providing a selection handover message to the data originating device, the selection handover message comprising a first key; and identifying a second key received in a handover response message received from the data originating device, the second communication channel being established based at least in part on the first key or the second key;

determining a value data based at least in part on an indication of the value data received on the second communication channel;

determining a transfer value for the data transfer based at least in part on the value data;

performing an operation that results in a context switch to a secure element of the data receiving device;

establishing, by the secure element of the data receiving device, a secure connection with a service provider server; and completing, by the secure element of the data receiving device, the data transfer with the transfer value via the service provider server.

11. The one or more non-transitory, computer-readable media of claim 10, wherein detecting the initiation of the data transfer includes detecting that the data originating device is located within a first proximity of the data receiving device, and wherein the processes further comprise:

establishing the second communication channel that allows the data receiving device to communicate with the data originating device when the data originating device is within a second proximity of the data receiving device, the second proximity larger than the first proximity.

12. The one or more non-transitory, computer-readable media of claim 10, wherein the processes further comprise:

terminating the second communication channel based at least in part on the completion of the data transfer.

13. The one or more non-transitory, computer-readable media of claim 10, wherein providing the indication that the data receiving device supports the communication handover on the second communication channel includes providing an indication that the data receiving device supports input of a tip amount for the data transfer at the data originating device.

14. The one or more non-transitory, computer-readable media of claim 10, wherein determining that the data originating device supports the communication handover on the second communication channel includes determining that the data originating device supports input of a tip amount for the data transfer at the data originating device.

15. A data receiving device, comprising:

memory to store value data;

one or more processors coupled to the memory, the one or more processors to:

detect, on a first communication channel, an initiation of a data transfer with a data originating device;

provide, on the first communication channel, an indication that the data receiving device supports a communication handover on a second communication channel for the data transfer;

determine that the data originating device supports the communication handover on the second communication channel based at least in part on an indication that the data originating device supports the communication handover on the second communication channel received on the first communication channel;

provide a selection handover message to the data originating device, the selection handover message comprising a first key; and identify a second key received in a handover response message received from the data originating device, the second communication channel being established based at least in part on the first key or the second key;

determine the value data based at least in part on an indication of the value data received on the second communication channel;

determine a transfer value for the data transfer based at least in part on the value data; and perform an operation that results in a context switch to a secure element of the data receiving device; and the secure element to:

establish a secure connection with a service provider server; and complete the data transfer with the transfer value via the service provider server.

16. The data receiving device of claim 15, wherein the value data comprises a tip amount.

17. The data receiving device of claim 16, wherein to determine the transfer value includes to determine the transfer value to be a preliminary receipt value plus the tip amount.

18. The data receiving device of claim 15, wherein the one or more processors are further to:

provide, to the data originating device, preliminary receipt data for display on the data originating device.

19. The method of claim 1, wherein the indication of the value data received on the second communication channel is encrypted based at least in part on the first key and the second key.

20. The method of claim 1, wherein the selection handover message further comprises an indication of a communication protocol for the second communication channel.

* * * * *